US012574624B2

(12) United States Patent
Lee

(10) Patent No.: US 12,574,624 B2
(45) Date of Patent: Mar. 10, 2026

(54) IMAGE-CAPTURING DEVICE COMPRISING REFRACTIVE MEMBER AND ELECTRONIC DEVICE INCLUDING THE IMAGE-CAPTURING DEVICE

(71) Applicant: Samsung Electronics Co., Ltd., Suwon-si (KR)

(72) Inventor: Yongjae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 18/323,822

(22) Filed: May 25, 2023

(65) Prior Publication Data

US 2023/0388616 A1 Nov. 30, 2023

Related U.S. Application Data

(63) Continuation-in-part of application No. PCT/KR2023/000385, filed on Jan. 9, 2023.

(30) Foreign Application Priority Data

| May 26, 2022 | (KR) | .......................... 10-2022-0064897 |
| Sep. 16, 2022 | (KR) | .......................... 10-2022-0117071 |
| May 25, 2023 | (KR) | .......................... 10-2023-0067571 |

(51) Int. Cl.
*H04N 23/55* (2023.01)
*H04M 1/02* (2006.01)

(52) U.S. Cl.
CPC .......... *H04N 23/55* (2023.01); *H04M 1/0264* (2013.01)

(58) Field of Classification Search
CPC ...... H04N 23/55; H04N 23/61; H04N 23/687; H04M 1/0264; G02B 5/00; G02B 5/04;
(Continued)

(56) References Cited

U.S. PATENT DOCUMENTS 9,927,600 B2 3/2018 Goldenberg et al.
10,215,968 B2 * 2/2019 Bae .................... G02B 13/0065
(Continued)

FOREIGN PATENT DOCUMENTS

CN 113296234 A 8/2021
JP 5482785 B2 5/2014
(Continued)

OTHER PUBLICATIONS

Korean Notice of Allowance dated Sep. 27, 2024, issued in Korean Patent Application No. 10-2023-0067571.
(Continued)

*Primary Examiner* — Kelly L Jerabek
(74) *Attorney, Agent, or Firm* — Jefferson IP Law, LLP

(57) ABSTRACT

An image-capturing device is provided. The image-capturing device includes lenses arranged along a direction of a first optical axis from an object side, an image sensor receiving light guided through the lenses, the image sensor includes an imaging surface inclined with respect to the first optical axis, a first optical member disposed between the lenses and the image sensor, the first optical member receiving light incident through the lenses in a direction of the first optical axis and emitting the light along a direction of a second optical axis crossing the first optical axis, and a second optical member disposed between the first optical member and the image sensor, the second optical member receiving light through the first optical member in the direction of the second optical axis and emitting the light to the image sensor along a direction of a third optical axis crossing the second optical axis.

21 Claims, 31 Drawing Sheets

(58) Field of Classification Search
CPC . G02B 5/08; G02B 5/208; G02B 3/00; G02B
3/0037; G02B 9/60; G02B 9/34; G02B
30/00; G02B 7/04
See application file for complete search history.

(56) References Cited

U.S. PATENT DOCUMENTS

| | | | |
|---|---|---|---|
| 10,732,389 B2 * | 8/2020 | Chen | G02B 27/646 |
| 2003/0107801 A1 | 6/2003 | Ishii et al. | |
| 2007/0024739 A1 * | 2/2007 | Konno | G02B 13/002 |
| | | | 348/337 |
| 2012/0026384 A1 | 2/2012 | Yamada | |
| 2015/0253647 A1 * | 9/2015 | Mercado | G02B 13/007 |
| | | | 359/708 |
| 2017/0139184 A1 | 5/2017 | Bae | |
| 2017/0276912 A1 | 9/2017 | Yao et al. | |
| 2018/0024329 A1 | 1/2018 | Goldenberg et al. | |
| 2019/0235202 A1 | 8/2019 | Smyth et al. | |
| 2019/0243112 A1 | 8/2019 | Yao et al. | |
| 2020/0150400 A1 * | 5/2020 | Tseng | G02B 13/0065 |
| 2021/0041765 A1 * | 2/2021 | Shigemitsu | G03B 17/17 |
| 2021/0048628 A1 | 2/2021 | Shabtay et al. | |
| 2021/0048649 A1 | 2/2021 | Goldenberg et al. | |
| 2021/0063688 A1 * | 3/2021 | Shin | G02B 9/60 |
| 2021/0063703 A1 | 3/2021 | Byun et al. | |
| 2021/0063704 A1 * | 3/2021 | Son | H04N 23/55 |
| 2021/0092263 A1 * | 3/2021 | Jung | G02B 13/0065 |
| 2021/0096338 A1 | 4/2021 | Saiga | |
| 2021/0157107 A1 | 5/2021 | Pentico | |
| 2021/0294074 A1 | 9/2021 | Yao et al. | |
| 2021/0333516 A1 | 10/2021 | Li et al. | |
| 2021/0366968 A1 * | 11/2021 | Carrion | H04N 13/236 |
| 2022/0091373 A1 | 3/2022 | Saiga et al. | |
| 2022/0091398 A1 * | 3/2022 | Smyth | H04N 23/687 |
| 2024/0126051 A1 * | 4/2024 | Shabtay | H04N 23/55 |

FOREIGN PATENT DOCUMENTS

| | | |
|---|---|---|
| KR | 20-2000-0016001 U | 8/2000 |
| KR | 10-0626551 B1 | 9/2006 |
| KR | 10-2017-0056255 A | 5/2017 |
| KR | 10-2017-0105236 A | 9/2017 |
| KR | 10-2017-0118943 A | 10/2017 |
| KR | 10-2020-0087214 A | 7/2020 |
| KR | 10-2020-0143920 A | 12/2020 |
| WO | 2021/213218 A1 | 10/2021 |

OTHER PUBLICATIONS

Korean Examination Report dated Mar. 15, 2024, issued in Korean Application No. 10-2023-0067571.

International Search Report dated Apr. 18, 2023, issued in International Application No. PCT/KR2023/000385.

Handbook of optical systems; vol. 3; Aberration Theory and Correction of Optical Systems; XP002719371; Chapter 31; Correction of Aberration, Jan. 1, 2007.

Extended European Search Report dated May 12, 2025, issued in a European Patent Application No. 23811925.9.

U.S. Office Action dated May 15, 2025, issued by the U.S. Patent and Trademark Office; U.S. Appl. No. 18/156,799.

* cited by examiner

300

320

330

310

311

340

350

360

370

380

Z

Y

X

ASTIGMATIC FIELD CURVES

DISTORTION

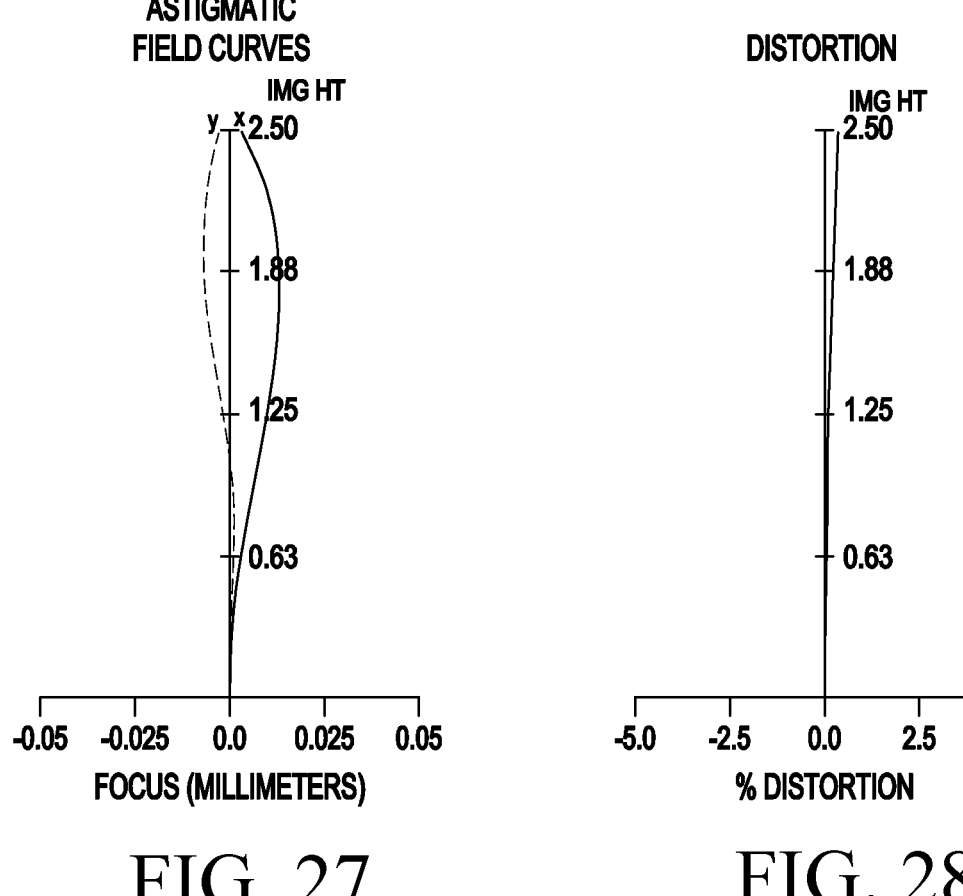
FIG. 27                    FIG. 28

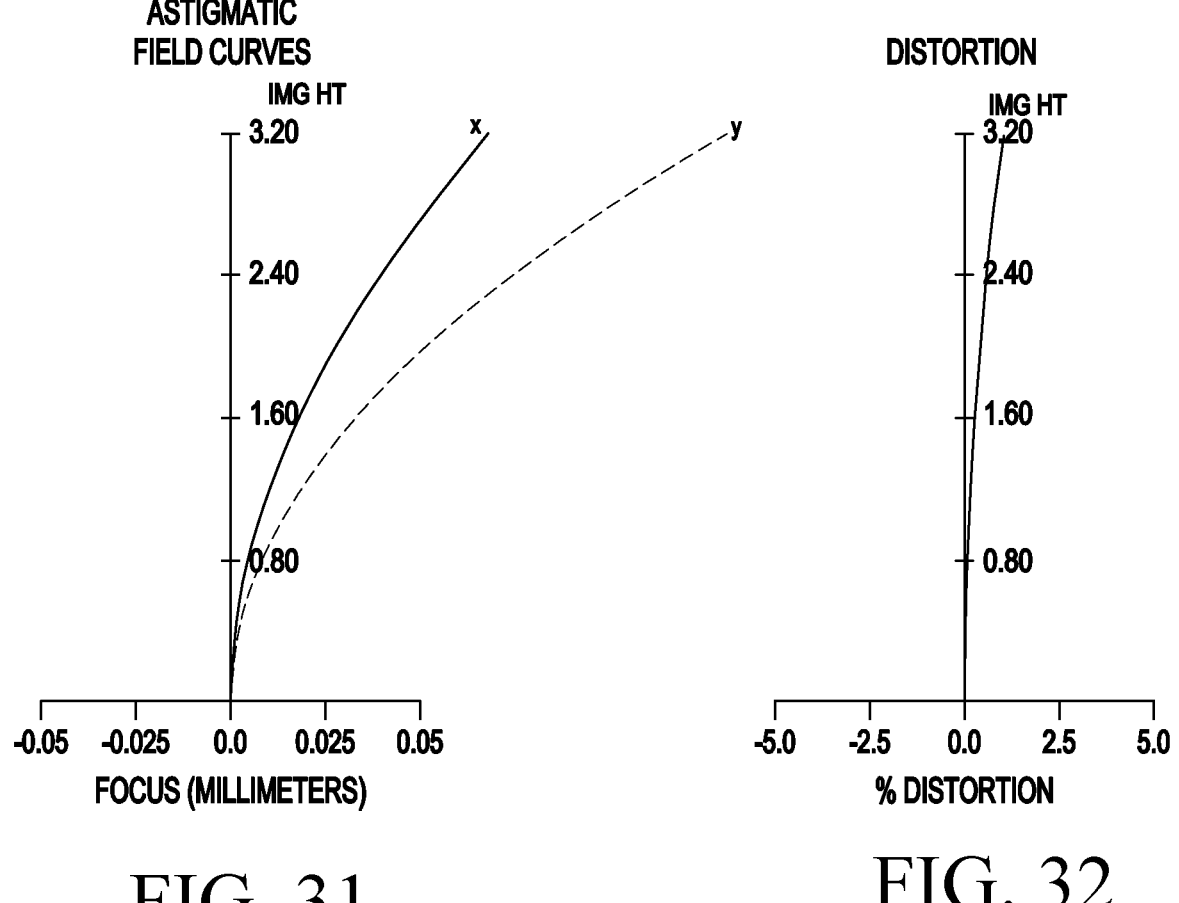
FIG. 31                    FIG. 32

IMAGE-CAPTURING DEVICE COMPRISING REFRACTIVE MEMBER AND ELECTRONIC DEVICE INCLUDING THE IMAGE-CAPTURING DEVICE

CROSS-REFERENCE TO RELATED APPLICATION(S)

This application is a Continuation-In-Part (CIP) application, claiming priority under § 365(c), of an International application No. PCT/KR2023/000385, filed on Jan. 9, 2023, which is based on and claims the benefit of a Korean patent application number 10-2022-0064897, filed on May 26, 2022, in the Korean Intellectual Property Office, of a Korean patent application number 10-2022-0117071, filed on Sep. 16, 2022, in the Korean Intellectual Property Office, and of a Korean patent application number 10-2023-0067571, filed on May 25, 2023, in the Korean Intellectual Property Office, the disclosure of each of which is incorporated by reference herein in its entirety.

TECHNICAL FIELD

The disclosure relates to an electronic device, for example, an image-capturing device and an electronic device including the same.

BACKGROUND ART

Typically, an electronic device may mean a device that performs a predetermined function according to a program provided therein (e.g., an electronic scheduler, a portable multimedia reproducer, a mobile communication terminal, a tablet personal computer (PC), an image/sound device, a desktop/laptop PC, and/or a vehicle navigation system), as well as a home appliance. The above-mentioned electronic devices may output, for example, information stored therein as sound or an image. With an increase of a degree of integration of the electronic devices and the generalization of ultra-high-speed and high-capacity wireless communication, recently, a single electronic device, such as a mobile communication terminal, may be provided with various functions. For example, various functions, such as an entertainment function such as a game, a multimedia function such as music/video playback, a communication and security function for mobile banking or the like, and/or a schedule management or e-wallet function, are integrated in a single electronic device, in addition to a communication function.

With the development of digital camera manufacturing technology, electronic devices equipped with downsized and lightened camera modules have been commercialized. As an electronic device that is generally carried at all times (e.g., a mobile communication terminal) is equipped with a camera module, it becomes possible for a user to easily utilize various functions such as video call and/or augmented reality as well as to take a picture or video.

In recent years, electronic devices including a plurality of cameras have been distributed. An electronic device may include, for example, a camera module including a wide-angle camera and a telephoto camera. The electronic device may acquire a wide-angle image by photographing a wide-range scene around the electronic device by using the wide-angle camera, or may acquire a telephoto image by photographing a scene corresponding to a location relatively far from the electronic device by using the telephoto camera. In this way, by including a plurality of camera modules and/or image capturing devices, downsized electronic devices such as smartphones are making inroads into the compact camera market, and are expected to replace high-performance cameras such as single-lens reflex cameras in the future.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

Aspects of the disclosure are to address at least the above-mentioned problems and/or disadvantages and to provide at least the advantages described below. Accordingly, an aspect of the disclosure is to provide an image-capturing device and an electronic device including the same.

Additional aspects will be set forth in part in the description which follows and, in part, will be apparent from the description, or may be learned by practice of the presented embodiments.

In accordance with an aspect of the disclosure, an image-capturing device is provided. The image-capturing device includes at least two lenses arranged along a direction of a first optical axis from an object side, an image sensor configured to receive light guided and/or focused through the at least two lenses, wherein the image sensor includes an imaging surface disposed to be inclined with respect to the first optical axis, a first optical member disposed between the at least two lenses and the image sensor, wherein the first optical member is configured to receive light incident through the at least two lenses in a direction of the first optical axis and to emit the light along a direction of a second optical axis crossing the first optical axis, and a second optical member disposed between the first optical member and the image sensor, wherein the second optical member is configured to receive light incident through the first optical member in the direction of the second optical axis and to emit the light to the image sensor along a direction of a third optical axis crossing the second optical axis. In an embodiment, the image-capturing device may satisfy a conditional expression "$0.1<=TTL/f<=0.35$", wherein "TTL" is a length from an object-side surface of a first lens on the object side to a sensor-side surface of a first lens on the image sensor side, "f" is a focal length of the image-capturing device. In an embodiment, the image-capturing device may satisfy a conditional expression "$15<=Ang-min<=40$," wherein "Ang-min" is the smallest angle among angles formed by two adjacent surfaces of the second optical member.

In accordance with another aspect of the disclosure, an electronic device is provided. The electronic device includes an image-capturing device and a processor configured to acquire an image by receiving external light by using the image-capturing device. In an embodiment, the image-capturing device may include at least two lenses arranged along a direction of a first optical axis from an object side, an image sensor configured to receive light guided and/or focused through the at least two lenses, wherein the image sensor includes an imaging surface disposed to be inclined with respect to the first optical axis, a first optical member disposed between the at least two lenses and the image sensor, wherein the first optical member is configured to receive light incident through the at least two lenses in a direction of the first optical axis and to emit the light along a direction of a second optical axis crossing the first optical axis, and a second optical member disposed between the first optical member and the image sensor, wherein the second optical member is configured to receive light incident through the first optical member in the direction of the second optical axis and to emit the light to the image sensor along a direction of a third optical axis crossing the second optical axis. In an embodiment, the image-capturing device may satisfy a conditional expression "0.1<=TTL/f<=0.35", wherein "TTL" is a length from an object-side surface of a first lens on the object side to a sensor-side surface of a first lens on the image sensor side, "f" is a focal length of the image-capturing device. In an embodiment, the image-capturing device described above may satisfy a conditional expression "5<=FoV<=35," wherein "FoV" is the field of view of the image-capturing device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages certain embodiments of the disclosure will be more apparent from the following description taken in conjunction with the accompanying drawings, in which:

FIG. 27 is a graph showing astigmatism of the image-capturing device of FIG. 25 according to an embodiment of the disclosure;

FIG. 28 is a graph showing distortion rate of the image-capturing device of FIG. 25 according to an embodiment of the disclosure;

FIG. 31 is a graph showing astigmatism of the image-capturing device of FIG. 29 according to an embodiment of the disclosure; and FIG. 32 is a graph showing distortion rate of the image-capturing device of FIG. 29 according to an embodiment of the disclosure.

Throughout the drawings, like reference numerals will be understood to refer to like parts, components, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As electronic devices become smaller and lighter, the electronic devices may be more convenient to carry. In an environment where a display is enlarged so that a larger screen can be enjoyed even in a portable electronic device, the electronic device may be downsized and lightened by reducing the thickness thereof. In a downsized electronic device, it may be difficult to mount an image-capturing device having good optical performance. For example, the larger the number or size of lenses, the easier it is to secure the optical performance of an image-capturing device. However, in a downsized electronic device, the degree of freedom in design may be reduced in the arrangement of the lens(es) or an image sensor.

An embodiment of the disclosure is for solving at least the above-mentioned problems and/or disadvantages and providing at least the following advantages, and is able to provide an image-capturing device having improved degree of freedom in design and/or an electronic device including the same.

An embodiment of the disclosure is able to provide an image-capturing device that is capable of being easily disposed in a narrow space and/or an electronic device including the same.

The technical problems to be addressed by the disclosure are not limited to those described above, and other technical problems, which are not described above, may be clearly understood from the following description by a person ordinarily skilled in the related art, to which the disclosure belongs.

Figure 1:
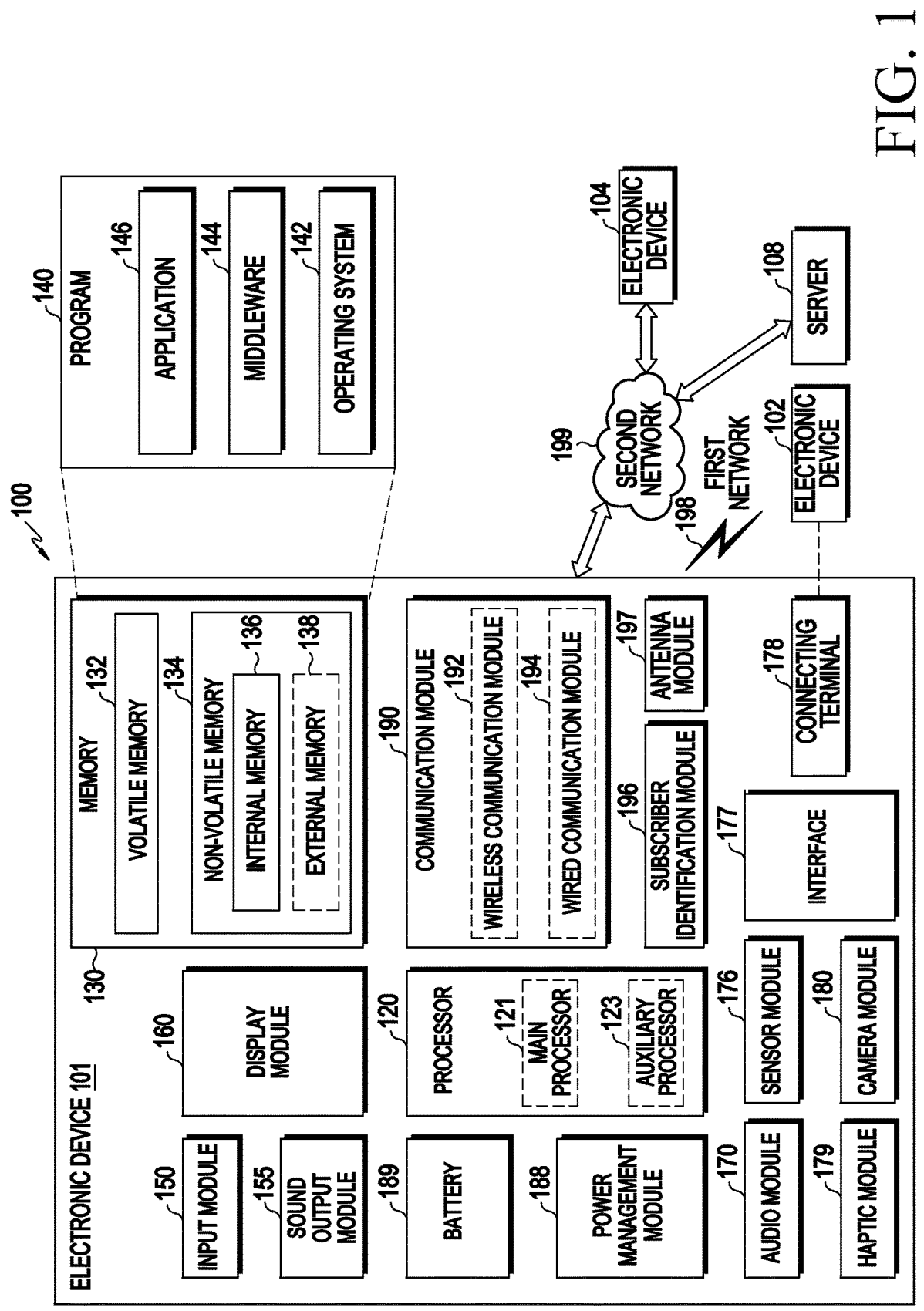
FIG. 1 is a block diagram illustrating an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit)

may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing perfor-mance on a high-frequency band, such as, e.g., beamform-ing, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plural-ity of antennas (e.g., array antennas). In such a case, at least one antenna appropriate for a communication scheme used in the communication network, such as the first network 198 or the second network 199, may be selected, for example, by the communication module 190 from the plurality of anten-nas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more external devices of the external electronic devices 102 or 104, or the server 108. For example, if the electronic device 101 should perform a function or a service automati-cally, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may pro-vide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to embodiment(s) of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the elec-tronic devices are not limited to those described above.

It should be appreciated that embodiments of the disclo-sure and the terms used therein are not intended to limit the technological features set forth herein to particular embodi-ments and include various changes, equivalents, or replace-ments for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in another aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Embodiments of the disclosure may be implemented as software (e.g., the program) including one or more instructions that are stored in a storage medium (e.g., an internal memory 136 or an external memory 138) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiment(s) of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

In the following detailed description, a longitudinal direction, a width direction, and/or a thickness direction of an electronic device may be referred to, wherein the length direction may be defined as the "Y-axis direction", the width direction may be defined as the "X-axis direction", and/or the thickness direction may be defined as the "Z-axis direction". In an embodiment, "negative/positive (−/+)" may be referred to together with the Cartesian coordinate system illustrated in the drawings regarding the directions in which components are oriented. For example, the front surface of an electronic device and/or a housing may be defined as a "surface facing the +Z direction," and the rear surface may be defined as a "surface facing the −Z direction." In an embodiment, a side surface of the electronic device and/or the housing may include an area facing the +X direction, an area facing the +Y direction, an area facing the −X direction, and/or an area facing the −Y direction. In an embodiment, the "X-axis direction" may include both the "−X direction" and the "+X direction." It is noted that these are based on the Cartesian coordinate system described in the drawings for the sake of brevity of description, and the descriptions of these directions or components do not limit various embodiment(s) of the disclosure.

Figure 2:
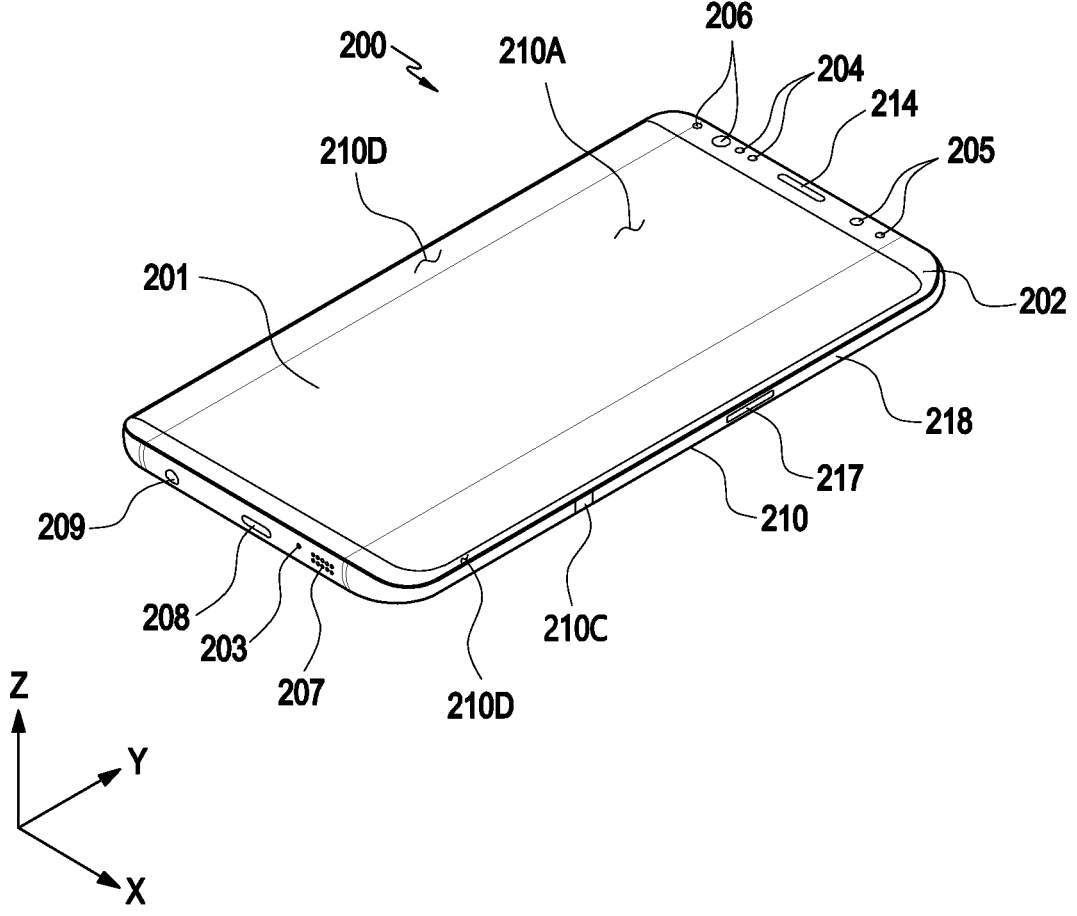
FIG. 2 is a perspective view illustrating a front surface of an electronic device according to an embodiment of the disclosure.

FIG. 2 is a perspective view illustrating the front surface of an electronic device according to an embodiment of the disclosure.

Figure 3:
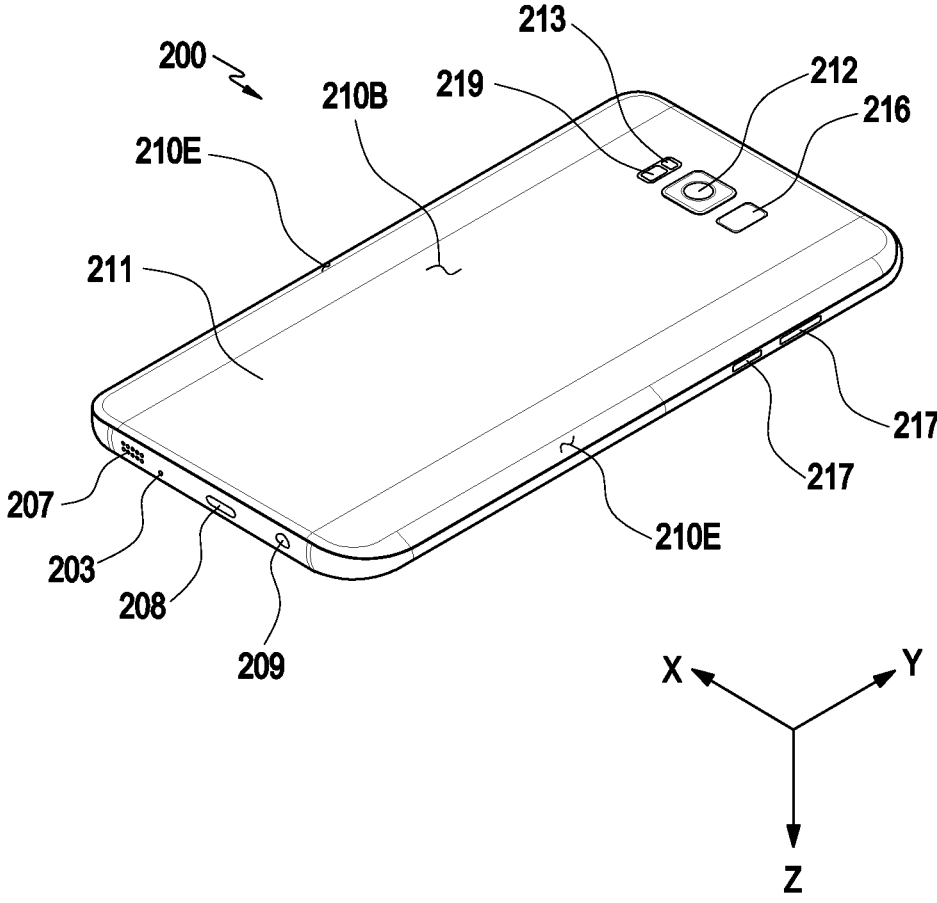
FIG. 3 is a perspective view illustrating a rear surface of an electronic device of FIG. 2 according to an embodiment of the disclosure.

FIG. 3 is a perspective view illustrating the rear surface of the electronic device of FIG. 2 according to an embodiment of the disclosure.

Referring to FIGS. 2 and 3, an electronic device 200 according to an embodiment may include a housing 210 including a first surface (or a front surface) 210A, a second surface (or a rear surface) 210B, and a side surface 210C surrounding the space between the first surface 210A and the second surface 210B. In another embodiment (not illustrated), the term "housing" may refer to a structure defining some of the first surface 210A, the second surface 210B, and the side surface 210C of FIG. 2. According to another embodiment, at least a portion of the first surface 210A may be configured with a substantially transparent front surface plate 202 (e.g., a glass plate and/or a polymer plate including various coating layers). The second surface 210B may be configured with a substantially opaque rear surface plate 211. The rear surface plate 211 may be made of, for example, coated and/or colored glass, ceramic, polymer, metal (e.g., aluminum, stainless steel (STS), and/or magnesium), or a combination of two or more of these materials. The side surface 210C may be configured with a side surface structure (or a "side surface bezel structure") 218 coupled to the front surface plate 202 and the rear surface plate 211 and including metal and/or polymer. In another embodiment, the rear surface plate 211 and the side surface structure 218 may be configured integrally with each other, and may include the same material (e.g., a metal material such as aluminum).

In the illustrated embodiment, the front surface plate 202 may include two first areas 210D, which are bent from the first surface 210A toward the rear surface plate 211 and extend seamlessly, at the opposite long edges thereof. In the illustrated embodiment (see FIG. 3), the rear surface plate 211 may include, at the opposite long edges thereof, two second areas 210E, which are bent from the second surface 210B toward the front surface plate 202 and extend seamlessly. In an embodiment, the front surface plate 202 (or the rear surface plate 211) may include only one of the first areas 210D (or the second areas 210E). In an embodiment, some of the first areas 210D and/or the second areas 210E may not be included. In the above-described embodiments, when viewed from a side of the electronic device 200, the side surface structure 218 may have a first thickness (or width) at the side surface side, at which the first areas 210D and/or the second areas 210E are not included, and may have a second thickness, which is smaller than the first thickness at the side surface side at which the first areas 210D and/or the second areas 210E are included.

According to another embodiment, the electronic device 200 may include at least one of a display 201, audio modules 203, 207, and 214, sensor modules 204, 216, and 219, camera modules 205, 212, and 213, key input devices 217, light-emitting elements 206, and connector holes 208 and 209. In another embodiment, at least one of the components (e.g., the key input devices 217 and/or the light-emitting elements 206) may be omitted from the electronic device 200, or other components may be additionally included in the electronic device 200.

The display 201 may be visually exposed through a substantial portion of, for example, the front surface plate 202. In another embodiment, at least a portion of the display 201 may be visually exposed through the front surface plate 202 defining the first surface 210A and the first areas 210D of the side surface 210C. In another embodiment, the edges of the display 201 may be configured to be substantially the same as the shape of the periphery of the front surface plate 202 adjacent thereto. In another embodiment (not illustrated), the distance between the periphery of the display 201 and the periphery of the front surface plate 202 may be substantially constant in order to enlarge the visually exposed area of the display 201.

In another embodiment (not illustrated), recesses and/or openings may be provided in a portion of the screen display area of the display 201, and one or more of the audio module 214, the sensor modules 204, the camera modules 205, and the light-emitting elements 206, which are aligned with the recesses or the openings, may be included. In an embodiment (not illustrated), the rear surface of the screen display area of the display 201 may include at least one of the audio modules 214, the sensor modules 204, the camera modules 205, the fingerprint sensor (i.e., fourth sensor module 216), and the light-emitting elements 206. In an embodiment (not illustrated), the display 201 may be coupled to or disposed adjacent to a touch-sensitive circuit, a pressure sensor capable of measuring a touch intensity (pressure), and/or a digitizer configured to detect an electromagnetic field-type stylus pen. In another embodiment, at least some of the sensor modules 204 and 219 and/or at least some of the key input devices 217 may be disposed in the first areas 210D and/or the second areas 210E.

The audio modules 203, 207, and 214 may include a microphone hole 203 and speaker holes 207 and 214. The microphone hole 203 may include a microphone disposed therein to acquire external sound, and in an embodiment, a plurality of microphones may be disposed therein to be able to detect the direction of sound. The speaker holes 207 and 214 may include an external speaker hole 207 and a call receiver hole (i.e., speaker hole 214). In another embodiment, while implementing the speaker holes 207 and 214 and the microphone hole 203 as a single hole, or without the speaker holes 207 and 214, a speaker (e.g., a piezo speaker) may be included.

The sensor modules 204, 216, and 219 may generate electrical signals or data values corresponding to an internal operating state of the electronic device 200 and/or an external environmental state. The sensor modules 204, 216, and 219 may include, for example, a first sensor module 204 (e.g., a proximity sensor) and/or a second sensor module (not illustrated) (e.g., a fingerprint sensor) disposed on the first surface 210A of the housing 210, and/or a third sensor module 219 (e.g., an HRM sensor), and/or a fourth sensor module 216 (e.g., a fingerprint sensor) disposed on the second surface 210B of the housing 210. The fingerprint sensor may be disposed not only on the first surface 210A (e.g., the display 201) of the housing 210, but also on the second surface 210B. The electronic device 200 may further include the sensor module 176 of FIG. 1, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and/or an illuminance sensor.

The camera modules 205, 212, and 213 may include a first camera device 205 disposed on the first surface 210A of the electronic device 200, a second camera device 212 disposed on the second surface 210B, and/or a flash 213. The camera devices 205 and 212 may include one or more lenses, an image sensor, and/or an image signal processor. The flash 213 may include, for example, a light-emitting diode and/or a xenon lamp. In another embodiment, two or more lenses (e.g., an infrared camera lens, a wide-angle lens, and a telephoto lens) and image sensors may be disposed on one surface of the electronic device 200.

The key input devices 217 may be disposed on the side surface 210C of the housing 210. In another embodiment, the electronic device 200 may not include some or all of the above-mentioned key input devices 217, and a key input device 217 not included in the electronic device 200 may be implemented in another form, such as a soft key, on the display 201. In another embodiment, the key input devices may include a sensor module 216 disposed on the second surface 210B of the housing 210.

The light-emitting elements 206 may be disposed, for example, on the first surface 210A of the housing 210. The light-emitting elements 206 provides, for example, the state information of the electronic device 200 in an optical form. In an embodiment, the light-emitting elements 206 may provide a light source that is interlocked with, for example, the operation of the camera module 205. The light-emitting elements 206 may include, for example, an LED, an IR LED, and a xenon lamp.

The connector holes 208 and 209 may include a first connector hole 208, which is capable of accommodating a connector (e.g., a USB connector) for transmitting/receiving power and/or data to/from an external electronic device, and/or a second connector hole 209, which is capable of accommodating a connector (e.g., an earphone jack) for transmitting/receiving an audio signal to/from an external electronic device.

Figure 4:
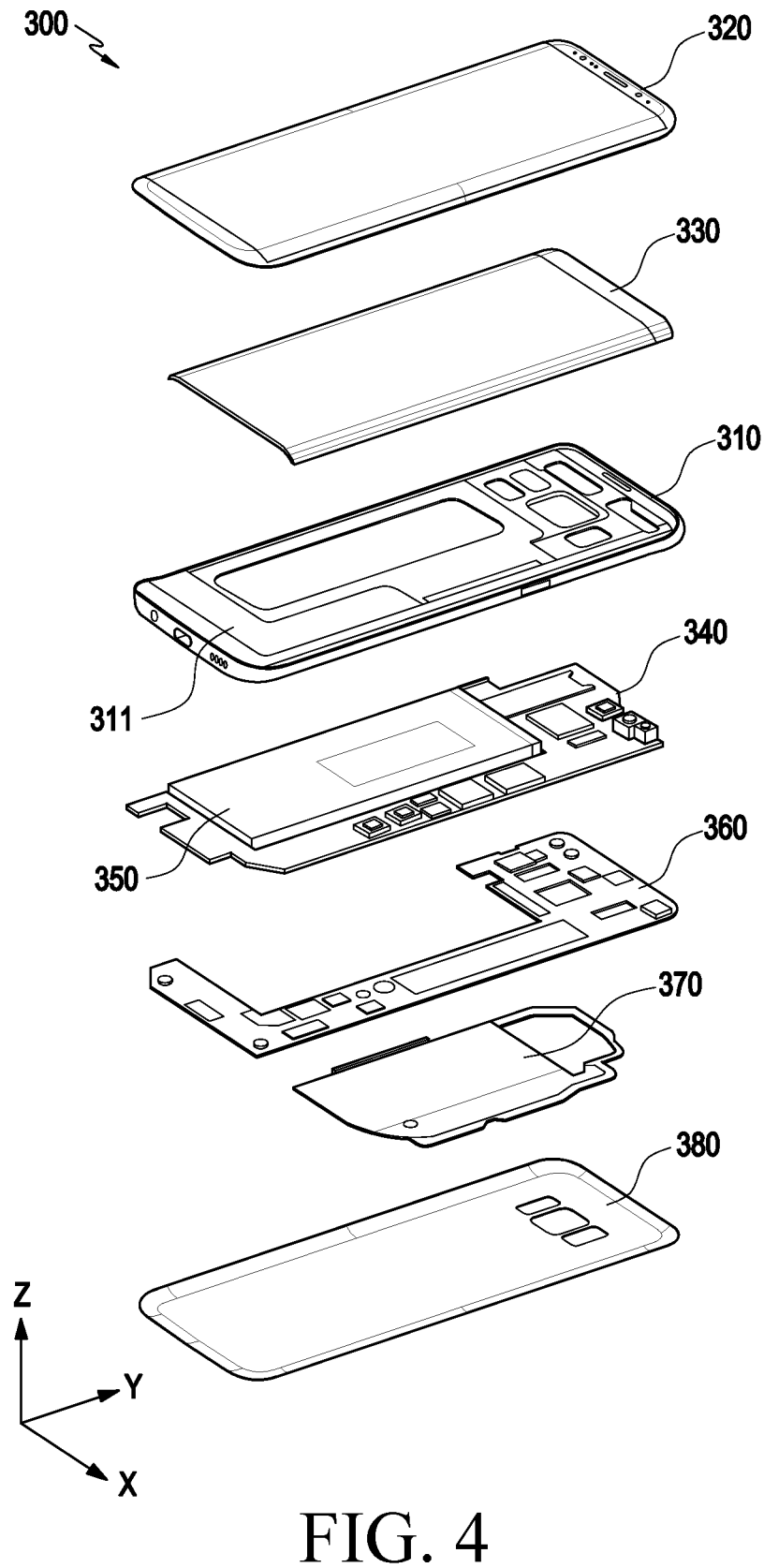
FIG. 4 is an exploded perspective view illustrating an electronic device illustrated in FIG. 2 according to an embodiment of the disclosure.

FIG. 4 is an exploded perspective view illustrating the electronic device illustrated in FIG. 2 according to an embodiment of the disclosure.

Referring to FIG. 4, an electronic device 300 (e.g., the electronic device 200 in FIG. 2 or 3) may include a side surface structure 310 (e.g., the side surface structure 218 in FIG. 2), a first support member 311 (e.g., the bracket), a front surface plate 320 (e.g., the front surface plate 202 in FIG. 2), a display 330 (e.g., the display 201 in FIG. 2), a printed circuit board 340 (e.g., a printed circuit board (PCB), a printed board assembly (PBA), a flexible PCB (FPCB), and/or a rigid-flexible PCB (RFPCB)), a battery 350, a second support member 360 (e.g., a rear case), an antenna 370, and a rear surface plate 380 (e.g., the rear surface plate 211 in FIG. 3). In an embodiment, in the electronic device 300, at least one of the components (e.g., the first support member 311 and/or the second support member 360) may be omitted, or other components may be additionally included. At least one of the components of the electronic device 300 may be the same as or similar to at least one of the components of the electronic device 200 of FIG. 2 or 3, and a redundant description thereof will be omitted below.

The first support member 311 may be disposed inside the electronic device 300, and may be connected to the side surface structure 310 or may be configured integrally with the side surface structure 310. The first support member 311 may be made of, for example, a metal material and/or a non-metal (e.g., polymer) material. The display 330 may be coupled to one surface of the first support member 311, and the printed circuit board 340 may be coupled to the other surface of the first support member 311. On the printed circuit board 340, a processor, a memory, and/or an interface may be mounted. The processor may include at least one of, for example, a central processing unit, an application processor, a graphics processor, an image signal processor, a sensor hub processor, or a communication processor.

The memory may include, for example, a volatile memory and/or a non-volatile memory.

The interface may include, for example, a high-definition multimedia interface (HDMI), a universal serial bus (USB) interface, an SD card interface, and/or an audio interface. The interface electrically and/or physically connects, for example, the electronic device 300 to an external electronic device, and may include a USB connector, an SD card/an MMC connector, and/or an audio connector.

The battery 350 is a device for supplying power to at least one component of the electronic device 300, and may include, for example, a non-rechargeable primary battery, a rechargeable secondary battery, and/or a fuel cell. At least a portion of the battery 350 may be disposed on substantially the same plane as, for example, the printed circuit board 340. The battery 350 may be integrally disposed inside the electronic device 300, or may be detachably disposed on the electronic device 300.

The antenna 370 may be disposed between the rear surface plate 380 and the battery 350. The antenna 370 may include, for example, a near-field communication (NFC) antenna, a wireless charging antenna, and/or a magnetic secure transmission (MST) antenna. For example, the antenna 370 performs short-range communication with an external device or may transmit/receive power required for charging to/from an external device in a wireless manner. In another embodiment, an antenna structure may be configured by a portion of the side surface structure 310 and/or a portion of the first support member 311, or a combination thereof.

In the following detailed description, reference may be made to the electronic devices 101, 102, 104, 200, and 300 of the preceding embodiments, and the same reference numerals in the drawings are given for components that may be easily understood through the preceding embodiments or omitted, and a detailed description thereof may also be omitted.

Figure 5:
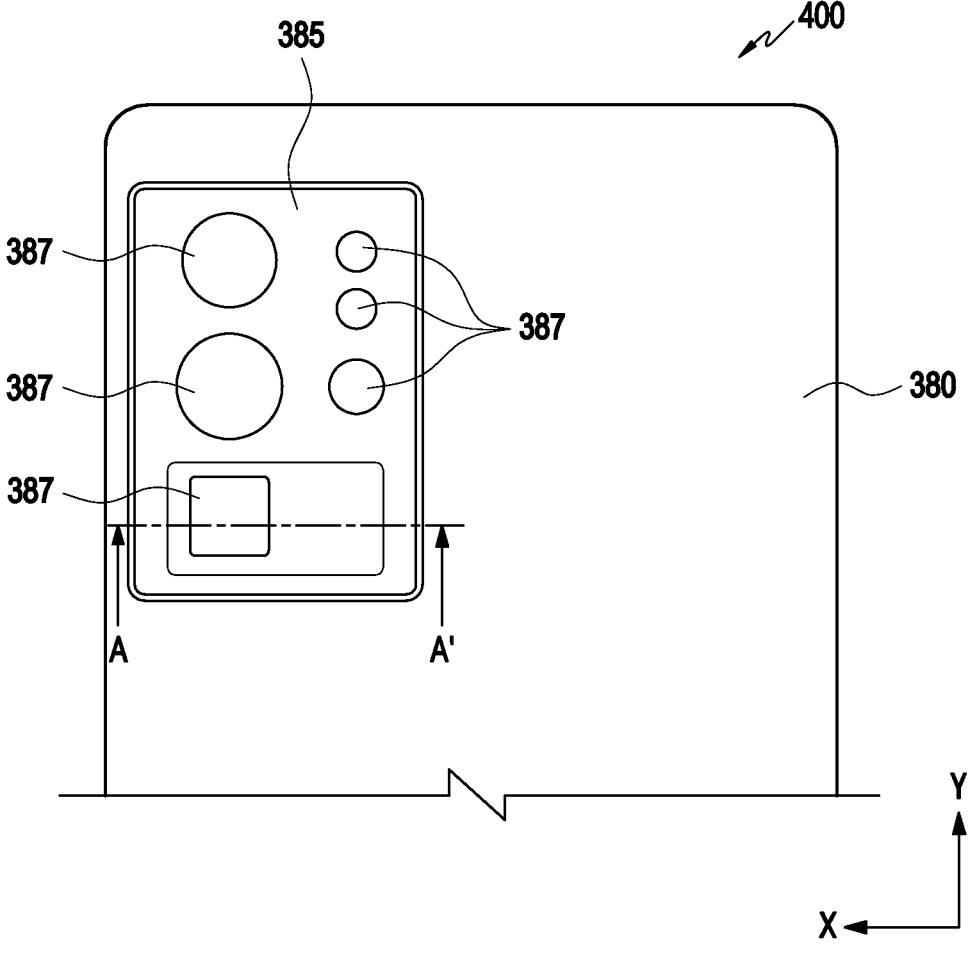
FIG. 5 is a plan view illustrating a rear surface of an electronic device according to an embodiment of the disclosure.

FIG. 5 is a plan view exemplifying the rear surface of an electronic device (e.g., the electronic device 101, 102, 104, 200, or 300 in FIGS. 1 to 4) according to an embodiment of the disclosure.

Figure 6:
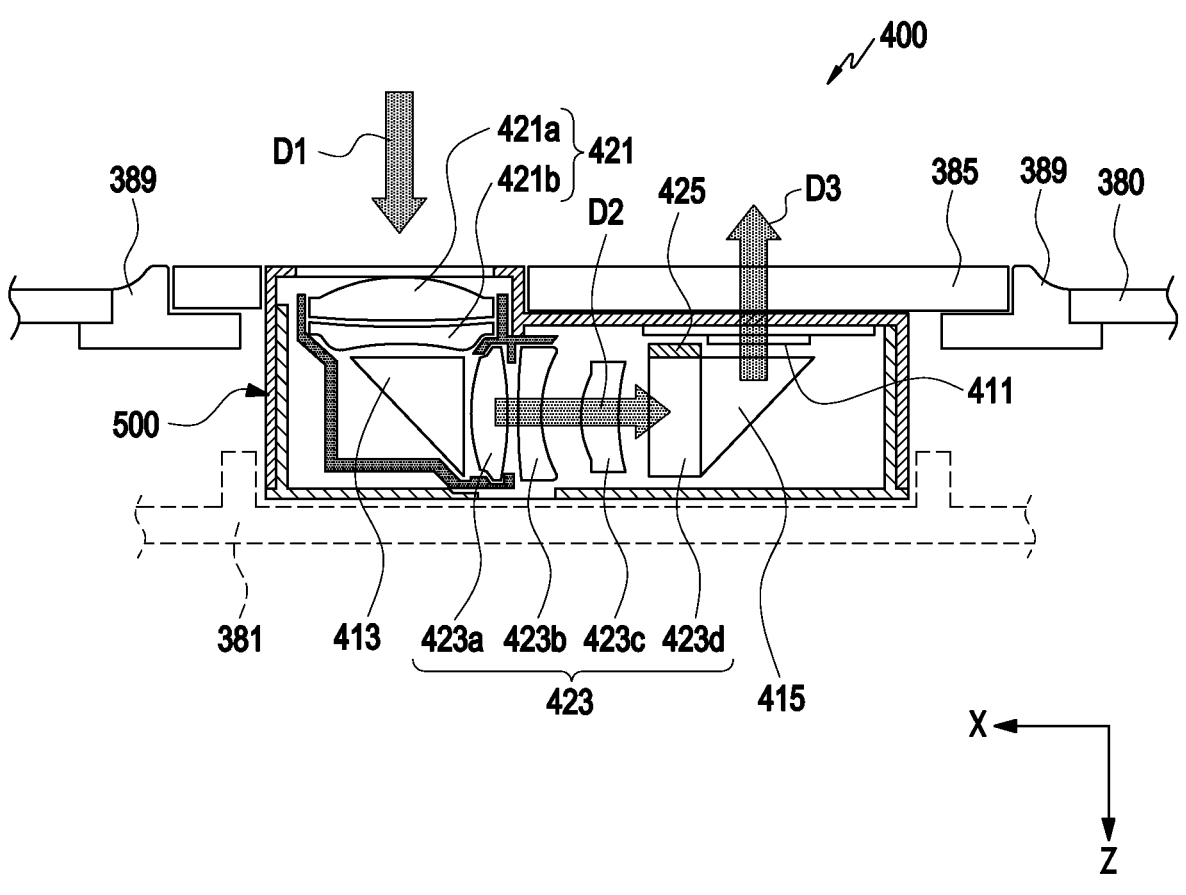
FIG. 6 is a cross-sectional view of a portion of an electronic device taken along line A-A' of FIG. 5 according to an embodiment of the disclosure.

FIG. 6 is a cross-sectional view of a portion of the electronic device taken along line A-A' of FIG. 5 according to an embodiment of the disclosure.

Figure 7:
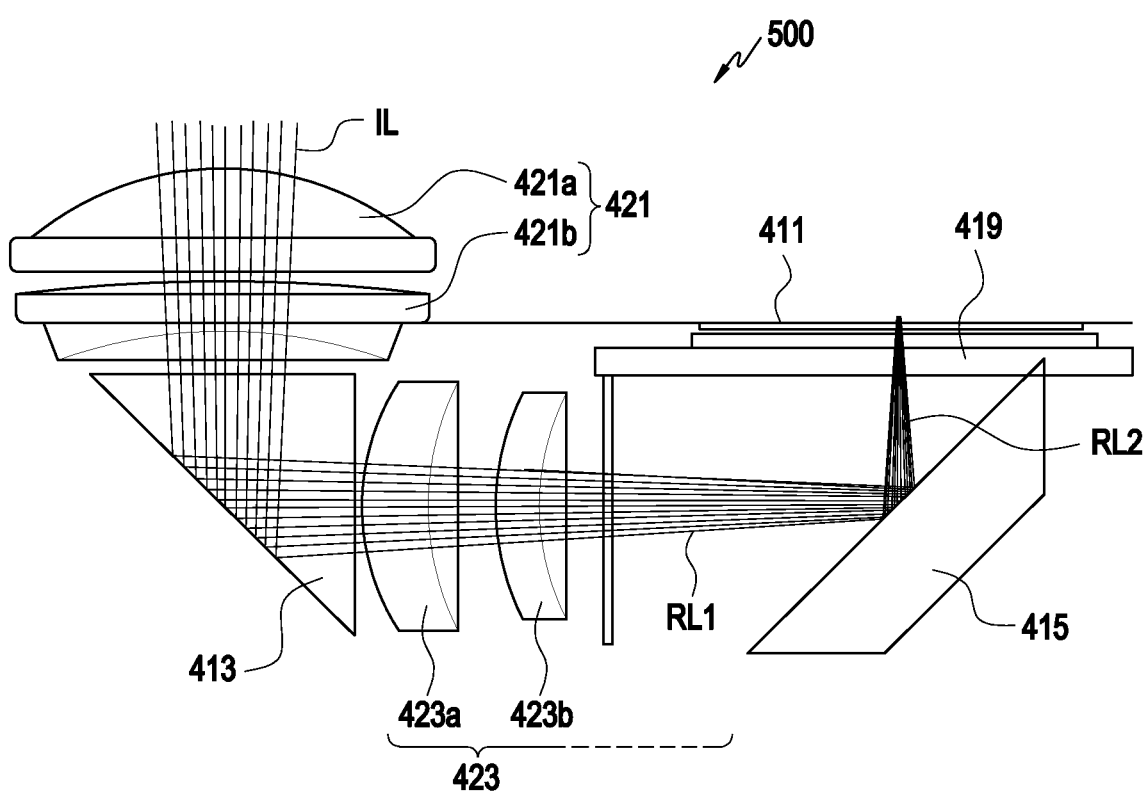
FIG. 7 is a configuration view exemplifying an optical path of a camera module in an electronic device according to an embodiment of the disclosure.

FIG. 7 is a configuration view illustrating an optical path of an image-capturing device in an electronic device according to an embodiment of the disclosure.

Referring to FIGS. 5 and 6, the electronic device 400 according to an embodiment of the disclosure may include a camera window 385 disposed on one surface (e.g., the second surface 210B in FIG. 3). In an embodiment, the camera window 385 may be a portion of the rear surface plate 380. In another embodiment, the camera window 385 may be coupled to the rear surface plate 380 via a decorative member 389, wherein, when viewed from the outside, the decorative member 389 may be exposed in the form of wrapping the periphery of the camera window 385. According to another embodiment, the camera window 385 may include a plurality of transparent areas 387, and the electronic device 400 may receive external light or transmit light to the outside through at least one of the transparent areas 387. For example, the electronic device 400 may include at least one image-capturing device 500 (e.g., the camera module 180, 205, 212, or 213 in FIGS. 1 to 3) disposed to correspond to at least some of the transparent areas 387 and at least one light source (e.g., an infrared light source) disposed to correspond to other ones of the transparent areas 387. In an embodiment, the image-capturing device 500 and/or the light source may receive external light or emit light to the outside of the electronic device 400 through any one of the transparent areas 387. In another embodiment, the electronic device 400 and/or the image-capturing device 500 may further include a camera support member 381. The camera support member 381 may allow at least one of the image-capturing device 500 and/or other lens assemblies (e.g., a wide-angle camera, an ultra-wide-angle camera, and/or a macro camera) adjacent to the image-capturing device 500 to be disposed or fixed inside the rear surface plate 380 or the camera window 385. In another embodiment, the camera support member 381 may be substantially a portion of the first support member 311 and/or the second support member 360 of FIG. 4.

According to another embodiment, the electronic device 400 may include at least one of an image-capturing device 500 and/or a wide-angle camera, an ultra-wide-angle camera, a macro camera, a telephoto camera, or an infrared photodiode as a light-receiving element, and may include a flash (e.g., the flash 213 in FIG. 3) or an infrared laser diode as a light source and/or a light-emitting element. In another embodiment, the electronic device 400 may emit an infrared laser toward a subject by using an infrared laser diode and an infrared photodiode and may receive the infrared laser reflected by the subject to detect a distance and/or depth to the subject. In another embodiment, the electronic device 400 may photograph a subject by using any one camera or two or more of the cameras in combination, and may provide illumination toward the subject by using a flash, if necessary.

According to another embodiment, among the cameras, the wide-angle camera, the ultra-wide-angle camera, and/or the close-up camera may have a smaller length in the optical axis direction of the lens(es) when compared to the telephoto camera (e.g., the image-capturing device 500). For example, in the telephoto camera (e.g., the image-capturing device 500) having a relatively large focal length, the total track length of the lens(es) 423a, 423b, and 423c is larger than those of other cameras. The "total track length" may mean a distance from the object-side surface of the first lens on the object side to the imaging surface of the image sensor 411.

As in another embodiment to be described later (e.g., the image-capturing device 600 in FIG. 8), when another optical member(s) (e.g., a mirror and/or a prism) is(are) disposed between the lens(es) and the image sensor, the "total track length" may be the distance from the object-side surface of the first lens on the object side to the sensor-side surface of the first lens on the image sensor side. In an embodiment, the wide-angle camera, the ultra-wide-angle camera, and/or the close-up camera may have substantially little effect on the thickness of the electronic device 400 even if the lens(es) is(are) arranged along the thickness (e.g., the thickness measured in the Z-axis direction of FIG. 4 or 6) direction of the electronic device 400. For example, a wide-angle camera, an ultra-wide-angle camera, and/or a close-up camera may be disposed in the electronic device 400 in the state in which a direction in which light is incident from the outside into the electronic device 400 is substantially the same as the optical axis direction of the lens(es). In another embodiment, when compared to a wide-angle camera, an ultra-wide-angle camera, and/or a close-up camera, the image-capturing device 500 (e.g., a telephoto camera) has a smaller field of view, but may be useful for photographing a subject from a farther distance, and may include more lenses 421*a*, 421*b*, 423*a*, 423*b*, and 423*c*. For example, when the lens(es) 423*a*, 423*b*, and 423*c* of the image-capturing device 500 is arranged in the thickness direction of the electronic device 400 (e.g., the Z-axis direction), the thickness of the electronic device 400 increases, or the image-capturing device 500 may substantially protrude to the outside of the electronic device 400. In another embodiment of the disclosure, the image-capturing device 500 may include at least one refractive member 413 or 415 that reflects and/or refracts incident light IL in different directions. In implementing a telephoto function, the lenses 423*a*, 423*b*, and 423*c* may be arranged to move forward or backward in the incident direction of light or the traveling direction of reflected or refracted light, thereby suppressing or reducing the increase of the thickness of the electronic device 400.

Referring to FIGS. 6 and 7, the folded camera (e.g., the image-capturing device 500) may include a first refractive member 413, a second refractive member 415, an image sensor 411, and/or at least one lens system (e.g., the second lens group 423 including the second lenses 423*a*, 423*b*, and 423*c* and/or the dummy member 423*d*). In another embodiment, the at least one optical member may guide or focus, to the second refractive member 415, light RL1 reflected and/or refracted by the first refractive member 413, and may block the light RL1 reflected and/or refracted by the first refractive member 413 from being directly incident on the image sensor 411.

According to another embodiment, the first refractive member 413 may include, for example, a prism and/or a mirror. For example, the first refractive member 413 is configured as a prism including at least one mirror. For example, the first refractive member 413 is configured as a prism having at least one surface including a mirror. In another embodiment, the first refractive member 413 may reflect and/or refract light IL, which is incident in a first direction DB1, in a second direction DB2 crossing the first direction DB1. The first direction DB1 may mean, for example, the direction in which light IL is incident on the electronic device 400 and/or the image-capturing device 500 from the outside through any one of the transparent areas 387 of FIG. 5 when photographing a subject. In another embodiment, the first direction DB1 may mean a photographing direction, a direction toward a subject, a direction toward which the image-capturing device 500 is directed, and/or a direction parallel thereto. In another embodiment, the first direction D1 may be parallel to the thickness direction of the electronic device 400 and/or the Z-axis direction.

According to another embodiment, the second refractive member 415 may include, for example, a prism and/or a mirror. For example, the second refractive member 415 is configured as a prism including at least one mirror. For example, the second refractive member 415 is configured as a prism having at least one surface including a mirror. In another embodiment, the second refractive member 415 may reflect and/or refract light RL1, which is reflected and/or refracted by the first refractive member 413 and is incident in the second direction D2, in the third direction DB3 crossing the second direction D2. In another embodiment, the third direction D3 may be substantially perpendicular to the second direction D2. For example, the third direction D3 means a direction parallel to the Z-axis direction. However, an embodiment of the disclosure is not limited thereto, and the third direction D3 may be a direction inclined with respect to the second direction D2 or the X-Y plane according to the arrangement of the image-capturing device 500 and/or the second refractive member 415 in the electronic device 400 and the specifications of the same. In another embodiment, the third direction D3 may be substantially parallel to the first direction D1.

According to another embodiment, the image sensor 411 may be configured to detect the light RL2, which is reflected and/or refracted by the second refractive member 415 and is incident along the third direction D3. For example, the light IL incident from the outside is detected by the image sensor 411 via the first refractive member 413 and the second refractive member 415, and the electronic device 400 and/or the image-capturing device 500 may acquire a subject image based on a signal and/or information detected by the image sensor 411. In another embodiment, the image sensor 411 may be disposed substantially parallel to the X-Y plane. For example, when the image-capturing device 500 has an optical image stabilization function of a structure that shifts the image sensor 411, the image sensor 411 moves horizontally in a plane perpendicular to the first direction D1 and/or the third direction D3.

According to another embodiment, in performing the optical image stabilization function, the image sensor 411 may be shifted in the length direction of the electronic device 400 (e.g., the Y-axis direction) and/or the width direction of the electronic device 400 (e.g., the X-axis direction). For example, by disposing the image sensor 411 on a plane perpendicular to the first direction D1 and/or the third direction D3, it is easy to increase the size of the image sensor 411 in an electronic device having a small thickness (e.g., a thickness within about 10 mm) and/or to secure a space for the optical image stabilization operation. In another embodiment, when the image-capturing device 500 is used as a telephoto camera, the quality of a captured image may be further enhanced by being provided with the optical image stabilization function. In another embodiment, when the image sensor 411 is enlarged, the performance of the image-capturing device 500 may be further enhanced.

According to another embodiment, the image-capturing device 500 may further include a lens system (e.g., a first lens group 421 including one or more lenses 421*a* and 421*b*) configured to guide and/or focus the light IL, which is incident in the first direction D1, to the first refractive member 413. In another embodiment, the first lens group 421 and/or the first lens (e.g., the first lens 421*a*) disposed on the object side in the image-capturing device 500 may have a positive refractive power. For example, by config-
uring the first lens 421*a* to focus and/or align the light IL,
which is incident from the outside, to the first refractive
member 413, the optical system from the first lens 421*a* to
the image sensor 411 is downsized. According to another
embodiment, the first lens group 421 may further include an
additional first lens(es) 421*b* in order to focus and/or align
light incident from the outside.

According to another embodiment, the second lens group
423 may include a dummy member 423*d* and a light
blocking member 425. The dummy member 423*d* may have,
for example, a cylinder shape disposed inside the image-
capturing device 500 and/or the electronic device 400 and
extending along the second direction D2, and may transmit
the light RL1, which travels along the second direction D2.
In another embodiment, the dummy member 423*d* may be
one lens having a positive and/or negative refractive power.
In another embodiment, the dummy member 423*d* may be a
component integrated with any one of the second lenses
423*a*, 423*b*, and 423*c* and/or the second refractive member
415.

According to another embodiment, the light blocking
member 425 may be provided and/or disposed on at least a
portion of the outer peripheral surface of the dummy mem-
ber 423*d*, and may absorb, scatter, or reflect light. The light
blocking member 425 may be provided by performing, for
example, etching or black lacquer processing, and/or print-
ing and/or depositing a reflective layer on at least a portion
of the outer peripheral surface of the dummy member 423*d*.
In another embodiment, some of the light reflected and/or
refracted by the first refractive member 413 may be
absorbed, scattered, and/or reflected by the light blocking
member 425. In another embodiment, the light blocking
member 425 may substantially block the light, which is
reflected and/or refracted by the first refractive member 413,
from being direct incident into the image sensor 411 without
passing through the second lens group 423 and/or the second
refractive member 415. For example, the light sequentially
passing through the first direction D1, the second direction
D2, and/or the third direction D3 in the image-capturing
device 500 (e.g., the light following the paths indicated by
"IL," "RL1," and "RL2 " in FIG. 7) is incident on the image
sensor 411, and light traveling along another path may be
substantially blocked from being incident into the image
sensor 411.

According to another embodiment, at least one of the
second lenses 423*a*, 423*b*, and 423*c* may move forward and
backward between the first refractive member 413 and the
second refractive member 415 along substantially the same
axis as the second direction D2. For example, the electronic
device 400 and/or the image-capturing device 500 moves the
at least one of the second lens 423*a*, 423*b*, and 423*c* forward
and backward about an axis substantially the same as the
second direction D2, thereby executing focal length adjust-
ment and/or focus adjustment. A downsized electronic
device such as a smartphone may have a thickness of about
10 mm, and in this case, a range in which the lens is movable
forward and backward in the thickness direction may be
limited.

According to an embodiment, the second direction D2
may be substantially parallel to the length direction (e.g., the
Y-axis direction in FIG. 4), the width direction (e.g., the
X-axis direction of FIG. 4), and/or the X-Y plane, and the
range in which at least one of the second lenses 423*a*, 423*b*,
and 423*c* is move forward and backward may be large,
compared to a general wide-angle camera that moves for-
ward and backward in the Z-axis direction for focus adjustment. For example, since at least one of the second lens
423*a*, 423*b*, and 423*c* moves forward and backward along an
axis substantially the same as the second direction D2, the
telephoto performance is improved in the image-capturing
device 500, and thus the degree of freedom in design in
securing a space for forward and backward movement for
focal length adjustment and/or focus adjustment may be
improved.

According to an embodiment, the electronic device 400
and/or the image-capturing device 500 may further include
an infrared blocking filter 419. In another embodiment, the
infrared blocking filter 419 may suppress or substantially
block infrared or near-infrared wavelength band light from
being incident into the image sensor 411, and may be
disposed at any position in the optical path between the first
lens 421*a* and the image sensor 411. In another embodiment,
by disposing the infrared blocking filter 419 at a position
close to the image sensor 411 (e.g., between the image
sensor 411 and the second refractive member 415), it is
possible to suppress and/or prevent the infrared blocking
filter 419 from being visually exposed to the outside. In
another embodiment, the first refractive member 413, the
second refractive member 415, and/or the at least one optical
member (e.g., the second lens group 423) may include an
infrared blocking coating layer, in which case the infrared
blocking filter 419 may be omitted. In another embodiment,
the infrared blocking coating layer may be provided on at
least one of the image sensor-side surface and the object-side
surface of the dummy member 423*d* and/or the second
refractive member 415. Accordingly, the image sensor 411
may detect light that substantially passes through the infra-
red blocking filter 419 (or the infrared blocking coating
layer). The refractive members 413 and 415 of the disclosure
may be selectively designed according to the structure of the
image-capturing device 500. For example, in an embodi-
ment, the refractive member (e.g., the second refractive
member 415 in FIG. 6) has a triangular prism shape. In
another embodiment, the refractive member (e.g., the second
refractive member 415 in FIG. 7) may have a trapezoidal
columnar shape. The shapes of the refractive members 413
and 415 are not limited to the structures illustrated in this
disclosure. For example, when the refractive members 413
and 415 reflect, refract, or transmit light, the refractive
members 413 and 415 may have a shape other than the
triangular prism shape or the trapezoidal columnar shape. In
another embodiment, the types of refractive members 413
and 415 to be disposed may be determined in various ways.
For example, the refractive member (e.g., the second refrac-
tive member 415 of FIG. 6) to be disposed is a prism. For
example, the refractive member (e.g., the second refractive
member 415 of FIG. 7) to be disposed is a mirror. For
example, the refractive members 413 and 415 includes a
substantially transparent material. For example, the refrac-
tive members 413 and 415 is made of glass.

Figure 8:
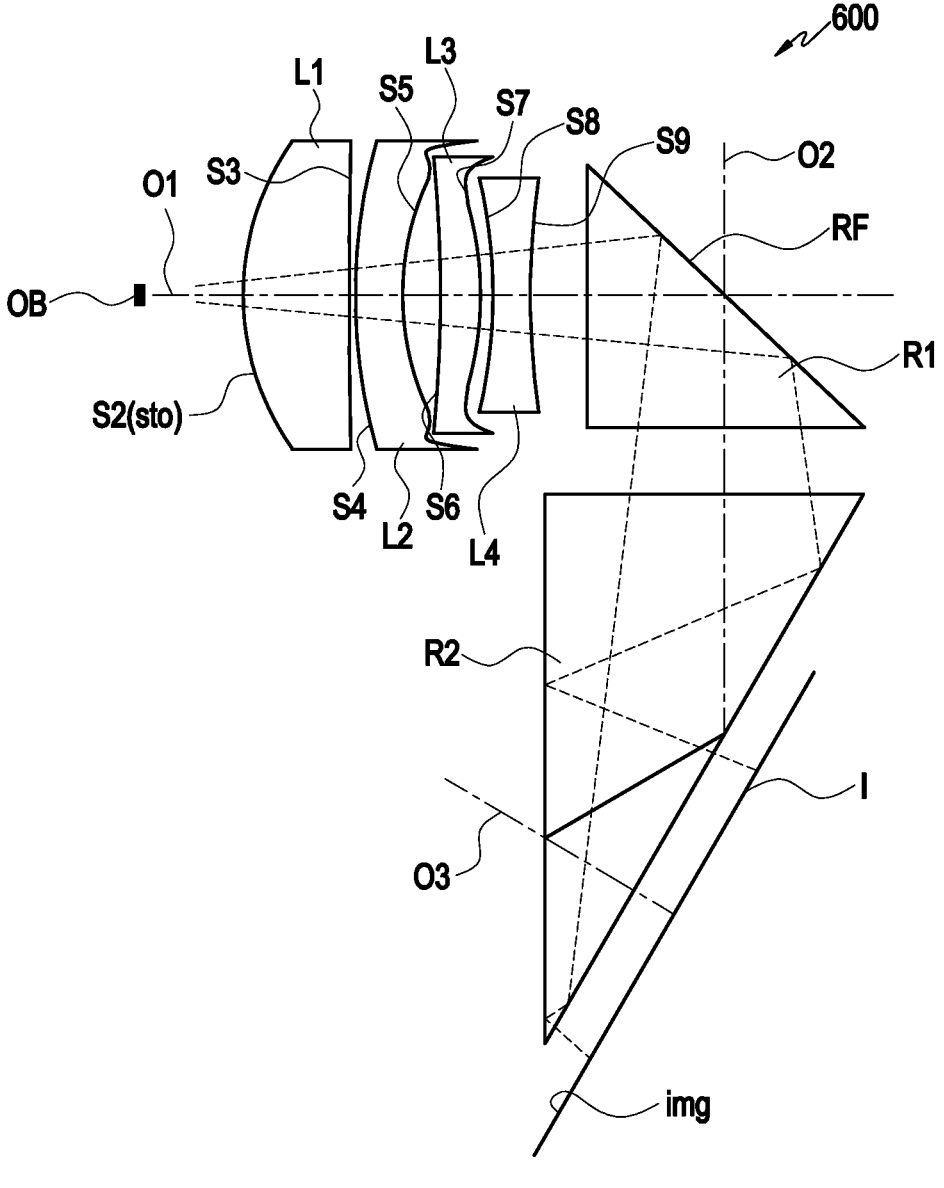
FIG. 8 is a view illustrating an image-capturing device according to an embodiment of the disclosure.

FIG. 8 is a view illustrating an image-capturing device-
600 (e.g., the camera module 180, 205, 212, or 213 in FIGS.
1 to 3 or the image-capturing device 500 in FIG. 6) accord-
ing to an embodiment of the disclosure.

Figure 9:
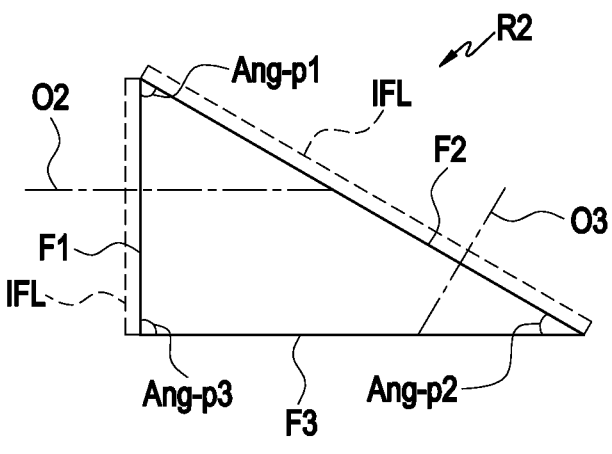
FIG. 9 is a view illustrating a second optical member of the image-capturing device of FIG. 8 according to an embodiment of the disclosure.

FIG. 9 is a view illustrating a second optical member R2
of the image-capturing device of FIG. 8 according to an
embodiment of the disclosure.

Figure 10:
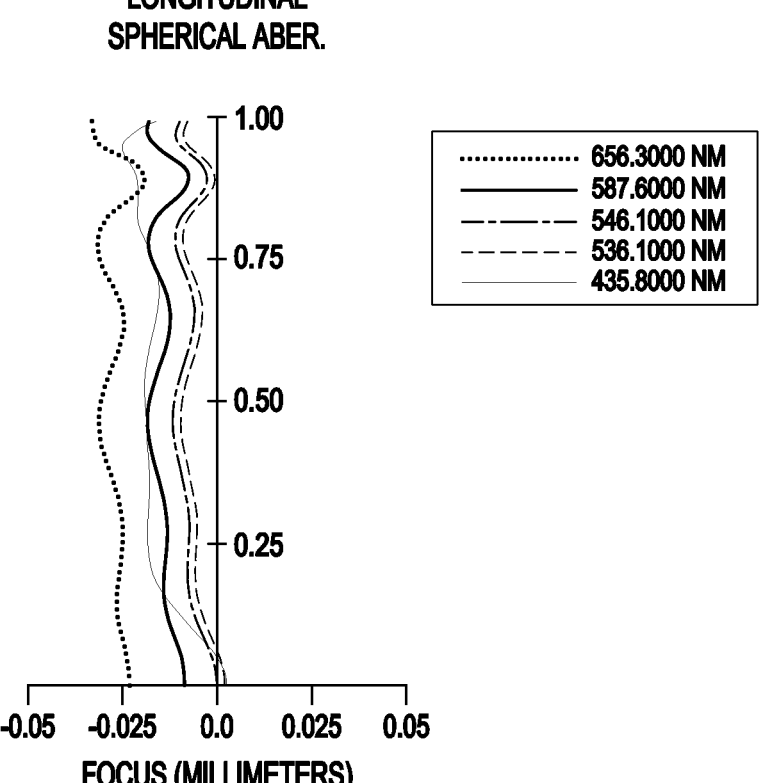
FIG. 10 is a graph showing spherical aberration of the image-capturing device of FIG. 8 according to an embodiment of the disclosure.

FIG. 10 is a graph showing spherical aberration of the
image-capturing device of FIG. 8 according to an embodi-
ment of the disclosure.

Figures 11, 12:
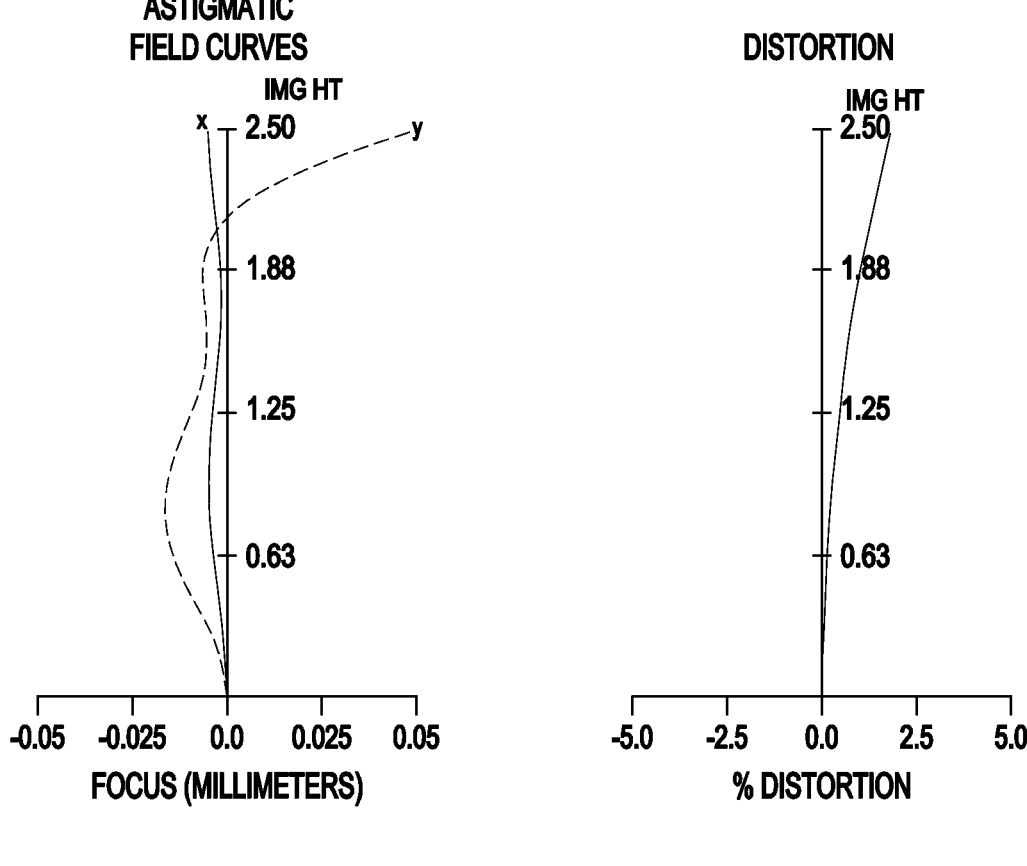
FIG. 11 is a graph showing astigmatism of the image-capturing device of FIG. 8 according to an embodiment of the disclosure.
FIG. 12 is a graph showing distortion rate of the image-capturing device of FIG. 8 according to an embodiment of the disclosure.

FIG. 11 is a graph showing astigmatism of the image-
capturing device of FIG. 8 according to an embodiment of
the disclosure.

FIG. 12 is a graph showing distortion rate of the image-capturing device of FIG. 8 according to an embodiment of the disclosure.

FIG. 10 is a graph showing spherical aberration of the image-capturing device 600 according to an embodiment of the disclosure, in which the horizontal axis represents a longitudinal spherical aberration coefficient, and the vertical axis represents a normalized distance from an optical axis. A change in longitudinal spherical aberration according to a wavelength of light is illustrated in FIG. 10. Longitudinal spherical aberration is indicated for light having each of wavelengths of, for example, 656.3000 (nanometer (NM)), 587.6000 (NM), 546.1000 (NM), 536.1000 (NM), and 435.8000 (NM). FIG. 11 is a graph showing astigmatism (astigmatic field curves) of the image-capturing device 600 according to one of embodiments of the disclosure for light having a wavelength of 546.1000 (NM), in which "x" illustrates a sagittal plane, and "y" illustrates a tangential plane (meridional plane). FIG. 12 is a graph showing distortion rate of the image-capturing device 600 according to an embodiment of the disclosure, for light having a wavelength of 546.1000 (NM). In the following description, the image-capturing device 600 has a structure including optical members R1 and R2 disposed between lenses L1, L2, L3, and L4 and the image sensor (I). It is noted that, depending on the number of times light is reflected and/or refracted by the optical members R1 and R2, the negative and the positive may be reversed in the graphs of spherical aberration, astigmatism, and/or distortion rate. In describing the embodiment(s) of the disclosure, optical data such as "total track length" or "focal length" may illustrate values in the state in which the optical members R1 and R2 are not included. For example, the first optical member R1 and/or the second optical member R2 may change the light traveling path by performing reflection and/or refraction, and may not substantially affect the optical performance (e.g., focal length, F-number and/or field of view) of the image-capturing device 600.

Referring to FIGS. 8 and 9, the image-capturing device 600 (e.g., the camera module 180, 205, 212, or 213 in FIGS. 1 to 3 and/or the image-capturing device 500 in FIG. 6) may include at least two lenses L1, L2, L3, and L4, an image sensor I, and a plurality of optical members R1 and R2 disposed between the image sensor I and the at least two lenses (hereinafter, "lenses L1, L2, L3, and L4"). In FIG. 8, "S2" may denote the object-side surface of the first lens L1 among the lenses L1, L2, L3, and L4, and "S3" may denote the sensor-side surface of the first lens L1. When "sto" is added to a reference number indicating a lens surface, it may indicate that an aperture is implemented on the corresponding lens surface. For example, in the image-capturing device 600 of FIG. 8, a diaphragm is disposed on the object-side surface of the first lens L1. In an embodiment, "S4" may denote the object-side surface of the second lens L2 among the lenses L1, L2, L3, and L4, and "S5" may denote the sensor-side surface of the second lens L2. In another embodiment, "S6" may denote the object-side surface of the third lens L3 among the lenses L1, L2, L3, and L4, and "S7" may denote the sensor-side surface of the third lens L3. In another embodiment, "S8" may denote the object-side surface of the fourth lens L4 among the lenses L1, L2, L3, and L4, and "S9" may denote the sensor-side surface of the fourth lens L4. Tables 2, 5, 8, 11, and 14 regarding lens data will be reviewed below, but reference numerals of lens surfaces not indicated in the drawings may be presented, and reference numerals "S10 to S15" in the tables regarding lens data may refer to the surface(s) of the first optical member R1 and/or the second optical member R2.

According to another embodiment, the plurality of optical members R1 and R2 may reflect, refract, and/or guide the light, which is incident in one direction (e.g., in the direction of a second optical axis O2), in another direction (e.g., in the direction of a third optical axis O3). For example, among the plurality of optical members R1 and R2, the first optical member R1 (e.g., the first reflection surface RF) reflects, refracts, and/or guides the light, which is incident through the lenses L1, L2, L3, and L4, to the second optical member R2. In another embodiment, the second optical member R2 may guide the light, which is incident through the first optical member R1, to the image sensor I. According to another embodiment, the image-capturing device 600 may further include an infrared blocking layer IFL. For example, the infrared blocking layer IFL is disposed on one of an incidence surface F1 and an emission surface F2 of the second optical member R2. In an embodiment, the infrared blocking layer IFL may be provided on one of the surfaces of the first optical member R1 or a surface of one of the lenses L1, L2, L3, and L4. According to another embodiment, as illustrated in an image-capturing device 700 of FIG. 13, an infrared blocking filter IF may be provided in addition to the lenses L1, L2, L3, and L4 or the optical members R1 and R2. In another embodiment, when the infrared blocking filter IF is additionally provided, no infrared blocking layer IFL may be disposed on the lenses L1, L2, L3, and L4 and/or the optical members R1 and R2.

According to another embodiment, at least two (e.g., four) lenses L1, L2, L3, and L4 may be sequentially arranged along the direction of the first optical axis O1 from the object OB side. In another embodiment, the first optical axis O1 may be disposed to be substantially parallel to the front surface (e.g., the first surface 210A in FIG. 2) and/or the rear surface (e.g., the second surface 210B in FIG. 3) of the electronic device (e.g., the electronic device 101, 200, 300, or 400 in FIGS. 1 to 6). For example, even if the thickness of the electronic device 400 is reduced, the degree of freedom in design is high in the number and arrangement of lenses L1, L2, L3, and L4. According to another embodiment, the electronic device 400 (e.g., the processor 120 in FIG. 1) and/or the image-capturing device 600 may cause at least one of the lenses L1, L2, L3, and L4 to move forward and backward along the direction of the first optical axis O1. For example, by moving at least one of the lenses L1, L2, L3, and L4 along the direction of the first optical axis O1, the focal length adjustment and/or the focus adjustment is performed. In another embodiment, the electronic device 400 (e.g., the processor 120 in FIG. 1) and/or the image-capturing device 600 may perform an optical image stabilization operation by causing at least one of the lenses L1, L2, L3, and L4 to move in a plane perpendicular to the first optical axis O1. From the description "move in a plane perpendicular to the first optical axis O1," it may be understood that the lens(es) L1, L2, L3, and L4 moves along at least two directions perpendicular to the first optical axis O1. The "at least two directions" may be, for example, directions perpendicular to each other.

According to another embodiment, the image sensor I may be configured to cause the image-capturing device 600 and/or the electronic device 400 including the same to acquire an image of a subject by receiving light guided and/or focused light through the lenses L1, L2, L3, and L4. For example, the second optical axis O2 is disposed to be substantially parallel to the front surface (e.g., the first surface 210A in FIG. 2) and/or the rear surface (e.g., the second surface 210B in FIG. 3) of the electronic device (e.g., the electronic device 101, 200, 300, or 400 in FIGS. 2 to 6 ). In another embodiment, the imaging surface img of the image sensor I may be disposed in a direction crossing the first optical axis O1. For example, the imaging surface img of the image sensor I may form an acute angle and/or an obtuse angle with the first optical axis O1. In another embodiment, from the description "the imaging surface img may be disposed in a direction crossing the first optical axis O1," it may be understood that the imaging surface img is disposed to be inclined with respect to the X axis, the Y axis and/or the Z axis of FIGS. 2 to 6. In another embodiment, since the image sensor I may be disposed in various directions with respect to the alignment directions of the lenses L1, L2, L3, and L4, the degree of freedom in design may be enhanced in manufacturing the image-capturing device 600 and/or the electronic device 400 including the same.

According to another embodiment, the optical members R1 and R2 may reflect and/or refract light incident thereon to change the traveling direction of the light. For example, by disposing the optical members R1 and R2 between the lenses L1, L2, L3, and L4 and the image sensor I, the degree of freedom in design may be enhanced in laying out the lenses L1, L2, L3, and L4 and the image sensor I. Of the optical members R1 and R2, the first optical member R1 may be disposed between the lenses L1, L2, L3, and L4 and the image sensor I, and may receive light incident through the lenses L1, L2, L3, and L4 in the direction of the first optical axis O1. In another embodiment, the first optical member R1 may reflect and/or refract light incident through the lenses L1, L2, L3, and L4 in the direction of the first optical axis O1, thereby emitting the light along the direction of the second optical axis O2 crossing the first optical axis O1. In the illustrated embodiment, the second optical axis O2 is exemplified for convenience of description, and the embodiment(s) of the disclosure are not limited thereto. The second optical axis O2 may be defined differently depending on an embodiment and/or the structure of the image-capturing device 600 to be actually manufactured. In another embodiment, the first optical member R1 may include a mirror and/or a prism.

It is noted that, although the first optical member R1 and the second optical member R2 are exemplified as independent components in a disclosed embodiment, the embodiment(s) of the disclosure are not limited thereto. For example, the first optical member R1 and the second optical member R2 is integrally configured. In an embodiment, the emission surface of the first optical member R1 and the incidence surface F1 of the second optical member R2 may be configured in a combined form. For example, an integrally configured optical member (not illustrated) includes a mirror and/or a prism. For example, the integrally configured optical member (not illustrated) is configured as a prism including at least one mirror. For example, an integrally configured optical member (not illustrated) is configured as a prism in which one surface includes a mirror and at least a portion of another surface includes a mirror.

According to another embodiment, among the plurality of optical members R1 and R2, the first optical member R1 may be disposed between the lenses L1, L2, L3, and L4 and the second optical member R2. In another embodiment, the first optical member R1 may reflect and/or refract light incident through the lenses L1, L2, L3, and L4 in the direction of the first optical axis O1, thereby emitting the light along the direction of the second optical axis O2 substantially perpendicular to the first optical axis O1. According to another embodiment, the angle at which the second optical axis O2 is inclined with respect to the first optical axis O1 may be implemented to be about 80 degrees or more and about 100 degrees or less.

According to another embodiment, among the plurality of optical members R1 and R2, the second optical member R2 may be disposed between the first optical member R1 and the image sensor I. For example, the second optical member R2 receives light incident through the first optical member R1 in the direction of the second optical axis O2 and may emit the light to the image sensor I along the direction of the third optical axis O3 crossing the second optical axis O2. In another embodiment, the third optical axis O3 may be disposed to be inclined at an angle other than perpendicular to the first optical axis O1. In another embodiment, the third optical axis O3 may be disposed to be inclined at an angle other than perpendicular to the second optical axis O2. In another embodiment, the third optical axis O3 may be disposed to be substantially parallel to the first optical axis O1 and to be inclined at an angle other than perpendicular to the second optical axis O2. In this way, the angles at which the optical axes O1, O2, and O3 are inclined with respect to each other may be designed in various ways depending on embodiments. For example, the relative arrangement of the optical axes O1, O2, and O3 may vary depending on the relative arrangement of the imaging surface img with respect to the first optical axis O1, or the structure of the image-capturing device 600 and/or the electronic device 400 to be actually manufactured.

According to another embodiment, the second optical member R2 may include a prism. In an embodiment, the second optical member R2 may include a first surface (e.g., the incidence surface F1) facing the first optical member R1. For example, the incidence surface 1 is perpendicular to the second optical axis O2. Note, however, that the embodiment(s) of the disclosure are not limited thereto. In another embodiment, the second optical member R2 may include a second surface (e.g., the emission surface F2 ) facing the image sensor I. For example, the emission surface F2 is connected to the incidence surface F1 in an inclined state to form a first angle Ang-p1 with respect to the incidence surface F1. In another embodiment, the emission surface F2 may provide a total internal reflection environment for incident light (e.g., the light incident on the incidence surface F1 along the direction of the second optical axis O2). For example, the emission surface F2 may reflect (or refract) incident light by being inclined at a predetermined angle with respect to the second optical axis O2. Conditions for the inclination angle of the emission surface F2 with respect to the second optical axis O2 will be reviewed with reference to Equation 2 to be described below. As described above, the emission surface F2 may at least partially function as a reflector inside the second optical member. In another embodiment, the second optical member R2 may include a second reflection surface F3 interconnecting the emission surface F2 and the incidence surface F1. For example, the second reflection surface F3 is connected to the emission surface F2 in the state of forming a second angle Ang-p2, and may be connected to the incidence surface F1 in the state of forming a third angle Ang-p3. In another embodiment, when the second reflection surface F3 is disposed substantially parallel to the second optical axis O2, the inclination angle of the emission surface F2 with respect to the second optical axis O2 may be defined as the second angle Ang-p2.

According to another embodiment, the light reflected by the emission surface F2 inside the second optical member R2 may be emitted to the outside through the emission surface F2 after being reflected (or refracted) again by the second reflection surface F3. For example, when the incidence angle is smaller than a predetermined angle, the emission surface F2 may provide a total internal reflection environment, and when the incidence angle is greater than the predetermined angle, the emission surface F2 may transmit light. In this way, light incident on the second optical member R2 may be reflected at least twice and emitted to the image sensor I through the emission surface F2 . In another embodiment, when the image-capturing device 600 has a structure including an infrared blocking layer IFL, the infrared blocking layer IFL may be disposed on at least a portion of a surface of the second optical member R2 (e.g., the incidence surface F1 and/or the emission surface F2). The position and size of the infrared blocking layer IFL may be variously selected in consideration of the path of light passing through the second optical member R2. In another embodiment, the infrared blocking layer IFL may be disposed on at least one of the incidence surface F1 and the emission surface F2.

According to another embodiment, the electronic device 400 (e.g., the processor 120 in FIG. 1) and/or the image-capturing device 600 may execute optical image stabilization by rotating or tilting at least one of the optical members R1 and R2 (e.g., the first optical member R1) with respect to the first optical axis O1. The "tilting operation" may include, for example, an operation of rotating the first optical member R1 around an arbitrary axis crossing the first optical axis O1. The central axis of the tilting operation may be variously configured depending on the structure of the image-capturing device 600 and/or the electronic device 400 to be actually manufactured.

According to another embodiment, the image-capturing device 600 may further include another optical member (e.g., the first refractive member 413 in FIG. 6) disposed on the object OB side rather than the lenses L1, L2, L3, and L4. For example, a direction in which light is incident to the electronic device 400 and/or the image-capturing device 600 is different from that of the first optical axis O1. As described above, when the components described above and/or to be described below regarding the image-capturing device 600 of FIG. 8 are satisfied, other components of the embodiments disclosed herein (e.g., the first lens group 421, the first refractive member 413, the dummy member 423d, and/or the light blocking member 425 in FIG. 6) may be selectively combined to implement additional embodiments.

According to another embodiment, the image-capturing device described above and/or to be described below (e.g., the image-capturing device 600, 700, 800, 900, 1000, or 1100 in FIGS. 8, 13, 17, 21 and/or 25) may satisfy the condition of Equation 1 below.

$$0.1 \le \frac{TTL}{f} \le 0.35 \qquad \text{Equation (1)}$$

"TTL" is a length from the object-side surface S2 of the first lens on the object OB side (e.g., the first lens L1) among the lenses L1, L2, L3, and L4 and the sensor-side surface S9 of the first lens on the image sensor I side (e.g., the fourth lens L4), and may be understood as a "total track length." In a structure in which the optical members R1 and R2, which change the light traveling path between the lenses L1, L2, L3, and L4 and the image sensor I are not arranged, the "total track length" may be understood as the distance from the object-side surface of the first lens on the object OB side to the imaging surface of the image sensor. In Equation 1, "f" may be a focal length (e.g., an effective focal length) of the image-capturing device 600. When the condition of Equation 1 is not satisfied, for example, when the value of Equation 1 is smaller than 0.1, the total track length becomes smaller, and thus it may be difficult to arrange the lenses L1, L2, L3, and L4 and to secure good optical performance. When the value of Equation 1 is greater than 0.35, the total track length increases, and thus it may be difficult to mount the image-capturing device 600 in a downsized electronic device.

According to another embodiment, the lens assemblies 600, 700, 800, 900, 1000, and 1100 described above and/or to be described below may satisfy the condition of Equation 2 below.

$$15 \le \text{Ang-min} \le 40 \qquad \text{Equation (2)}$$

"Ang-min" is the smallest angle among the angles formed by two adjacent surfaces of the second optical member R2 (e.g., the first angle Ang-p1, the second angle Ang-p2, and/or the third angle Ang-p3). In the embodiment of FIG. 8 and/or the embodiment of FIG. 9, the second angle Ang-p2 may be the "Ang-min" in Equation 2. When the angle value of Equation 2 is smaller than 15 degrees, the size of the second optical member R2 increases, which may make downsizing difficult. In an embodiment, when the value of Equation 2 is greater than 40 degrees, reflection performance of the emission surface F2 inside the second optical member R2 may be lowered. For example, when the condition of Equation 2 is satisfied, the emission surface F2 inside the second optical member R2 totally reflects light incident along the direction of the second optical axis O2. According to another embodiment, in the second optical member R2, when the third angle Ang-p3 is a right angle and the second angle Ang-p2 is "Ang-min," the second angle Ang-p3 may be implemented as an angle of about 25 degrees or more and about 35 degrees or less. According to another embodiment, the third angle Ang-p3 of the second optical member R2 may be implemented as an angle of about 75 degrees or more and about 105 degrees or less.

According to another embodiment, the lens assemblies 600, 700, 800, 900, 1000, and 1100 described above and/or to be described below may satisfy the condition of Equation 3 below.

$$-2 \le \frac{f1}{f2} \le -0.1 \qquad \text{Equation (3)}$$

Here, "f1" may be the focal length (e.g., effective focal length) of the first lens on the object OB side (e.g., the first lens L1), and "f2" may be the focal length of the second lens on the object OB side (e.g., the second lens L2). When the condition of Equation 3 is satisfied, it may be easy to correct aberration in the image-capturing device 600, and the image-capturing device 600 may be downsized. For example, when the value of Equation 3 is greater than −0.1, it may be difficult to correct chromatic aberration or spherical aberration. In another embodiment, when the value of Equation 3 is smaller than −2, the power of the first lens L1 is lowered, so the total track length may be increased.

According to another embodiment, the lens assemblies 600, 700, 800, 900, 1000, and 1100 described above and/or to be described below may satisfy the conditions of the following Equation 4 regarding the Abbe number of the first lens (e.g., the first lens L1) on the object side OB, Vd-1.

$$25 \le \text{Vd-1} \le 95 \qquad \text{Equation (4)}$$

When the value of Equation 4 is greater than 95, the possibility of damage to the first lens L1 due to an external impact or scratches may increase, and when the value of Equation 4 is less than 25, it may be difficult to correct chromatic aberration.

According to another embodiment, the lens assemblies 600, 700, 800, 900, 1000, and 1100 described above and/or to be described below may satisfy the condition of Equation 5 below.

$$0.1 \le \frac{t - L1}{TTL} \le 0.5 \qquad \text{Equation (5)}$$

Here, "t-L1" may be the thickness of the first lens on the object side OB (e.g., the first lens L1), and "TTL" may be the length from the object-side surface S2 of the first lens L1 and the sensor-side surface S9 of the first lens on the image sensor I side (e.g., the fourth lens L4). When the value of Equation 5 is greater than 0.5, the thickness of the first lens L1 increases and it is difficult to secure the thicknesses of the remaining lenses L2, L3, and L4 or the intervals between the lenses L1, L2, L3, and L4. Thus, it may be difficult to secure good performance of the image-capturing device 600. In another embodiment, when the value of Equation 5 is less than 0.1, the thickness of the first lens L1 is reduced, and thus it may be difficult to secure a suitable refractive power or to manufacture the first lens L1 in a designed shape.

According to another embodiment, the lens assemblies 600, 700, 800, 900, 1000, and 1100 described above and/or described below may satisfy the condition of the following Equation 6 regarding a field of view (FoV).

$$5 \le FoV \le 35 \qquad \text{Equation (6)}$$

When the condition of Equation 6 is satisfied, the image-capturing device 600 may be easily downsized while providing a space for arranging the plurality of optical members R1 and R2. For example, when the field of view is less than 5 degrees, the focal length of the image-capturing device 600 becomes long, which may make downsizing difficult. In an embodiment, when the field of view is greater than 35 degrees, the interval between the lens(es) L1, L2, L3, and L4 and the image sensor I is reduced, and thus it may be difficult to dispose the first optical member R1 and/or the second optical member R1.

As described in Table 1, the lens assemblies 600, 700, 800, 900, 1000, and 1100 of the embodiments described above or to be described below may satisfy the condition(s) presented through the equations described above. In Table 1, the smallest angle Ang-min in Equation 2 may be exemplified as the second angle Ang-p2 in the second optical member R2 of each embodiment.

TABLE 1

| | Equation 1 | Equation 2 | Equation 3 | Equation 4 | Equation 5 | Equation 6 |
|---|---|---|---|---|---|---|
| Embodiment 1 (FIG. 8) | 0.267 | 30 | −0.659 | 37.4 | 0.369 | 25.96 |
| Embodiment 2 (FIG. 13) | 0.267 | 30 | −1.145 | 56.09 | 0.393 | 26.01 |
| Embodiment 3 (FIG. 17) | 0.267 | 30 | −0.633 | 37.4 | 0.333 | 26.01 |
| Embodiment 4 (FIG. 21) | 0.275 | 30 | −0.753 | 37.4 | 0.263 | 26.29 |
| Embodiment 5 (FIG. 25) | 0.267 | 30 | −0.312 | 55.71 | 0.259 | 26.39 |
| Embodiment 6 (FIG. 29) | 0.220 | 30 | −0.635 | 44.9 | 0.386 | 18.79 |

According to another embodiment, the image-capturing device 600 may have a focal length of approximately 9.73 mm, an F-number of 3.475, a total track length of 2.6 mm, an image height of 2.28 mm, and/or a field of view (FoV) of 25.96 degrees. The total track length may be understood as, for example, the distance from the object-side surface 82 of the first lens L1 to the sensor-side surface S9 of the fourth lens L4, and the image height is the maximum distance from the optical axis O3 to the edge of the imaging surface (img), and may be understood, for example, as half of the diagonal length of the imaging surface (img). The image-capturing device 600 may satisfy at least some of the conditions presented through the above-described Equations, and may be manufactured in the specifications exemplified in Table 2 below.

TABLE 2

| Lens Surfaces (Surf) | Radius of Curvature (Radius) | Thickness (Thick) | Effective Focal Length (EFL) | Refractive Index (nd) | Abbe Number (vd) | Refraction Mode |
|---|---|---|---|---|---|---|
| Obj | infinity | infinity | | | | |
| S1 | infinity | 0.00000 | | | | |
| S2*(sto) | 2.39198 | 0.96020 | 4.050 | 1.56717 | 37.4 | refraction |
| S3* | −58.85040 | 0.05000 | | | | refraction |
| S4* | 3.46210 | 0.41168 | −6.147 | 1.67074 | 19.24 | refraction |
| S5* | 1.80126 | 0.35095 | | | | refraction |
| S6* | −13.72389 | 0.37625 | 6.457 | 1.67074 | 19.24 | refraction |
| S7* | −3.35921 | 0.10092 | | | | refraction |
| S8* | −6.44467 | 0.35000 | −4.751 | 1.67074 | 19.24 | refraction |
| S9* | 6.59759 | 0.50000 | | | | refraction |
| S10 | infinity | 1.20000 | infinity | 1.94593 | 17.98 | refraction |
| S11 | infinity | −1.20000 | infinity | −1.94593 | 17.98 | total internal reflection |
| S12 | infinity | −0.60000 | | | | refraction |
| S13 | infinity | −2.20000 | infinity | −1.51680 | 64.17 | refraction |
| S14 | infinity | 1.80000 | infinity | 1.51680 | 64.17 | total internal reflection |

TABLE 2-continued

| Lens Surfaces (Surf) | Radius of Curvature (Radius) | Thickness (Thick) | Effective Focal Length (EFL) | Refractive Index (nd) | Abbe Number (vd) | Refraction Mode |
|---|---|---|---|---|---|---|
| S15 | infinity | −0.90000 | infinity | −1.51680 | 64.17 | reflection |
| S16 | infinity | 0 | | | | refraction |
| S17 | infinity | 0 | | | | refraction |
| S18 | infinity | −0.42119 | | | | refraction |
| Img | infinity | −0.0115 | | | | refraction |

In Table 2, a lens surface marked with "sto" may function as an aperture, and an aspherical lens surface may be marked with a symbol "*". Like "S 1" and/or "S10 to S18", the surfaces described in Table 2 but not described in the drawings may be the surfaces of a cover window (e.g., the camera window 385 in FIG. 5 or 6), mechanical structures referred to in arrangement design of the lens L1, L2, L3, and L4 or optical members R1 and R2, and/or the optical members R1 and R2. Although not directly described in the drawings, the surfaces described in Table 2 are located on, for example, the path along which external light reaches to the image sensor I, but may not substantially affect the optical performance of the image-capturing device 600. In the disclosed embodiment(s), the refraction mode in Table 2 exemplifies whether light beam traveling is refracted (refraction), reflected (reflection), or reflected by total internal reflection (TIR). Since a light beam traveling direction is changed when reflection occurs by the optical members R1 and R2, in the graphs of FIGS. 10 and 11 related to spherical aberration and/or astigmatism according to the number of reflections, "+" and "−" may be reversed.

In the following Tables 3 and 4, the aspherical surface coefficients of the first to fourth lenses L1, L2, L3, and L4 are described, and the definition of the aspherical surface may be calculated through Equation 7 below:

$$z = \frac{c'y^2}{1+\sqrt{1-(K+1)c'^2y^2}} + Ay^4 + By^6 + \\ Cy^8 + Dy^{10} + Ey^{12} + Fy^{14} + Gy^{16} + Hy^{18} + Jy^{20}$$

Equation (7)

Here, "z" may mean a distance from the apex of a lens(es) L1, L2, L3, or L4 in the direction of the optical axis (e.g., the first optical axis O1), "y" may mean a distance in a direction perpendicular to the first optical axis O1, "c'" may mean a reciprocal of the radius of curvature at the apex of the lens(es) L1, L2, L3, or L4, "K" may mean a conic constant, and "A," "B," "C," "D," "E," "F," "G," "H," and "J" may mean aspherical surface coefficients, respectively. The radius of curvature (Radius) may represent, for example, a value indicating the degree of curvature in each point of a curved surface or curved line.

TABLE 3

| Lens Surfaces (Surf) | S2* | S3* | S4* | S5* |
|---|---|---|---|---|
| Radius | 2.39198E+00 | −5.88504E+01 | 3.46210E+00 | 1.80126E+00 |
| K(Conic) | 4.50896E−02 | −1.38710E+01 | −3.96270E+01 | −1.03648E+01 |
| A(4th)/C4 | 5.47440E−03 | −7.37513E−02 | −5.96554E−02 | −3.67511E−02 |
| B(6th)/C5 | −1.66325E−02 | 3.77928E−01 | 4.35788E−01 | 5.13135E−01 |
| C(8th)/C6 | 3.80893E−02 | −8.53122E−01 | −9.40087E−01 | −1.26182E00 |
| D(10th)/C7 | −5.05520E−02 | 1.09324E+00 | 9.11147E−01 | 1.72628E+00 |
| E(12th)/C8 | 3.80753E−02 | −7.88205E−01 | −4.38248E−02 | −7.31648E−01 |
| F(14th)/C9 | −1.40990E−02 | 2.78636E−01 | −7.71345E−01 | −1.38027E+00 |
| G(16th)/C10 | 9.79239E−04 | −1.40389E−02 | 7.30864E−01 | 2.11749E+00 |
| H(18th)/C11 | 8.32481E−04 | −1.87788E−02 | −2.83478E−01 | −1.11001E+00 |
| J(20th)/C12 | −1.75300E−04 | 3.86649E−03 | 4.12930E−02 | 2.07291E−01 |

TABLE 4

| Lens Surfaces (Surf) | S6* | S7* | S8* | S9* |
|---|---|---|---|---|
| Radius | −1.37239E+01 | −3.35921E+00 | −6.44467E+00 | 6.59759E+00 |
| K(Conic) | 2.24390E+01 | −2.23591E+01 | −9.90000E+01 | 3.12155E+01 |
| A(4th)/C4 | −3.16984E−01 | −4.79497E−01 | −2.99946E−01 | −3.06924E−02 |
| B(6th)/C5 | 1.03310E+00 | 1.66934E+00 | 1.03750E+00 | −6.18859E−02 |
| C(8th)/C6 | −2.04524E+00 | −3.11570E+00 | −1.26376E+00 | 6.18913E−01 |
| D(10th)/C7 | 4.13370E+00 | 4.87427E+00 | −7.69160E−01 | −2.42981E+00 |
| E(12th)/C8 | −7.41189E+00 | −7.82473E+00 | 3.38959E+00 | 4.86338E+00 |
| F(14th)/C9 | 8.99547E+00 | 1.00064E+01 | −2.76255E+00 | −5.50440E+00 |
| G(16th)/C10 | −6.62762E+00 | −7.85074E+00 | 5.85461E−02 | 3.52201E+00 |
| H(18th)/C11 | 2.68492E+00 | 3.21812E+00 | 8.56664E−01 | −1.17108E+00 |
| J(20th)/C12 | −4.59202E−01 | −5.16612E−01 | −2.86224E−01 | 1.52382E−01 |

In embodiments described below, reference numerals for optical axes, lenses, and/or lens surfaces may be omitted from the drawings for brevity of the drawings. Reference numerals omitted in the drawings will be easily understood by those skilled in the art by further referring to FIG. 8 or through lens data and drawings presented in each embodiment.

Figure 13:
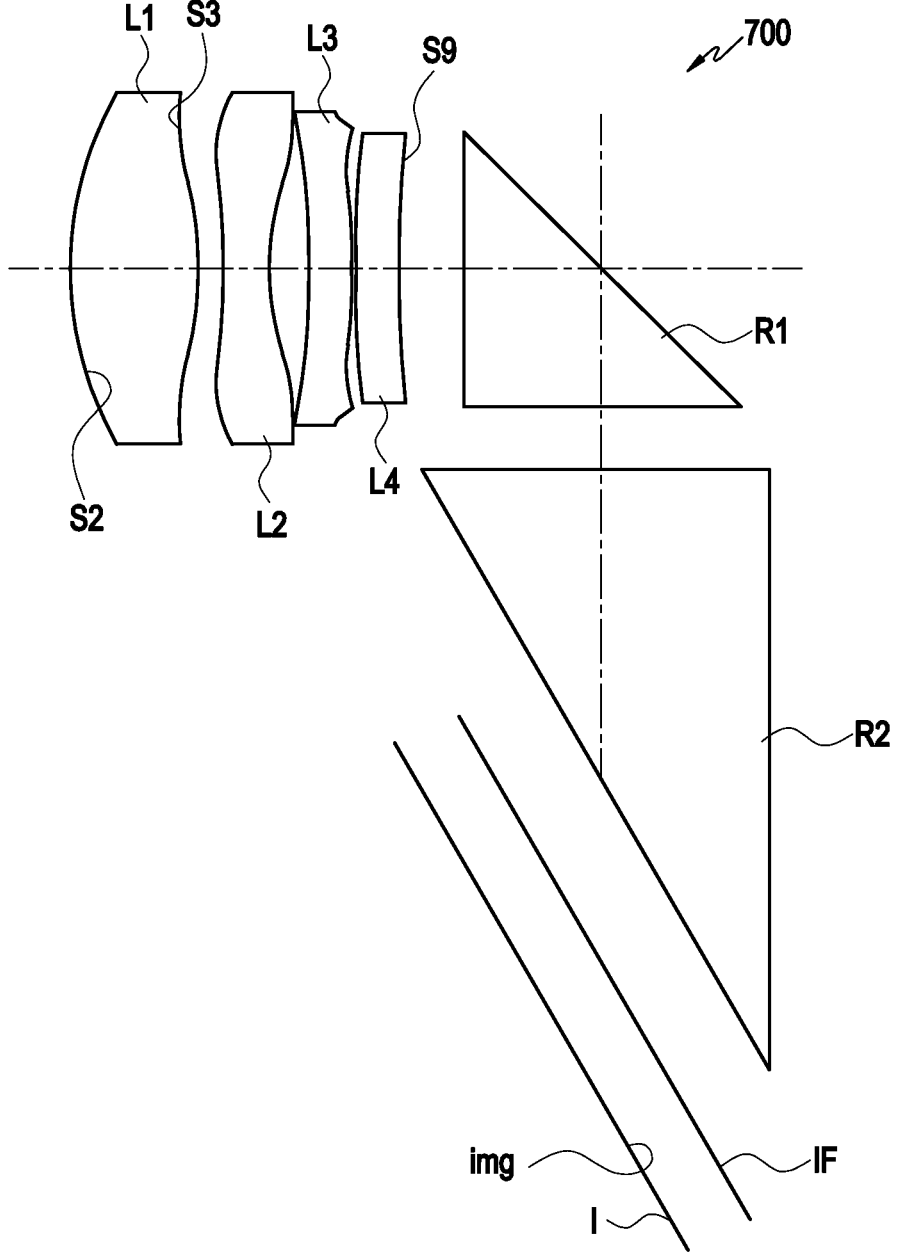
FIG. 13 is a view illustrating an image-capturing device according to an embodiment of the disclosure.

FIG. 13 is a view illustrating an image-capturing device (e.g., the camera module 180, 205, 212, or 213 in FIGS. 1 to 3 or the image-capturing device 500 in FIG. 6) according to an embodiment of the disclosure.

Figure 14:
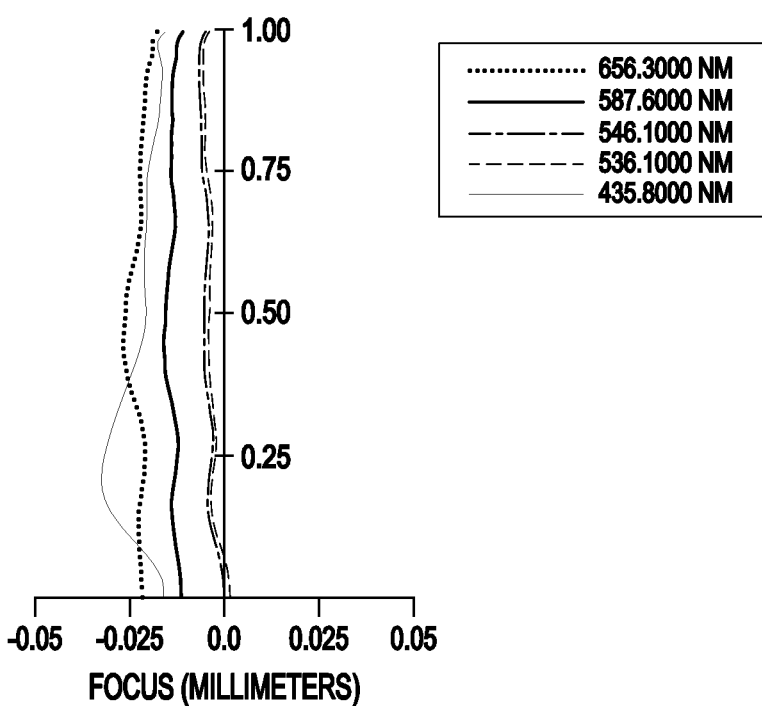
FIG. 14 is a graph showing spherical aberration of the image-capturing device of FIG. 13 according to an embodiment of the disclosure.

FIG. 14 is a graph showing spherical aberration of the image-capturing device of FIG. 13 according to an embodiment of the disclosure.

Figure 15:
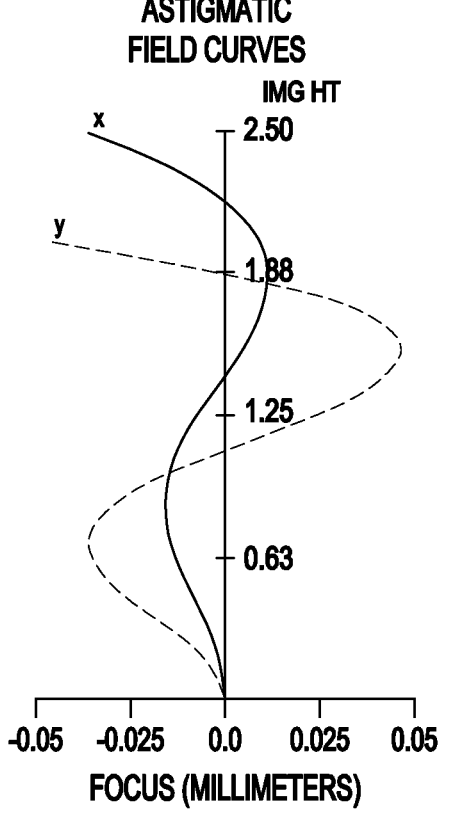
FIG. 15 is a graph showing astigmatism of the image-capturing device of FIG. 13 according to an embodiment of the disclosure.

FIG. 15 is a graph showing astigmatism of the image-capturing device of FIG. 13 according to an embodiment of the disclosure.

Figure 16:
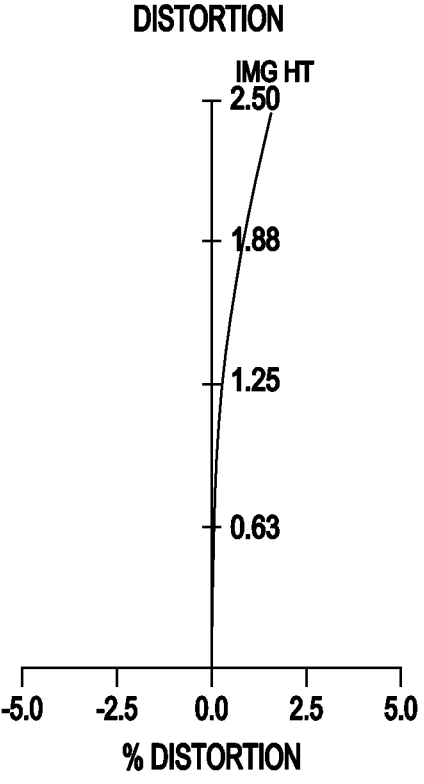
FIG. 16 is a graph showing distortion rate of the image-capturing device of FIG. 13 according to an embodiment of the disclosure.

FIG. 16 is a graph showing distortion rate of the image-capturing device of FIG. 13 according to an embodiment of the disclosure.

Referring to FIGS. 13 to 16, an image-capturing device 700 may have a focal length of about 9.73 mm, an F-number of 3.475, a total track length of 2.6 mm, an image height of 2.28 mm, and/or a field of view of 26.01 degrees. The total track length may be understood as, for example, the distance from the object-side surface S2 of the first lens L1 to the sensor-side surface S9 of the fourth lens L4, and the image height is the maximum distance from the optical axis O3 to the edge of the imaging surface (img), and may be understood, for example, as half of the diagonal length of the imaging surface (img). The image-capturing device 700 may be manufactured with the specifications exemplified in the following Table 5 while satisfying at least some of the conditions presented through the above-described equations, and the aspherical surface coefficients of Tables 6 and 7.

According to an embodiment, the image-capturing device 700 may further include an infrared blocking filter IF disposed between the image sensor I and the second optical member R2. When the image-capturing device 700 includes an infrared blocking filter IF disposed in addition to the lenses L1, L2, L3, and L4 or the optical members R1 and R2, the infrared blocking layer (e.g., the infrared blocking layer IFL in FIG. 9) may be omitted from the surface of each of the lenses L1, L2, L3, and L4 or each of the optical members R1 and R2.

TABLE 5

| Lens Surfaces (Surf) | Radius of Curvature (Radius) | Thickness (Thick) | Effective Focal Length (EFL) | Refractive Index (nd) | Abbe Number (vd) | Refraction Mode |
|---|---|---|---|---|---|---|
| Obj | infinity | infinity | | | | |
| S1 | infinity | 0.00000 | | | | |
| S2* | 2.89245 | 1.02176 | 2.353 | 1.54410 | 56.09 | refraction |
| S3* | −2.02593 | 0.19824 | | | | refraction |
| S4* | −3.11610 | 0.35000 | −2.055 | 1.56717 | 37.4 | refraction |
| S5* | 1.95734 | 0.30000 | | | | refraction |
| S6* | −89.71509 | 0.35000 | 28.764 | 1.61554 | 25.8 | refraction |
| S7* | −14.92158 | 0.03000 | | | | refraction |
| S8* | 10.00486 | 0.35000 | 69.146 | 1.66074 | 20.38 | refraction |
| S9*(sto) | 12.59048 | 0.50000 | | | | refraction |
| S10 | infinity | 1.10000 | infinity | 1.71736 | 29.5 | refraction |
| S11 | infinity | −1.10000 | infinity | −1.71736 | 29.5 | total internal reflection |
| S12 | infinity | −0.50000 | | | | refraction |
| S13 | infinity | −2.45000 | infinity | −1.49700 | 81.61 | refraction |
| S14 | infinity | 1.50000 | infinity | 1.49700 | 81.61 | total internal reflection |
| S15 | infinity | −1.50000 | infinity | −1.49700 | 81.61 | reflection |
| S16 | infinity | 0 | | | | refraction |
| S17 | infinity | −0.53621 | | | | refraction |
| Img | infinity | −0.0095 | | | | refraction |

TABLE 6

| Lens Surfaces (Surf) | S2* | S3* | S4* | S5* |
|---|---|---|---|---|
| Radius | 2.89245E+00 | −2.02593E+00 | −3.11610E+00 | 1.95734E+00 |
| K(Conic) | −5.15677E−02 | −2.65980E+01 | −9.90000E+01 | −1.31788E+01 |
| A(4th)/C4 | −4.46070E−03 | −5.68160E−02 | 2.16330E−01 | 5.80100E−01 |
| B(6th)/C5 | −1.27769E−04 | 4.51103E−02 | −1.19656E+00 | −2.16169E+00 |
| C(8th)/C6 | −7.99375E−03 | 4.75279E−02 | 3.20456E+00 | 3.99256E+00 |
| D(10th)/C7 | 1.85932E−02 | −7.51864E−02 | −4.96843E+00 | −3.62159E+00 |
| E(12th)/C8 | −1.63235E−02 | 3.06638E−02 | 4.93761E+00 | −4.52961E−01 |
| F(14th)/C9 | 7.48600E−03 | 9.61607E−03 | −3.19916E+00 | 4.90387E+00 |
| G(16th)/C10 | −1.46028E−03 | −1.19814E−02 | 1.31020E+00 | −5.21051E+00 |
| H(18th)/C11 | −4.05371E−05 | 3.39415E−03 | −3.08938E−01 | 2.42985E+00 |
| J(20th)/C12 | 4.21895E−05 | −2.42152E−04 | 3.21118E−02 | −4.37654E−01 |

TABLE 7

| Lens Surfaces (Surf) | S6* | S7* | S8* | S9* |
|---|---|---|---|---|
| Radius | −8.97151E+01 | −1.49216E+01 | 1.00049E+01 | 1.25905E+01 |
| K(Conic) | 9.90000E+01 | −9.90000E+01 | 6.98064E+01 | 6.45717E+01 |
| A(4th)/C4 | 1.35468E−01 | −8.05339E−01 | −8.60973E−01 | −7.66905E−02 |
| B(6th)/C5 | 1.88585E−01 | 5.91813E+00 | 5.35525E+00 | 2.41507E−01 |
| C(8th)/C6 | −3.06198E+00 | −2.30189E+01 | −1.94061E+01 | −3.74020E−01 |
| D(10th)/C7 | 7.40884E+00 | 5.35609E+01 | 4.48818E+01 | 4.49977E−01 |
| E(12th)/C8 | −8.97750E+00 | −7.89370E+01 | −6.71722E+01 | −5.91390E−01 |
| F(14th)/C9 | 6.67993E+00 | 7.56148E+01 | 6.50696E+01 | 7.09221E−01 |
| G(16th)/C10 | −3.31559E+00 | −4.61193E+01 | −3.96161E+01 | −5.85907E−01 |
| H(18th)/C11 | 1.06438E+00 | 1.63701E+01 | 1.38395E+01 | 2.75422E−01 |
| J(20th)/C12 | −1.66404E−01 | −2.57932E+00 | −2.12182E+00 | −5.49111E−02 |

Figure 17:
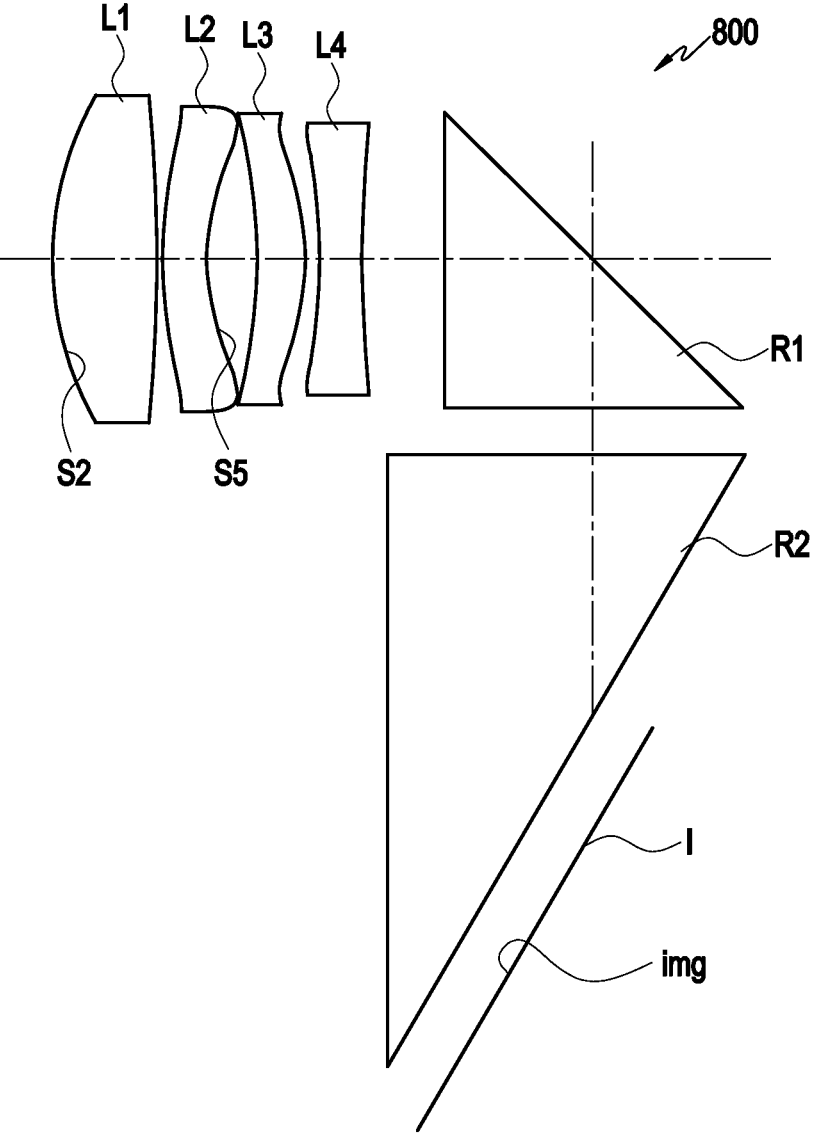
FIG. 17 is a view illustrating an image-capturing device according to an embodiment of the disclosure.

FIG. 17 is a view illustrating an-image capturing device (e.g., the camera module 180, 205, 212, or 213 in FIGS. 1 to 3 and/or the image-capturing device 500 in FIG. 6) according to an embodiment of the disclosure.

Figure 18:
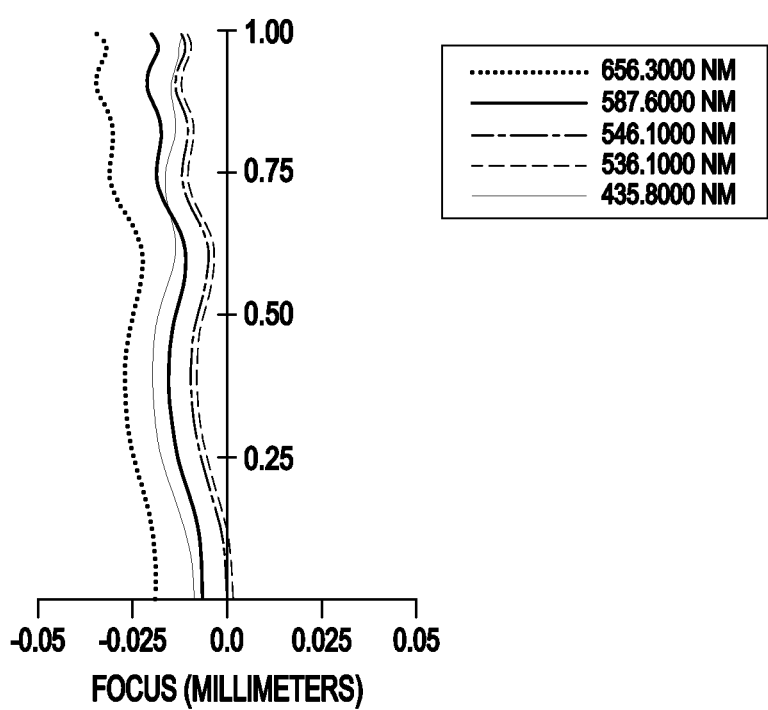
FIG. 18 is a graph showing spherical aberration of the image-capturing device of FIG. 17 according to an embodiment of the disclosure.

FIG. 18 is a graph showing spherical aberration of the image-capturing device of FIG. 17 according to an embodiment of the disclosure.

Figure 19:
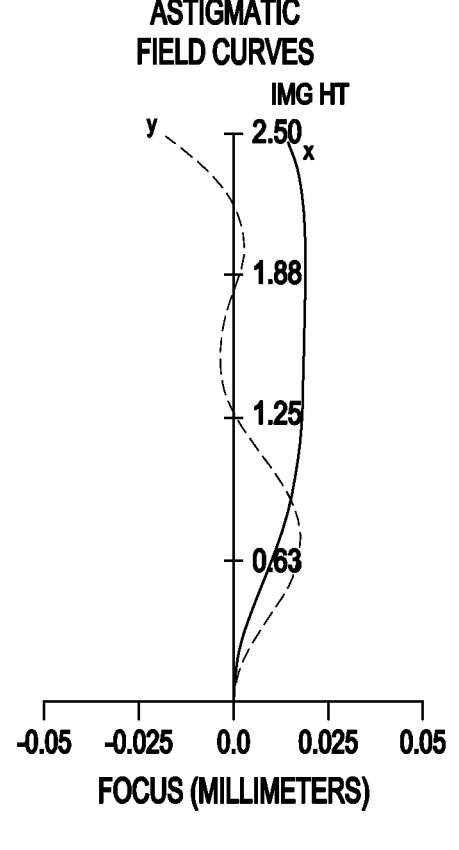
FIG. 19 is a graph showing astigmatism of the image-capturing device of FIG. 17 according to an embodiment of the disclosure.

FIG. 19 is a graph showing astigmatism of the image-capturing device of FIG. 17 according to an embodiment of the disclosure.

Figure 20:
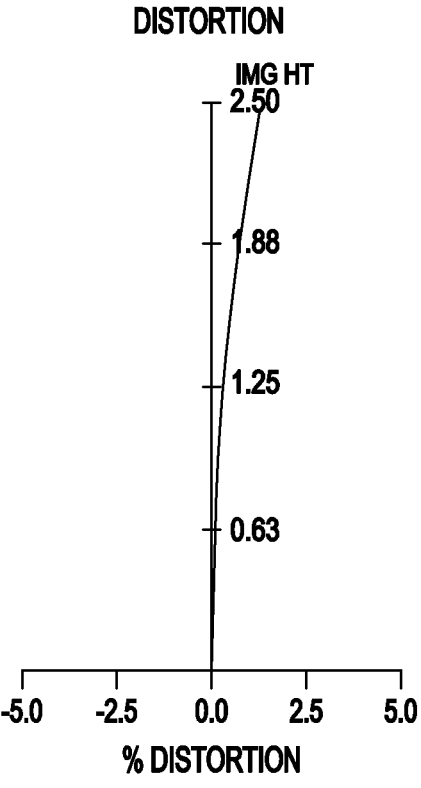
FIG. 20 is a graph showing distortion rate of the image-capturing device of FIG. 17 according to an embodiment of the disclosure.

FIG. 20 is a graph showing distortion rate of the image-capturing device of FIG. 17 according to an embodiment of the disclosure.

Referring to FIGS. 17 to 20, an image-capturing device 800 may have a focal length of about 9.75 mm, an F-number of 3.533, a total track length of 2.6 mm, an image height of 2.28 mm, and/or a field of view of 26.01 degrees. The total track length may be understood as, for example, the distance from the object-side surface S2 of the first lens L1 to the sensor-side surface S9 of the fourth lens L4, and the image height is the maximum distance from the optical axis O3 to the edge of the imaging surface (img), and may be understood, for example, as half of the diagonal length of the imaging surface (img). The image-capturing device 800 may be manufactured with the specifications exemplified in the following Table 8 while satisfying at least some of the conditions presented through the above-described equations, and the aspherical surface coefficients of Tables 9 and 10.

TABLE 8

| Lens Surfaces (Surf) | Radius of Curvature (Radius) | Thickness (Thick) | Effective Focal Length (EFL) | Refractive Index (nd) | Abbe Number (vd) | Refraction Mode |
|---|---|---|---|---|---|---|
| Obj | infinity | infinity | | | | |
| S1 | infinity | 0.00000 | | | | |
| S2*(sto) | 2.77006 | 0.86599 | 4.031 | 1.56717 | 37.4 | refraction |
| S3* | −12.03790 | 0.06160 | | | | refraction |
| S4* | 2.88557 | 0.37205 | −6.369 | 1.65035 | 21.53 | refraction |
| S5* | 1.62093 | 0.43149 | | | | refraction |
| S6* | −3.83961 | 0.40769 | 3.844 | 1.65035 | 21.53 | refraction |
| S7* | −1.58818 | 0.11118 | | | | refraction |
| S8* | −2.94631 | 0.35000 | −3.253 | 1.67074 | 19.24 | refraction |
| S9* | 9.24009 | 0.70000 | | | | refraction |
| S10 | infinity | 1.25000 | infinity | 1.94593 | 17.98 | refraction |
| S11 | infinity | −1.25000 | infinity | −1.94593 | 17.98 | total internal reflection |
| S12 | infinity | −0.40000 | | | | refraction |
| S13 | infinity | −2.20000 | infinity | −1.51680 | 64.17 | refraction |
| S14 | infinity | 2.00000 | infinity | 1.51680 | 64.17 | total internal reflection |
| S15 | infinity | −1.00000 | infinity | −1.51680 | 64.17 | reflection |
| S16 | infinity | 0 | | | | refraction |
| S17 | infinity | 0 | | | | refraction |
| S18 | infinity | −0.4879 | | | | refraction |
| Img | infinity | −0.0115 | | | | refraction |

TABLE 9

| Lens Surfaces (Surf) | S2* | S3* | S4* | S5* |
|---|---|---|---|---|
| Radius | 2.77006E+00 | −1.20379E+01 | 2.88557E+00 | 1.62093E+00 |
| K(Conic) | −8.10478E−02 | −1.07329E+01 | −3.52748E+01 | −1.23794E+01 |
| A(4th)/C4 | 3.89242E−03 | −1.22249E−03 | 6.63243E−02 | 1.58664E−01 |
| B(6th)/C5 | 2.12816E−03 | 7.89209E−02 | −1.44481E−01 | −4.40392E−01 |

TABLE 9-continued

| Lens Surfaces (Surf) | S2* | S3* | S4* | S5* |
|---|---|---|---|---|
| C(8th)/C6 | −2.36071E−02 | −2.30898E−01 | 3.86720E−01 | 1.44789E+00 |
| D(10th)/C7 | 5.43328E−02 | 3.80458E−01 | −8.75872E−01 | −3.49196E+00 |
| E(12th)/C8 | −6.93422E−02 | −3.95273E−01 | 1.24937E+00 | 5.11237E+00 |
| F(14th)/C9 | 5.39312E−02 | 2.69230E−01 | −1.06110E+00 | −4.32867E+00 |
| G(16th)/C10 | −2.52394E−02 | −1.18898E−01 | 5.12826E−01 | 1.90746E+00 |
| H(18th)/C11 | 6.50235E−03 | 3.10830E−02 | −1.27018E−01 | −3.12209E−01 |
| J(20th)/C12 | −7.06822E−04 | −3.63698E−03 | 1.19052E−02 | −1.48722E−02 |

TABLE 10

| Lens Surfaces (Surf) | S6* | S7* | S8* | S9* |
|---|---|---|---|---|
| Radius | −3.83961E+00 | −1.58818E+00 | −2.94631E+00 | 9.24009E+00 |
| K(Conic) | −1.84495E+01 | 3.92612E−02 | −6.39361E+01 | 5.58050E+01 |
| A(4th)/C4 | −1.69007E−01 | 1.11348E−01 | −1.13976E−01 | 2.54008E−02 |
| B(6th)/C5 | 3.19143E−01 | 2.47133E−01 | 8.97714E−01 | −9.51414E−02 |
| C(8th)/C6 | 5.07715E−01 | 1.51521E−01 | −2.78258E+00 | 1.17247E−01 |
| D(10th)/C7 | −3.29326E+00 | −2.83173E+00 | 4.75363E+00 | −2.00145E−01 |
| E(12th)/C8 | 6.64886E+00 | 7.24173E+00 | −4.98512E+00 | 3.37174E−01 |
| F(14th)/C9 | −7.13404E+00 | −9.33951E+00 | 3.10410E+00 | −4.00681E−01 |
| G(16th)/C10 | 4.25874E+00 | 6.79319E+00 | −9.67449E−01 | 2.92626E−01 |
| H(18th)/C11 | −1.30636E+00 | −2.65449E+00 | 4.06789E−02 | −1.18844E−01 |
| J(20th)/C12 | 1.55300E−01 | 4.34723E−01 | 3.73469E−02 | 2.05172E−02 |

Figure 21:
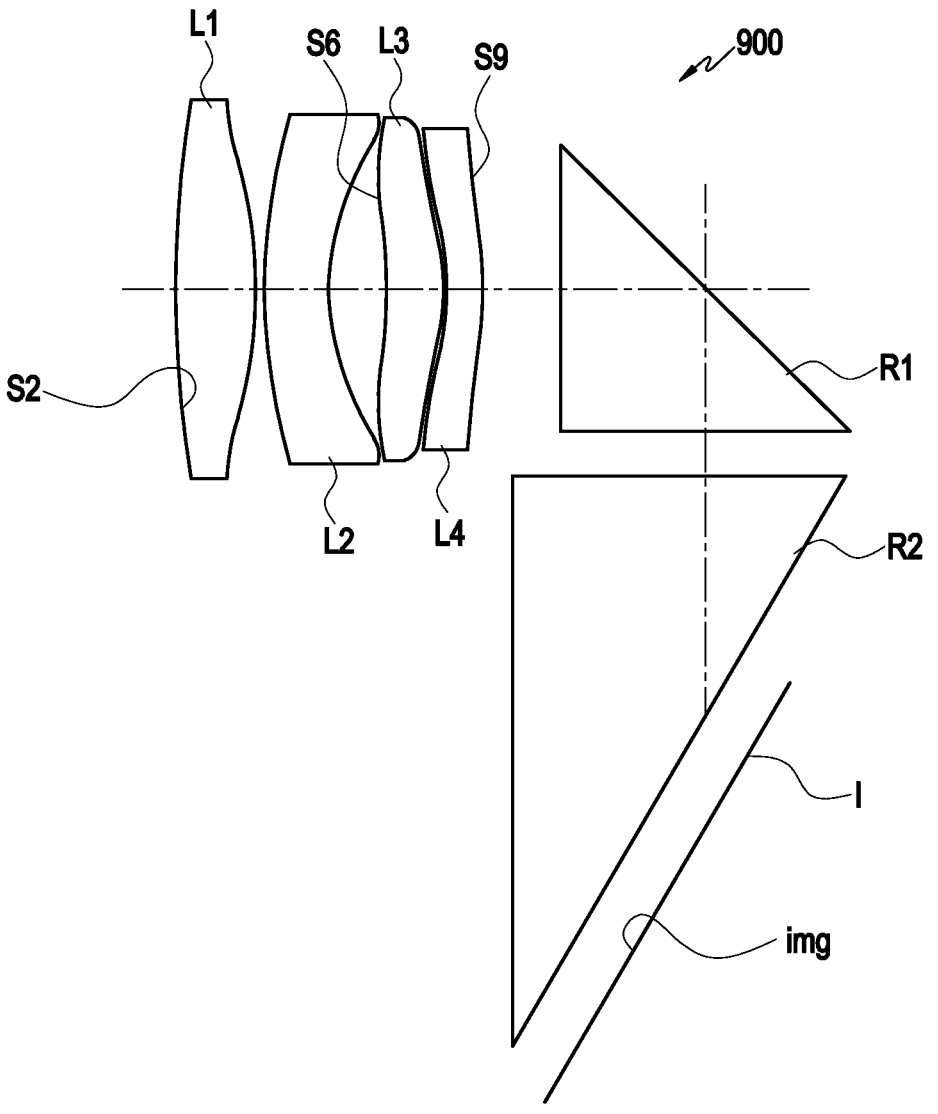
FIG. 21 is a view illustrating an image-capturing device according to an embodiment of the disclosure.

FIG. 21 is a view illustrating an image-capturing device (e.g., the camera module 180, 205, 212, or 213 in FIGS. 1 to 3 or the image-capturing device 500 in FIG. 6) according to an embodiment of the disclosure.

Figure 22:
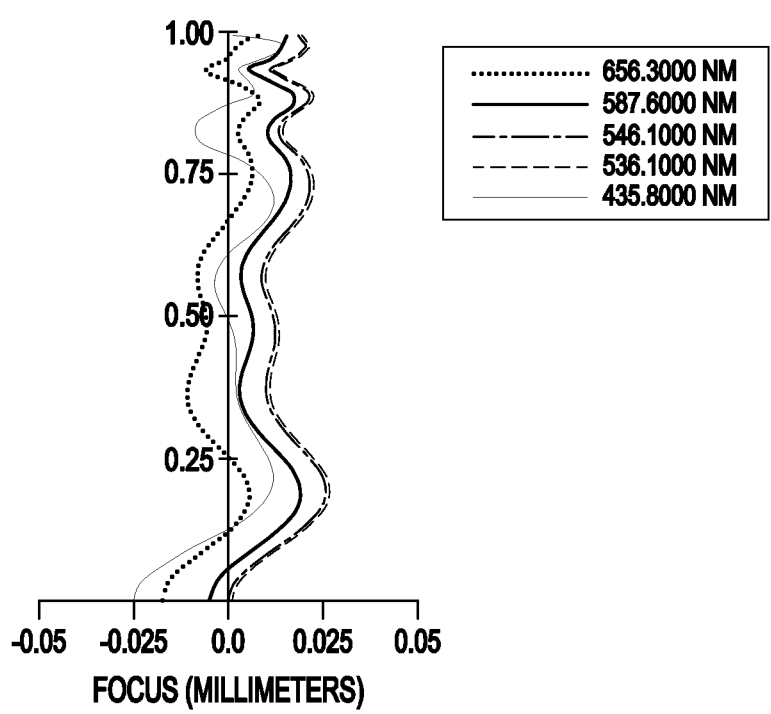
FIG. 22 is a graph showing spherical aberration of the image-capturing device of FIG. 21 according to an embodiment of the disclosure.

FIG. 22 is a graph showing spherical aberration of the image-capturing device of FIG. 21 according to an embodiment of the disclosure.

Figures 23, 24:
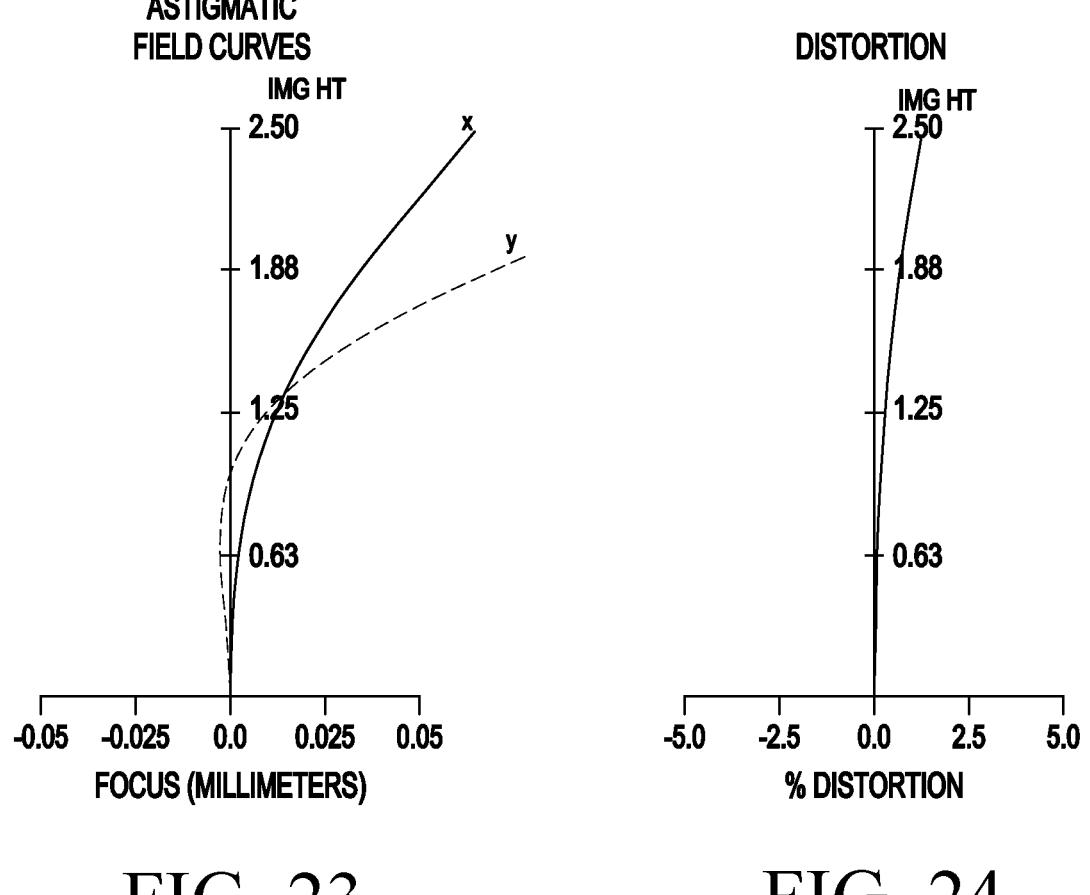
FIG. 23 is a graph showing astigmatism of the image-capturing device of FIG. 21 according to an embodiment of the disclosure.
FIG. 24 is a graph showing distortion rate of the image-capturing device of FIG. 21 according to an embodiment of the disclosure.

FIG. 23 is a graph showing astigmatism of the image-capturing device of FIG. 21 according to an embodiment of the disclosure.

FIG. 24 is a graph showing distortion rate of the image-capturing device of FIG. 21 according to an embodiment of the disclosure.

Referring to FIGS. 21 to 24, an image-capturing device 900 may have a focal length of about 9.68 mm, an F-number of 2.881, a total track length of 2.66 mm, an image height of 2.28 mm, and/or a field of view of 26.29 degrees. The total track length may be understood as, for example, the distance from the object-side surface S2 of the first lens L1 to the sensor-side surface S9 of the fourth lens L4, and the image height is the maximum distance from the optical axis O3 to the edge of the imaging surface (img), and may be understood, for example, as half of the diagonal length of the imaging surface (img). The image-capturing device 900 may be manufactured with the specifications exemplified in the following Table 11 while satisfying at least some of the conditions presented through the above-described equations, and the aspherical surface coefficients of Tables 12 and 13.

TABLE 11

| Lens Surfaces (Surf) | Radius of Curvature (Radius) | Thickness (Thick) | Effective Focal Length (EFL) | Refractive Index (nd) | Abbe Number (vd) | Refraction Mode |
|---|---|---|---|---|---|---|
| Obj | infinity | infinity | | | | |
| S1 | infinity | 0.00000 | | | | |
| S2* | 10.23859 | 0.69844 | 4.830 | 1.56717 | 37.4 | refraction |
| S3* | −3.67904 | 0.03000 | | | | refraction |
| S4* | 2.44406 | 0.55983 | −6.415 | 1.67074 | 19.24 | refraction |
| S5* | 1.42049 | 0.54467 | | | | refraction |
| S6* | −4.25861 | 0.49706 | 3.975 | 1.63491 | 23.98 | refraction |
| S7* | −1.66696 | 0.03000 | | | | refraction |
| S8* | −1.76751 | 0.30000 | −4.788 | 1.67074 | 19.24 | refraction |
| S9*(sto) | −4.13991 | 0.70654 | | | | refraction |
| S10 | infinity | 1.25000 | | | | refraction |
| S11 | infinity | −1.25000 | | | | total internal reflection |
| S12 | infinity | −0.40000 | | | | refraction |
| S13 | infinity | −2.11200 | infinity | −1.51680 | 64.17 | refraction |
| S14 | infinity | 1.92000 | infinity | 1.51680 | 64.17 | total internal reflection |

TABLE 11-continued

| Lens Surfaces (Surf) | Radius of Curvature (Radius) | Thickness (Thick) | Effective Focal Length (EFL) | Refractive Index (nd) | Abbe Number (vd) | Refraction Mode |
|---|---|---|---|---|---|---|
| S15 | infinity | −0.96000 | infinity | −1.51680 | 64.17 | reflection |
| S16 | infinity | 0 | | | | refraction |
| S17 | infinity | −0.51558 | | | | refraction |
| img | infinity | 0.0121 | | | | refraction |

TABLE 12

| Lens Surfaces (Surf) | S2* | S3* | S4* | S5* |
|---|---|---|---|---|
| Radius | 1.02386E+01 | −3.67904E+00 | 2.44406E+00 | 1.42049E+00 |
| K(Conic) | 4.81667E+00 | −7.67180E+00 | −1.27930E+01 | −3.65531E+00 |
| A(4th)/C4 | −5.69341E−03 | −1.41529E−02 | 6.40785E−02 | 1.03174E−01 |
| B(6th)/C5 | 1.09285E−02 | 3.11212E−02 | −1.45066E−01 | −3.28039E−01 |
| C(8th)/C6 | −1.42841E−02 | −3.52427E−02 | 1.78679E−01 | 5.34709E−01 |
| D(10th)/C7 | 8.19285E−03 | 2.12171E−02 | −1.58613E−01 | −5.65257E−01 |
| E(12th)/C8 | −2.45082E−03 | −6.70839E−03 | 9.69236E−02 | 3.91252E−01 |
| F(14th)/C9 | 3.86474E−04 | 1.03371E−03 | −3.74055E−02 | −1.71139E−01 |
| G(16th)/C10 | −2.11244E−05 | −4.89217E−05 | 8.10136E−03 | 4.31012E−02 |
| H(18th)/C11 | 0.00000E+00 | 0.00000E+00 | −7.44946E−04 | −4.76448E−03 |
| J(20th)/C12 | 0.00000E+00 | 0.00000E+00 | 0.00000E+00 | 0.00000E+00 |

TABLE 13

| Lens Surface (Surf) | S6* | S7* | S8* | S9* |
|---|---|---|---|---|
| Radius | −4.25861E+00 | −1.66696E+00 | −1.76751E+00 | −4.13991E+00 |
| K(Conic) | −3.54859E+01 | 1.07597E−02 | −1.14768E+01 | −1.62287E+00 |
| A(4th)/C4 | 9.73396E−02 | 4.31057E−01 | 6.76674E−02 | −1.20789E−02 |
| B(6th)/C5 | −3.06865E−01 | −3.53551E−01 | 4.28382E−01 | 2.74527E−01 |
| C(8th)/C6 | 5.45067E−01 | −1.27186E+00 | −2.83510E+00 | −8.86537E−01 |
| D(10th)/C7 | −5.16128E−01 | 4.85328E+00 | 7.09720E+00 | 1.64961E+00 |
| E(12th)/C8 | 2.71914E−01 | −7.23925E+00 | −9.50850E+00 | −1.88424E+00 |
| F(14th)/C9 | −7.42660E−02 | 5.84400E+00 | 7.40401E+00 | 1.33871E+00 |
| G(16th)/C10 | 8.14168E−03 | −2.67247E+00 | −3.35737E+00 | −5.74932E−01 |
| H(18th)/C11 | 0.00000E+00 | 6.51585E−01 | 8.22811E−01 | 1.36345E−01 |
| J(20th)/C12 | 0.00000E+00 | −6.58923E−02 | −8.43020E−02 | −1.36861E−02 |

Figure 25:
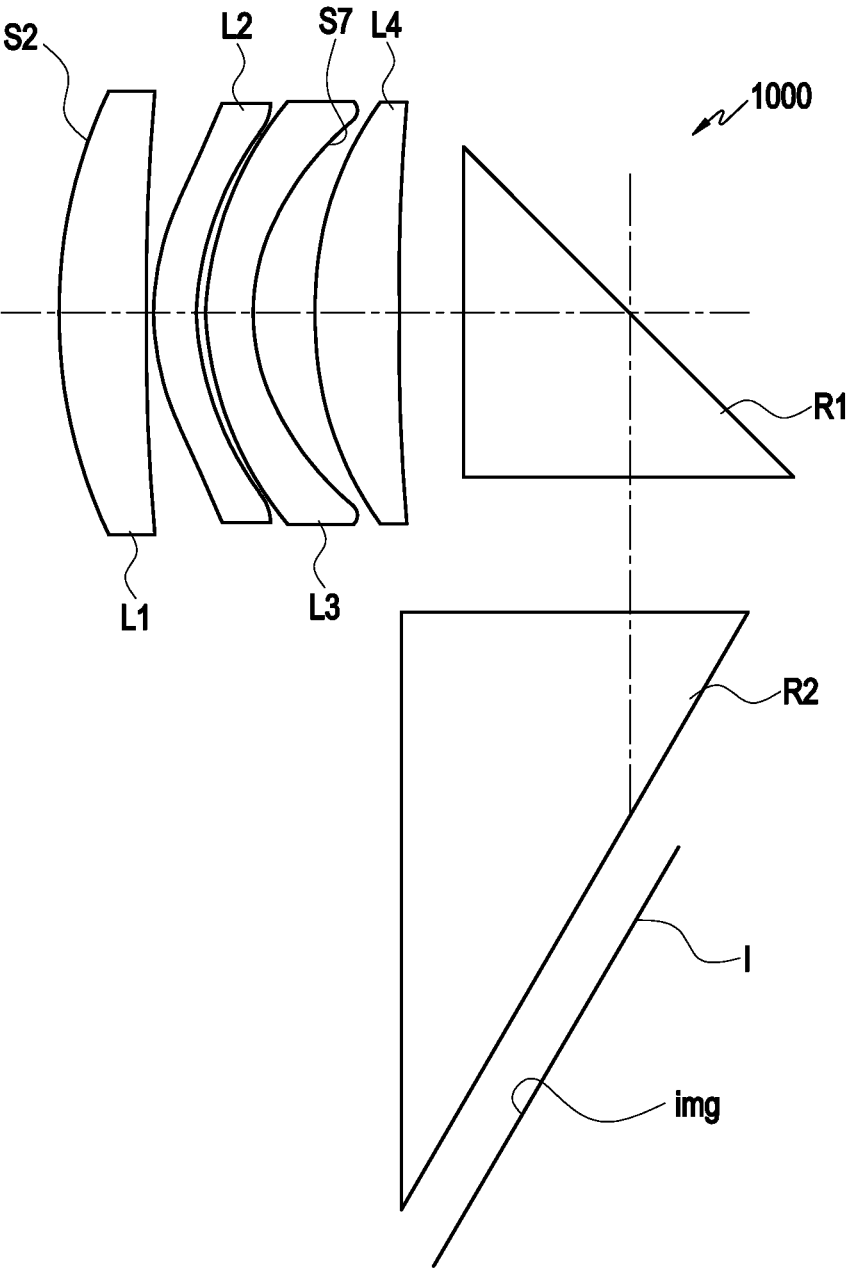
FIG. 25 is a view illustrating an image-capturing device according to an embodiment of the disclosure.

FIG. 25 is a view illustrating an image-capturing device (e.g., the camera module 180, 205, 212, or 213 in FIGS. 1 to 3 or the image-capturing device 500 in FIG. 6) according to an embodiment of the disclosure.

Figure 26:
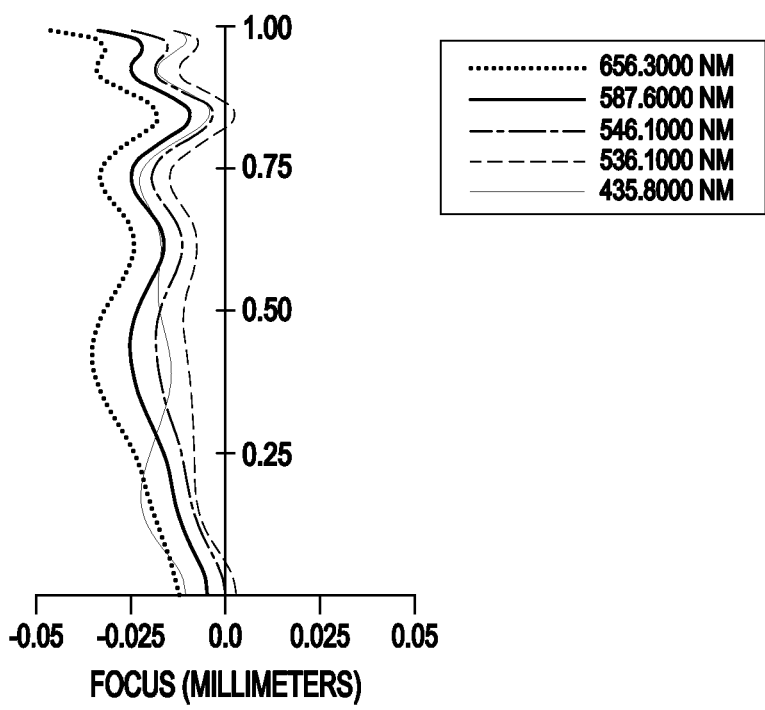
FIG. 26 is a graph showing spherical aberration of the image-capturing device of FIG. 25 according to an embodiment of the disclosure.

FIG. 26 is a graph showing spherical aberration of the image-capturing device of FIG. 25 according to an embodiment of the disclosure.

FIG. 27 is a graph showing astigmatism of the image-capturing device of FIG. 25 according to an embodiment of the disclosure.

FIG. 28 is a graph showing distortion rate of the image-capturing device of FIG. 25 according to an embodiment of the disclosure.

Referring to FIGS. 25 to 28, an image-capturing device 1000 may have a focal length of about 9.68 mm, an F-number of 2.847, a total track length of 2.587 mm, an image height of 2.28 mm, and/or a field of view of 26.39 degrees. The total track length may be understood as, for example, the distance from the object-side surface S2 of the first lens L1 to the sensor-side surface 89 of the fourth lens L4, and the image height is the maximum distance from the optical axis O3 to the edge of the imaging surface (img), and may be understood, for example, as half of the diagonal length of the imaging surface (img). The image-capturing device 1000 may be manufactured with the specifications exemplified in the following Table 14 while satisfying at least some of the conditions presented through the above-described equations, and the aspherical surface coefficients of Tables 15 and 16.

TABLE 14

| Lens Surfaces (Surf) | Radius of Curvature (Radius) | Thickness (Thick) | Effective Focal Length (EFL) | Refractive Index (nd) | Abbe Number (vd) | Refraction Mode |
|---|---|---|---|---|---|---|
| obj | infinity | infinity | | | | |
| S1 | infinity | 0.00000 | | | | |
| S2*(sto) | 4.81438 | 0.66890 | 6.322 | 1.53480 | 55.71 | refraction |
| S3* | −10.96359 | 0.05000 | | | | refraction |
| S4* | 1.88189 | 0.30999 | −20.242 | 1.63491 | 23.98 | refraction |

TABLE 14-continued

| Lens Surfaces (Surf) | Radius of Curvature (Radius) | Thickness (Thick) | Effective Focal Length (EFL) | Refractive Index (nd) | Abbe Number (vd) | Refraction Mode |
|---|---|---|---|---|---|---|
| S5* | 1.53779 | 0.08692 | | | | refraction |
| S6* | 1.79756 | 0.30000 | −5.347 | 1.63915 | 23.52 | refraction |
| S7* | 1.10464 | 0.54671 | | | | refraction |
| S8* | 3.66400 | 0.62402 | 6.277 | 1.56717 | 37.4 | refraction |
| S9* | −151.66280 | 0.50000 | | | | refraction |
| S10 | infinity | 1.25000 | | | | refraction |
| S11 | infinity | −1.25000 | | | | total internal reflection |
| S12 | infinity | −0.40000 | | | | refraction |
| S13 | infinity | −2.20000 | infinity | −1.51680 | 64.17 | refraction |
| S14 | infinity | 2.00000 | infinity | 1.51680 | 64.17 | total internal reflection |
| S15 | infinity | −1.00000 | infinity | −1.51680 | 64.17 | reflection |
| S16 | infinity | 0 | | | | refraction |
| S17 | infinity | 0 | | | | refraction |
| S18 | infinity | −0.29628 | | | | refraction |
| img | infinity | −0.0145 | | | | refraction |

TABLE 15

| Lens Surfaces (Surf) | S2* | S3* | S4* | S5* |
|---|---|---|---|---|
| Radius | 4.81438E+00 | −1.09636E+01 | 1.88189E+00 | 1.53779E+00 |
| K(Conic) | 3.54569E+00 | −8.81750E+01 | −1.11753E+00 | −2.97857E+00 |
| A(4th)/C4 | 1.10535E−02 | 3.75683E−02 | −6.77231E−02 | −8.04691E−02 |
| B(6th)/C5 | −2.37619E−02 | 6.00630E−02 | 3.05337E−01 | 6.04620E−01 |
| C(8th)/C6 | 5.51038E−02 | −1.72126E−01 | −6.18872E−01 | −1.59535E+00 |
| D(10th)/C7 | −7.31852E−02 | 1.93129E−01 | 6.59582E−01 | 2.32597E+00 |
| E(12th)/C8 | 5.71269E−02 | −1.21215E−01 | −4.20411E−01 | −2.06428E+00 |
| F(14th)/C9 | −2.70837E−02 | 4.55352E−02 | 1.63641E−01 | 1.13397E+00 |
| G(16th)/C10 | 7.67817E−03 | −1.01392E−02 | −3.76324E−02 | −3.75594E−01 |
| H(18th)/C11 | −1.20040E−03 | 1.22357E−03 | 4.60537E−03 | 6.86622E−02 |
| J(20th)/C12 | 7.97410E−05 | −6.04962E−05 | −2.21886E−04 | −5.31537E−03 |

TABLE 16

| Lens Surfaces (Surf) | S6* | S7* | S8* | S9* |
|---|---|---|---|---|
| Radius | 1.79756E+00 | 1.10464E+00 | 3.66400E+00 | −1.51663E+02 |
| K(Conic) | −4.28944E+00 | −6.17228E−01 | −1.33453E+01 | 9.90000E+01 |
| A(4th)/C4 | −1.20176E−02 | −9.32545E−02 | 6.15451E−02 | 1.80431E−02 |
| B(6th)/C5 | 1.11064E−01 | −2.50681E−01 | −5.88048E−02 | −4.91700E−03 |
| C(8th)/C6 | −5.07951E−01 | 6.81713E−01 | 6.94644E−02 | −1.15032E−02 |
| D(10th)/C7 | 1.04700E+00 | −9.18078E−01 | −5.28833E−02 | 4.47342E−02 |
| E(12th)/C8 | −1.14248E+00 | 7.54505E−01 | 1.41760E−02 | −6.67360E−02 |
| F(14th)/C9 | 7.21138E−01 | −3.83446E−01 | 1.25406E−02 | 5.43212E−02 |
| G(16th)/C10 | −2.65043E−01 | 1.14335E−01 | −1.25307E−02 | −2.48871E−02 |
| H(18th)/C11 | 5.27410E−02 | −1.76176E−02 | 4.17500E−03 | 5.96954E−03 |
| J(20th)/C12 | −4.39872E−03 | 9.87459E−04 | −4.95931E−04 | −5.77902E−04 |

Figure 29:
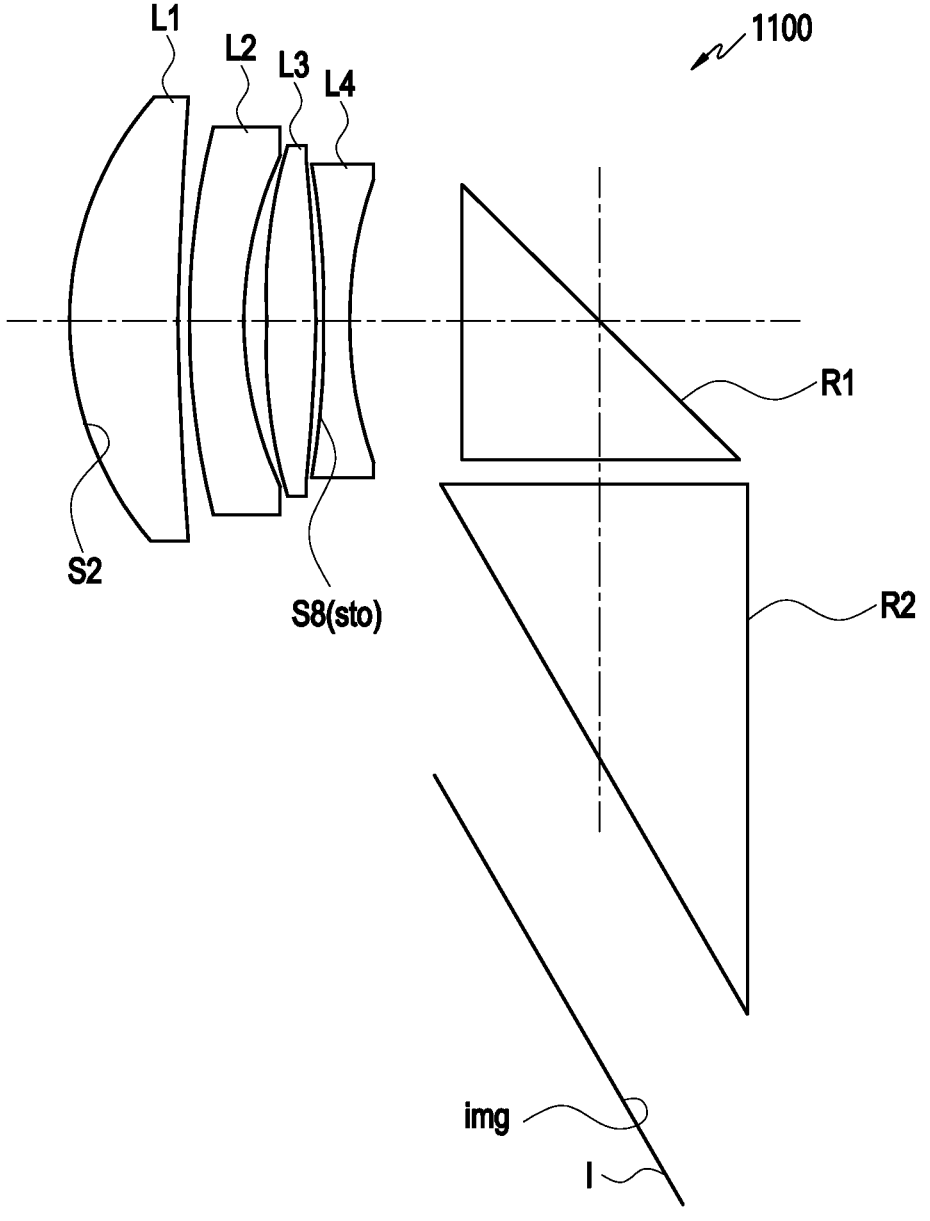
FIG. 29 is a view illustrating an image-capturing device according to an embodiment of the disclosure.

FIG. 29 is a view illustrating an image-capturing device 1100 (e.g., the camera module 180, 205, 212, or 213 in FIGS. 1 to 3 or the image-capturing device 500 in FIG. 6) according to an embodiment of the disclosure.

Figure 30:
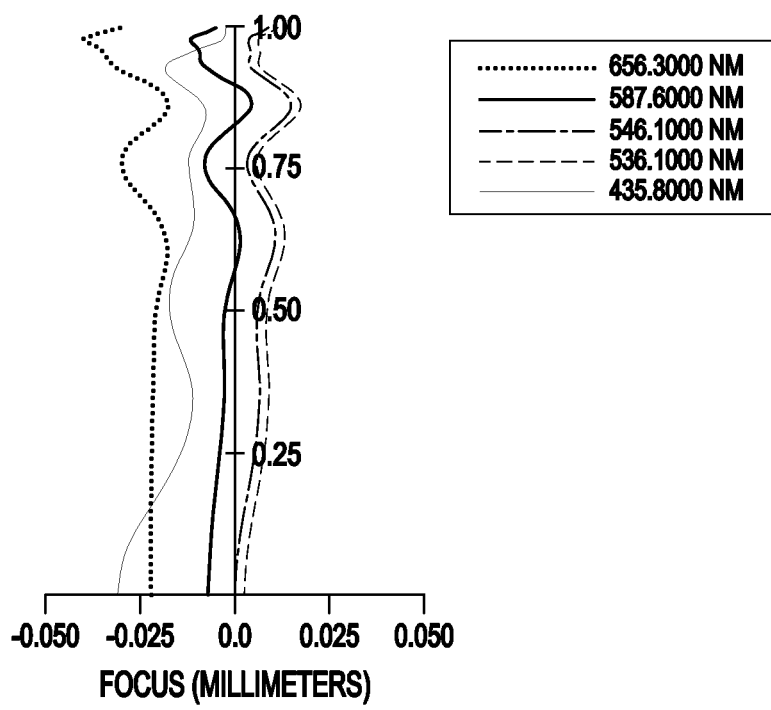
FIG. 30 is a graph showing spherical aberration of the image-capturing device of FIG. 29 according to an embodiment of the disclosure.

FIG. 30 is a graph showing spherical aberration of the image-capturing device 1100 of FIG. 29 according to an embodiment of the disclosure.

FIG. 31 is a graph showing astigmatism of the image-capturing device 1100 of FIG. 29 according to an embodiment of the disclosure.

FIG. 32 is a graph showing distortion rate of the image-capturing device 1100 of FIG. 29 according to an embodiment of the disclosure.

Referring to FIGS. 29 to 32, an image-capturing device 1100 may have a focal length of about 16.79 mm, an F-number of 2.872, a total track length of 3.700 mm, an image height of 2.8 mm, and/or a field of view of 18.79 degrees. The total track length may be understood as, for example, the distance from the object-side surface S2 of the first lens L1 to the sensor-side surface S9 of the fourth lens L4, and the image height is the maximum distance from the optical axis O3 to the edge of the imaging surface (img), and may be understood, for example, as half of the diagonal length of the imaging surface (img). The image-capturing device 1100 may be manufactured with the specifications exemplified in the following Table 17 while satisfying at least some of the conditions presented through the above-described equations, and the aspherical surface coefficients of Table 18.

TABLE 17

| Lens Surfaces (Surf) | Radius of Curvature (Radius) | Thickness (Thick) | Effective Focal Length (EFL) | Refractive Index (nd) | Abbe Number (vd) | Refraction Mode |
|---|---|---|---|---|---|---|
| obj | infinity | infinity | | | | |
| S1 | infinity | 0.00000 | | | | |
| S2 | 4.46972 | 1.42806 | 6.981 | 1.74400 | 44.9 | refraction |
| S3 | 26.81334 | 0.16532 | | | | refraction |
| S4 | 11.69539 | 0.69575 | −10.994 | 1.94593 | 17.98 | refraction |
| S5 | 5.38100 | 0.30000 | | | | refraction |
| S6* | 13.14997 | 0.65009 | 11.471 | 1.67074 | 19.24 | refraction |
| S7* | −18.71445 | 0.11079 | | | | refraction |
| S8*(sto) | −17.60577 | 0.35000 | −8.261 | 1.61444 | 25.94 | refraction |
| S9* | 7.27892 | 1.50000 | | | | refraction |
| S10 | infinity | 1.80000 | infinity | 1.80610 | 40.73 | refraction |
| S11 | infinity | −1.80000 | infinity | −1.80610 | 40.73 | total internal reflection |
| S12 | infinity | −0.40000 | | | | refraction |
| S13 | infinity | −3.60000 | infinity | −1.51680 | 64.17 | refraction |
| S14 | infinity | 2.80000 | infinity | 1.51680 | 64.17 | total internal reflection |
| S15 | infinity | −1.40000 | infinity | −1.51680 | 64.17 | reflection |
| S16 | infinity | −2.0044 | | | | refraction |
| img | infinity | 0.0015 | | | | refraction |

TABLE 18

| Lens Surfaces (Surf) | S6* | S7* | S8* | S9* |
|---|---|---|---|---|
| Radius | 1.31500E+01 | −1.87144E+01 | −1.76058E+01 | 7.27892E+00 |
| K(Conic) | 2.96540E+01 | 1.04376E+01 | −4.33088E−01 | 9.83118E+00 |
| A(4th)/C4 | 1.71245E−03 | −7.02775E−03 | −2.27348E−02 | −9.98966E−03 |
| B(6th)/C5 | −7.10760E−03 | 2.47936E−03 | 3.19183E−02 | 1.94378E−02 |
| C(8th)/C6 | 7.93882E−03 | 6.54277E−03 | −2.66369E−02 | −2.27085E−02 |
| D(10th)/C7 | −4.94674E−03 | −8.03284E−03 | 1.42199E−02 | 1.59888E−02 |
| E(12th)/C8 | 1.88412E−03 | 4.31713E−03 | −5.21168E−03 | −7.26017E−03 |
| F(14th)/C9 | −4.55793E−04 | −1.34264E−03 | 1.30264E−03 | 2.15560E−03 |
| G(16th)/C10 | 6.87166E−05 | 2.53302E−04 | −2.07019E−04 | −4.05645E−04 |
| H(18th)/C11 | −5.88568E−06 | −2.70550E−05 | 1.83835E−05 | 4.38516E−05 |
| J(20th)/C12 | 2.16835E−07 | 1.25311E−06 | −6.80453E−07 | −2.07809E−06 |

Figure 33:
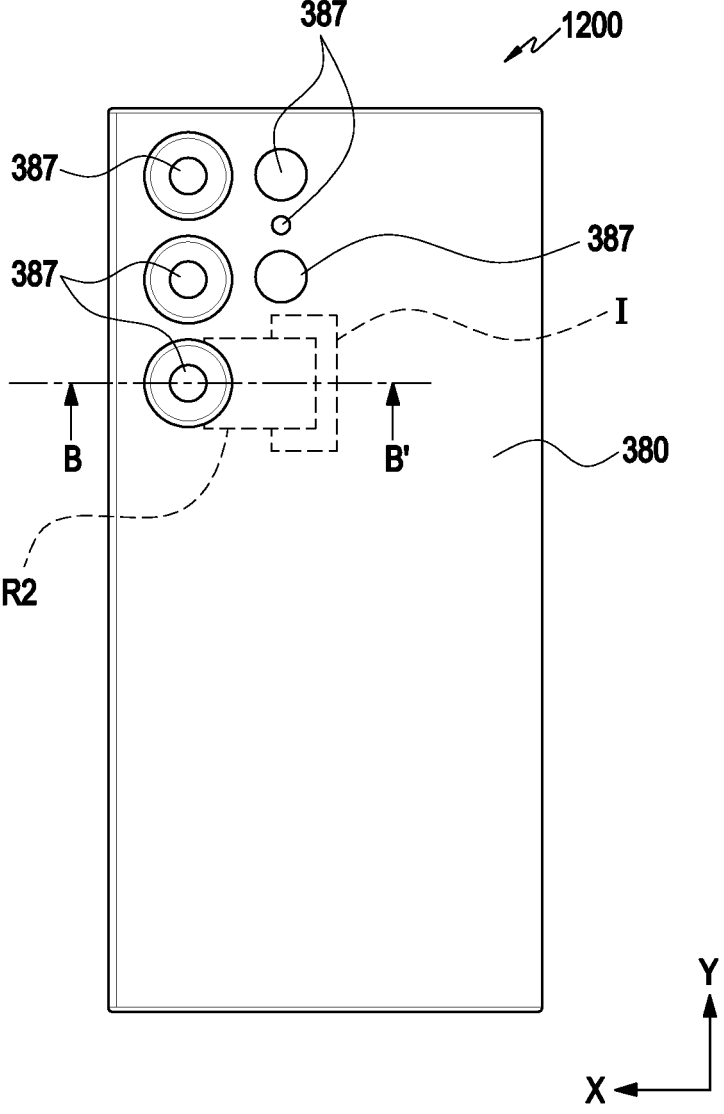
FIG. 33 is a plan view illustrating a rear surface of an electronic device including an image-capturing device according to an embodiment of the disclosure.
Figure 34:
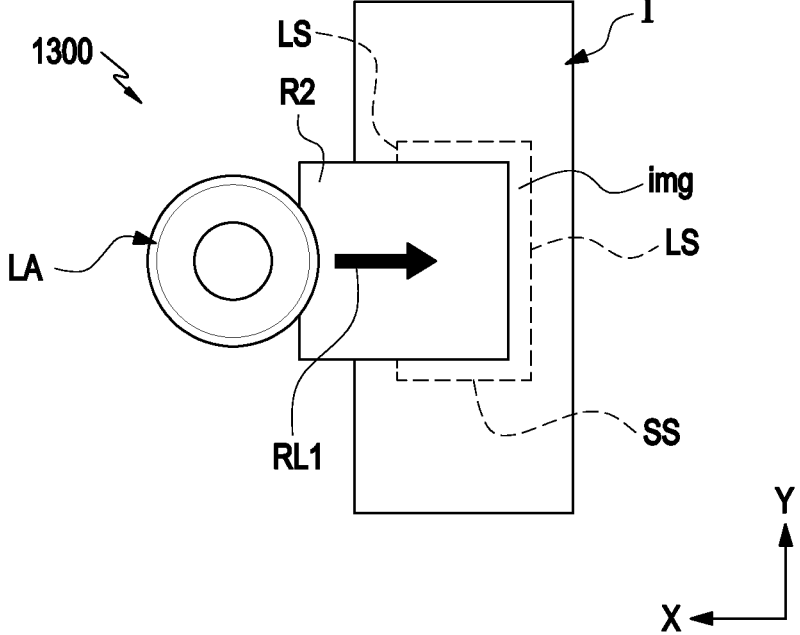
FIG. 34 is a plan view illustrating the image-capturing device of the electronic device of FIG. 33 according to an embodiment of the disclosure.
Figure 35:
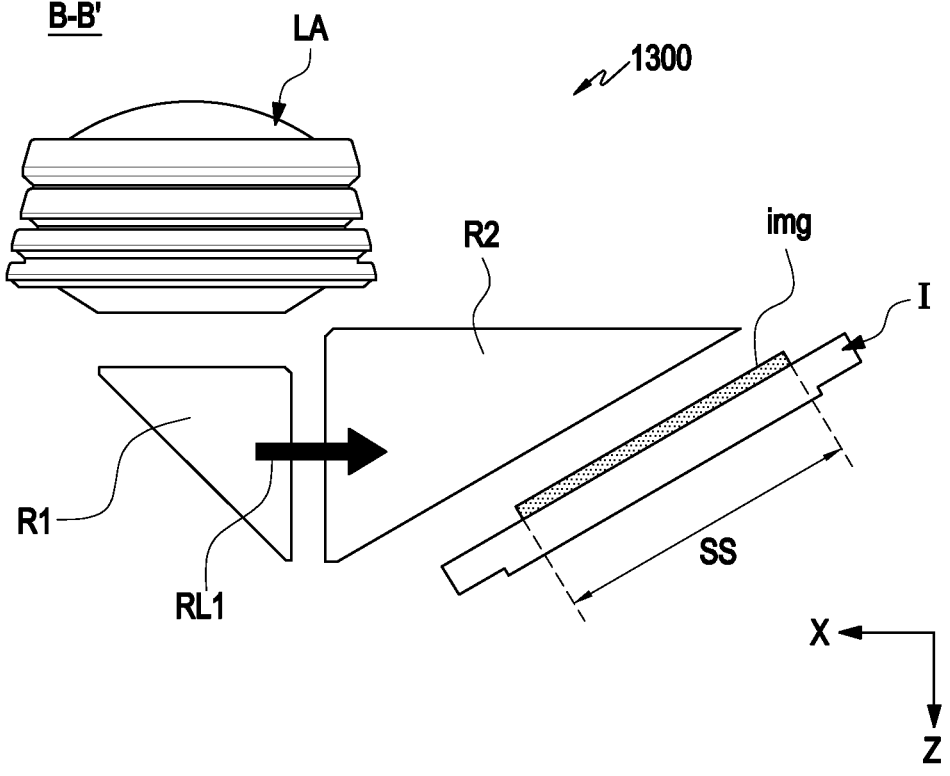
FIG. 35 is a view of the image-capturing device according to an embodiment of the disclosure taken along the line B-B' in FIG. 33.

FIG. 33 is a plan view illustrating the rear surface of an image-capturing device (e.g., the electronic device 101, 104, 200, 300, or 400 in FIGS. 1 to 6) including an image-capturing device (e.g., the camera module 180, 205, 212, or 213 or the image-capturing device in FIG. 6, 7, 8, 13, 17, 21, or 25 and/or FIG. 29) according to an embodiment of the disclosure. FIG. 34 is a plan view illustrating the image-capturing device 1300 of the electronic device 1200 of FIG. 33 according to an embodiment of the disclosure. FIG. 35 is a view of the image-capturing device 1300 according to an embodiment of the disclosure taken-along line B-B' in FIG. 33.

Referring to FIGS. 33 to 35, the image-capturing device 1300 may include a lens layout LA (e.g., the lenses L1, L2, L3, and L4 in FIG. 8), an image sensor I (e.g., the image sensor I in FIG. 8), and/or a plurality of optical members R1 and R2 (e.g., the optical members R1 and R2 in FIG. 8). In an embodiment, the lens layout LA may be aligned with any one of the openings 387 (e.g., the transparent areas 387 in FIG. 5) provided on the rear surface of the electronic device 1200. The plurality of optical members R1 and R2 may include, for example, a first optical member R1 disposed between the lens array LA and the image sensor I, and/or a second optical member R2 disposed between the first optical member R1 and the image sensor I. In an embodiment, the first optical member R1 may reflect or refract light incident through the lens array LA, and the second optical member R2 may reflect or refract the light incident via the first optical member R1 to guide the light to the image sensor I. In the illustrated embodiment, a state in which the first optical member R1 and the second optical member R2 are separated is exemplified, but it is noted that the embodiment(s) of the disclosure is(are) not limited thereto. For example, after the first optical member R1 and the second optical member R2 are manufactured according to design specifications, surfaces facing each other are joined to each other, so that the first and second optical members can be understood as a single optical member in appearance.

According to an embodiment, the lens layout LA may focus or guide light incident from the outside (e.g., the incident light IL of FIG. 7) along the Z-axis direction (e.g., the first direction D1 in FIG. 6), and the first optical member R1 may reflect or refract the light incident through the lens layout at least once, thereby guiding the light in a direction crossing the Z axis (e.g., the second direction D2 in FIG. 6). In the state illustrated in FIG. 33 or 34, it may be understood that the light RL1 reflected or refracted by the first optical member R1 travels substantially along the X-axis direction and is incident on the second optical member R2. In an embodiment, it may be understood that, in the state illustrated in FIG. 35, the light RL1 reflected or refracted by the first optical member R1 travels along a direction inclined by a predetermined angle with respect to the X-axis, and is incident on the second optical member R2. For example, in referring to the embodiments of FIGS. 33 to 35, a person ordinarily skilled in the art may easily understood that the description based on the Cartesian coordinate system is for convenience of description, and this description does not limit the embodiment(s) of the disclosure, and that depending on the manufacturing specifications or arrangements of the optical members R1 and R2, the traveling direction of the reflected light or the refracted light may be implemented differently from the direction mentioned in the detailed description.

According to an embodiment, the image sensor I may include a substantially rectangular imaging surface img. For example, the imaging surface img may have a rectangular shape in which the length ratio of the long side LS to the short side SS is about 3:2, about 4:3, about 16:9, and/or about 21:9, but is not limited thereto. The image sensor I may be aligned in substantially the same direction as a display (e.g., the display 330 in FIG. 4) in the electronic device 1200. For example, when the long side of the display 330 is disposed in parallel to the Y-axis, the long side of the imaging surface img may be substantially parallel to the Y-axis. In an embodiment, when the image sensor I and the display 330 are aligned in substantially the same direction, a user may intuitively recognize an image to be captured while viewing a live image in image-capturing a subject. In the illustrated embodiment, although the image sensor I is illustrated as being longer than the optical members R1 and R2 in the long side LS direction (e.g., the Y-axis direction) of the imaging surface img, it is noted that the embodiment(s) of the disclosure is(are) not limited thereto. For example, the illustrated shape or structure is to help understanding of a configuration in which light reflected or refracted by the optical members R1 and R2 travels across the long side LS, and when this configuration is satisfied by the traveling of the reflected or refracted light, the shape or arrangement of the image sensor I is not limited to the illustrated embodiment.

According to an embodiment, the long side LS of the imaging surface img may be disposed in parallel to the Y axis, and the short side SS of the imaging surface img may be disposed in parallel to the XZ plane but to be inclined with respect to the X axis or Z axis. For example, the light RL1 reflected or refracted by the first optical member R1 may be incident on the second optical member R2 along a direction crossing (e.g., a direction substantially perpendicular to) the long side of the imaging surface img. The light incident on the second optical member R2 may be reflected or refracted at least once inside the second optical member R2 and may be then incident on the image sensor I (e.g., the imaging surface img).

In view of the state illustrated in FIG. 33 or 34, it may be understood that the path through which the light RL1 reflected or refracted by the first optical member R1 reaches the image sensor I is substantially parallel to the X axis while crossing the long side LS of the imaging surface img. For example, the optical members R1 and R2 are designed, manufactured, or arranged to cause light to travel along a direction substantially intersecting the Y axis (e.g., the X-axis direction) between the lens layout LA and the image sensor I. This arrangement structure of the optical members R1 and R2 may enhance the degree of freedom of design in expanding the capacity of a battery (e.g., the battery 350 in FIG. 4) or arranging other electronic components inside the electronic device 1200.

Figure 36:
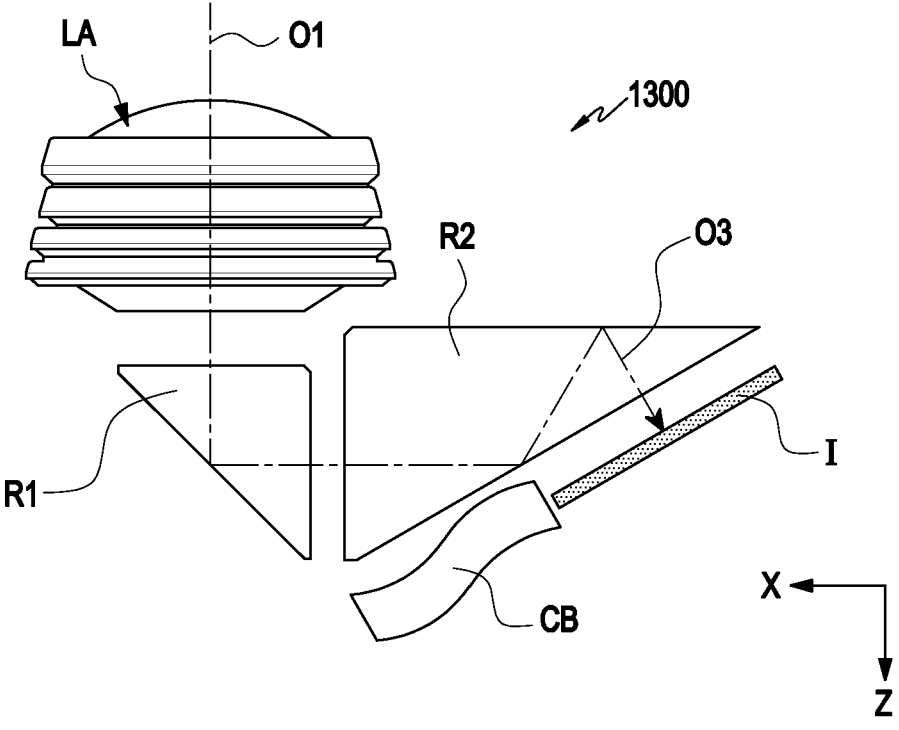
FIG. 36 is a view illustrating wiring of the image-capturing device in the electronic device of FIG. 33 according to an embodiment of the disclosure.

FIG. 36 is a view illustrating wiring of the image-capturing device 1300 in the electronic device 1200 of FIG. 33 according to an embodiment of the disclosure.

Referring further to FIG. 36, the electronic device 1200 and/or the image-capturing device 1300 may include a connection board CB extending from one side of the image sensor I. The connection board CB may include, for example, a flexible printed circuit board electrically connecting the image sensor I to a main circuit board (e.g., the printed circuit board 360 in FIG. 4). In an embodiment, the connection boar CB may be disposed in an area or space substantially adjacent to one of the optical members R1 and R2. For example, it may be understood that the connection board CB is disposed in an area between the optical axis of the lens layout LA (e.g., the first optical axis O1) and the optical axis of the image sensor I (e.g., the third optical axis O3). Thus, the connection board CB is able to electrically connect the image sensor I to the main circuit board while occupying a minimum space inside the electronic device 1200.

According to an embodiment, the light RL1 refracted or reflected by the first optical member R1 may travel in a direction crossing the first optical axis O1 and may be refracted or reflected by the second optical member R2 to be incident on the image sensor I along the direction of the third optical axis O3. For example, the light RL1 refracted or reflected by the first optical member R1 may be incident on the second optical member R2 across a portion corresponding to the area, in which the connection board CB is arranged, or may travel across the portion corresponding to the area, in which the connection board CB is arranged, in traveling inside the second optical member R2. In an embodiment, in the state illustrated in FIG. 33 or 34, it may be understood that the connection board CB extends or is arranged along the direction in which the light RL1 refracted or reflected by the first optical member R1 travels. In an embodiment, by being arranged adjacent to the optical members R1 and R2 and/or by being arranged along the traveling direction of the light RL1 refracted or reflected by the first optical member R1, the space occupied inside the electronic device 1200 in arranging the connection board CB may be reduced. In an embodiment, although not illustrated, a portion of the connection board CB may be arranged around a space in which the lens layout LA and/or the optical members R1 and R2 are arranged.

Figure 37:
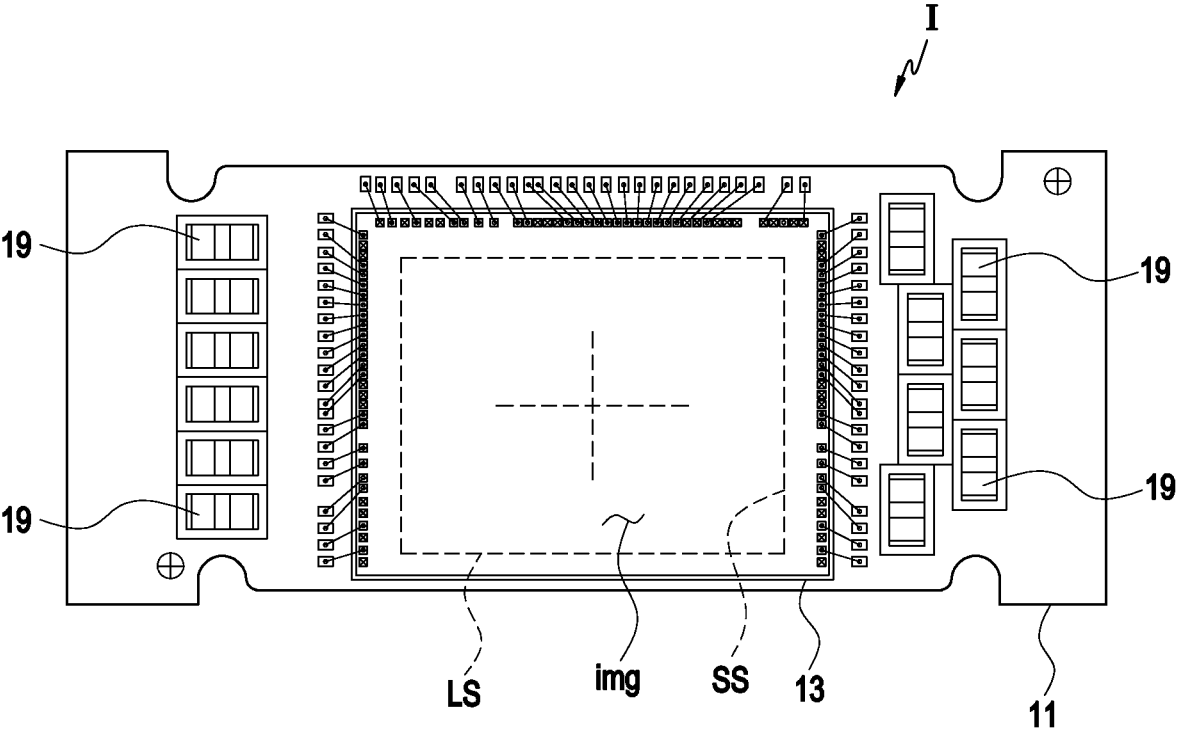
FIG. 37 is a plan view illustrating an image sensor of the image-capturing device of FIG. 34 according to an embodiment of the disclosure.
Figure 38:
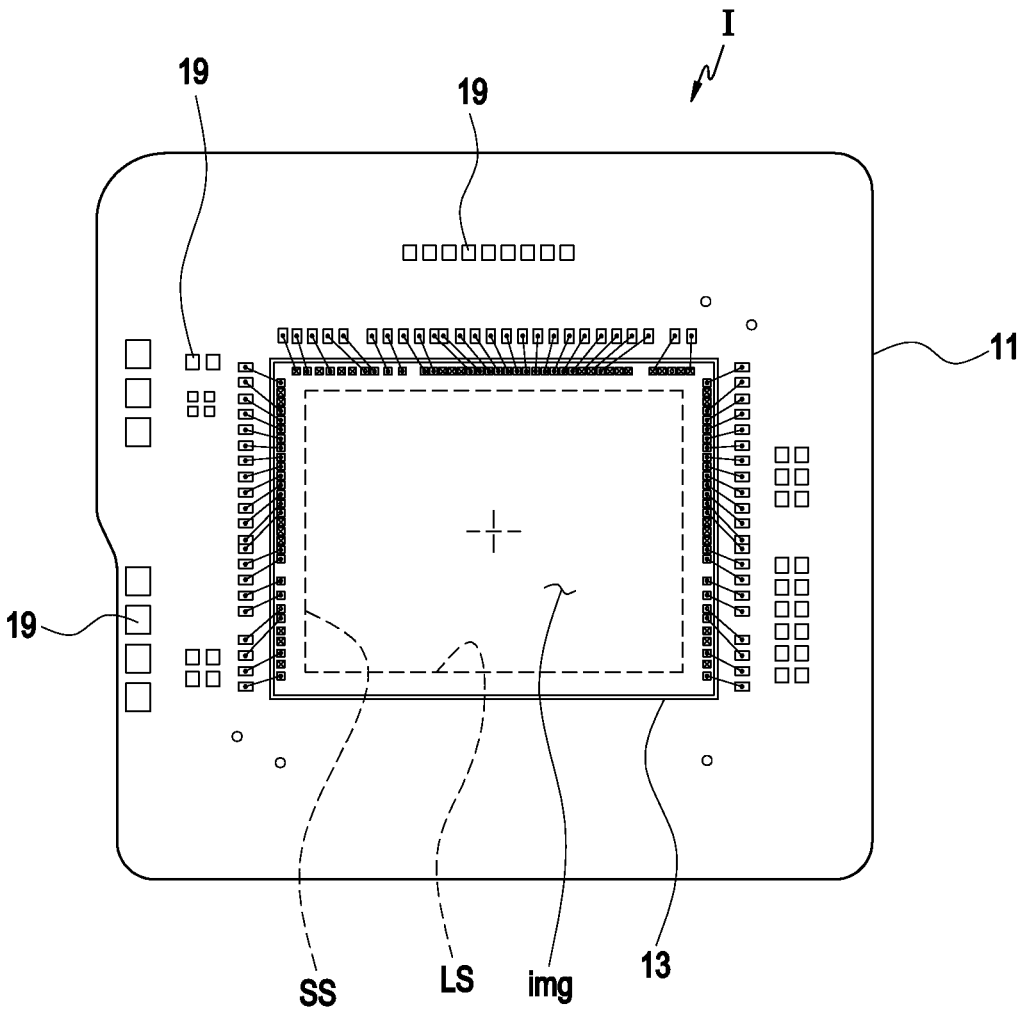
FIG. 38 is a plan view illustrating an image sensor of the image-capturing device of FIG. 34 according to an embodiment of the disclosure.

FIG. 37 is a plan view illustrating the image sensor I of the image-capturing device 1300 of FIG. 34 according to an embodiment of the disclosure. FIG. 38 is a plan view illustrating the image sensor I of the image-capturing device 1300 of FIG. 34 according to an embodiment of the disclosure.

Referring further to FIG. 37 and/or FIG. 38, the image sensor I may include a substrate 11 and a sensor pad 13 provided with an imaging surface img, and a sensor pad 13 (e.g., the imaging surface img) may be electrically connected to the substrate 11 by wire bonding. The image surface img is, for example, an "active area" of the image sensor I and may include an array of light-receiving elements (e.g., pixels) that receive light and generate electrical signals. In an embodiment, the image sensor I may include electrical elements 19 arranged on the substrate 11 around the sensor pad 13. The electrical elements 19 are for implementing an operation of transmitting, processing, and/or storing power transmitted to the sensor pad 13 and/or a signal generated by the sensor pad 13, and may include, for example, a capacitor, an inductor, and/or a resistor.

According to an embodiment, the electrical elements 19 may be disposed in areas adjacent to two short sides SS of the imaging surface img and/or in areas adjacent to one of the long sides LS of the imaging surface img. For example, in the image sensor I, the numbers of electrical elements 19 disposed in an area(s) adjacent to the short sides SS of the imaging surface img may be larger than the number of the electrical elements 19 disposed in the area adjacent to the one long side LS of the imaging surface img. In an embodiment, as illustrated in FIG. 37, in the areas adjacent to the long sides LS of the imaging surface img, other electrical elements 19 may not disposed on the substrate 11, but a structure(s) for wire bonding are arranged, and the electrical elements 19 may be distributed and arranged in two areas adjacent to the short sides SS. In an embodiment, as illustrated in FIG. 38, the electrical elements 19 may be distributed and arranged substantially in two areas adjacent to the two short sides SS of the imaging surface img and one area adjacent to one of the long sides LS of the imaging surface img. In the arrangement of the electrical elements 19, since the electric elements 19 are not substantially arranged in at least one of the areas adjacent to the two long sides LS of the imaging surface img, it is possible to reduce the space occupied by the image sensor I and/or the image-capturing device 1300 inside the electronic device 1200.

An image-capturing device according to an embodiment of the disclosure (e.g., the camera module 180, 205, 212, or 213 in FIGS. 1 to 3, or the image-capturing device 500, 600, 700, 800, 900, 1000, or 1100 in FIG. 6, 8, 13, 17, 21, or 25) may include an optical member (e.g., the optical members R1 and R2 in FIG. 8) that reflect and/or refract incident light, which may make it possible to freely design a light traveling path leading to the image sensor (e.g., the image sensor I in FIG. 8). For example, the arrangement direction of the imaging surface (e.g., the imaging surface img in FIG. 8) of the image sensor I may be variously designed with respect to the arrangement of lenses (e.g., lenses L1, L2, L3, and L4 in FIG. 8). Accordingly, it is easy to mount an image-capturing device having high optical performance in a downsized and lightened electronic device such as a smartphone (e.g., the electronic device 101, 102, 104, 200, 300, or 400 in FIGS. 1 to 6). In an embodiment, by disposing an additional optical member (e.g., the first refractive member 413 in FIG. 6) in front of the arrangement of lenses, it is possible to arrange lenses in the length direction (e.g., the Y-axis direction in FIG. 5) and/or the width direction (e.g., the X-axis direction of FIG. 5) of the electronic device. For example, in the number and arrangement of lenses, a degree of freedom in design may be enhanced in a downsized electronic device. In an embodiment, when lenses are arranged in the length direction or the width direction of the electronic device, it may be easy to secure a space for the forward and backward movement of the lenses in the direction of the optical axis (e.g., the first optical axis O1 in FIG. 8). For example, by securing an environment capable of implementing a focal length adjustment operation and/or a focus adjustment operation, it may be easy to improve optical performance (e.g., telephoto performance) of the image-capturing device.

Effects that are capable of being obtained by the disclosure are not limited to those described above, and other effects not described above may be clearly understood by a person ordinarily skilled in the art to which the disclosure belongs based on the following description.

As described above, according to an embodiment of the disclosure, an image-capturing device (e.g., the camera module 180, 205, 212, or 213 in FIGS. 1 to 3, or the image-capturing device 500, 600, 700, 800, 900, 1000, or 1100 in FIGS. 6, 8, 13, 17, 21, and 25) may include at least two lenses (e.g., the lenses L1, L2, L3, and L4 in FIGS. 8, 13, 17, 21, and 25) arranged along the direction of a first optical axis (e.g., the optical axis O1 in FIG. 8) from an object (e.g., the object OB in FIG. 8) side, an image sensor (e.g., the image sensor I in FIGS. 8, 13, 17, 21, and 25) configured to receive light guided and/or focused through the at least two lenses, wherein the image sensor includes an imaging surface (e.g., the imaging surface img in FIG. 8) disposed to be inclined with respect to the first optical axis, a first optical member (e.g., the first optical member R1 in FIGS. 8, 13, 17, 21, and 25) disposed between the at least two lenses and the image sensor, wherein the first optical member is configured to receive light incident through the at least two lenses in a direction of the first optical axis and to emit the light along a direction of a second optical axis (e.g., the second optical axis O2 in FIG. 8) crossing the first optical axis, and a second optical member (e.g., the second optical member R2 in FIGS. 8, 13, 17, 21, and 25) disposed between the first optical member and the image sensor, wherein the second optical member is configured to receive light incident through the first optical member in the direction of the second optical axis and to emit the light to the image sensor along the direction of a third optical axis (e.g., the third optical axis O3 in FIG. 8) crossing the second optical axis. In an embodiment, the image-capturing device may satisfy a conditional expression "$0.1 <= TTL/f <= 0.35$", wherein "TTL" is a length from an object-side surface (e.g., the surface indicated by "S2" in FIG. 8) of the first lens (e.g., the first lens L1 in FIGS. 8, 13, 17, 21, and 25) on the object side to a sensor-side surface S9 of the first lens (e.g., the fourth lens L4 in FIGS. 8, 13, 17, 21, and 25) on the image sensor side, and "f" is a focal length of the image-capturing device. In an embodiment, the image-capturing device may satisfy a conditional expression "$15 <= Ang\text{-}min <= 40$", wherein "Ang-min" is the smallest angle among angles formed by two adjacent surfaces (e.g., adjacent two surfaces among the incidence surface F1, the emission surface F2, and/or the second reflection surface F3 in FIG. 9) of the second optical member.

According to another embodiment, the image-capturing device described above may satisfy a conditional expression "$-2 <= f1/f2 <= -0.1$", wherein "f1" is the focal length of the first lens on the object side, and "f2" is the focal length of the second lens on the object side (e.g., the second lens L2 of FIGS. 8, 13, 17, 21, and 25).

According to another embodiment, the image-capturing device described above may satisfy a conditional expression "$25 <= Vd\text{-}1 <= 95$," wherein "Vd-1" is the Abbe number of the first lens on the object side.

According to another embodiment, the image-capturing device described above may satisfy a conditional expression "$0.1 <= t\text{-}L1/TTL <= 0.5$," wherein "t-L1" is the thickness of the first lens on the object side.

According to another embodiment, the image-capturing device described above may satisfy a conditional expression "$5 <= FoV <= 35$," wherein "FoV" is the field of view of the image-capturing device.

According to another embodiment, the first optical member may include a mirror and/or a prism, and the second optical member may include a prism.

According to another embodiment, the image-capturing device described above may be configured to execute focal length adjustment and/or focus adjustment by moving at least one of the at least two lenses along the direction of the first optical axis.

According to another embodiment, the image-capturing device described above may be configured to execute optical image stabilization by moving at least one of the at least two lenses in a plane perpendicular to the first optical axis.

According to another embodiment, the image-capturing device described above may be configured to execute optical image stabilization by rotating and/or tilting the first optical member with respect to the first optical axis.

According to another embodiment, the third optical axis may cross and/or be parallel to the first optical axis.

According to another embodiment, the second optical member may include an incidence surface facing the first optical member (e.g., the incidence surface F1 in FIG. 9) and an emission surface facing the image sensor (e.g., the emission surface F2 in FIG. 9), and between the incidence surface and the emission surface, the second optical member is configured to reflect and/or refract light incident on the incidence surface, at least twice.

According to another embodiment, the image-capturing device described above may further include an infrared blocking layer (e.g., the infrared blocking layer IFL in FIG. 9) disposed on at least one of the incidence surface and/or the emission surface.

According to another embodiment, the second optical member may further include a reflection surface (e.g., the second reflection surface F3 in FIG. 9) disposed to be inclined with respect to the emission surface, the emission surface and the reflection surface may be configured to reflect or refract light incident on the incidence surface inside the second optical member, and the light reflected and/or refracted at least twice inside the second optical member may be guided or emitted to the image sensor through the emission surface.

According to another embodiment, among a first angle between the incidence surface and the emission surface (e.g., the first angle Ang-p1 in FIG. 9), a second angle between the emission surface and the reflection surface (e.g., the second angle Ang-p2 in FIG. 9), and a third angle between the reflection surface and the incidence surface (e.g., the third angle Ang-p3 in FIG. 9), the second angle may be the smallest and may be 15 degrees or more and 40 degrees or less.

According to another embodiment of the disclosure, an electronic device (e.g., the electronic device 101, 102, 104, 200, 300, or 400 of FIGS. 1 to 6) may include an image-capturing device (e.g., the camera module 180, 205, 212, or 213 in FIGS. 1 to 3, or the image-capturing device 500, 600, 700, 800, 900, 1000, or 1100 in FIGS. 6, 8, 13, 17, 21, and 25), and a processor (e.g., the processor 120 of FIG. 1) configured to acquire an image by receiving external light by using the image-capturing device. In another embodiment, the image-capturing device may include at least two lenses (e.g., the lenses L1, L2, L3, and L4 in FIGS. 8, 13, 17, 21, and 25) arranged along the direction of a first optical axis (e.g., the first optical axis O1 in FIG. 8) from an object (e.g., the object OB in FIG. 8) side, an image sensor (e.g., the image sensor I in FIGS. 8, 13, 17, 21, and 25) configured to receive light guided and/or focused through the at least two lenses, wherein the image sensor includes an imaging surface (e.g., the imaging surface img in FIG. 8) disposed to be inclined with respect to the first optical axis, a first optical member (e.g., the first optical member R1 in FIGS. 8, 13, 17, 21, and 25) disposed between the at least two lenses and the image sensor, wherein the first optical member is configured to receive light incident through the at least two lenses in a direction of the first optical axis and to emit the light along a direction of a second optical axis (e.g., the second optical axis O2 in FIG. 8) crossing the first optical axis, and a second optical member (e.g., the second optical member R2 in FIGS. 8, 13, 17, 21, and 25) disposed between the first optical member and the image sensor, wherein the second optical member is configured to receive light incident through the first optical member in the direction of the second optical axis and to emit the light to the image sensor along the direction of a third optical axis (e.g., the third optical axis O3 in FIG. 8) crossing the second optical axis. In another embodiment, the image-capturing device may satisfy a conditional expression "$0.1 <= TTL/f <= 0.35$", wherein "TTL" is a length from an object-side surface (e.g., the surface indicated by "S2" in FIG. 8) of the first lens (e.g., the first lens L1 in FIGS. 8, 13, 17, 21, and 25) on the object side to a sensor-side surface (e.g., the surface indicated by "S9" in FIG. 8) of the first lens (e.g., the fourth lens L4 in FIGS. 13, 17, 21, and 25) on the image sensor side, and "f" is a focal length of the image-capturing device. In another embodiment, the image-capturing device described above may satisfy a conditional expression "$5 <= FoV <= 35$," wherein "FoV" is the field of view of the image-capturing device.

According to another embodiment, the second optical member may include an incidence surface facing the first optical member (e.g., the incidence surface F1 in FIG. 9), an emission surface facing the image sensor (e.g., the emission surface F2 in FIG. 9), and a reflection surface (e.g., the second reflection surface F3 in FIG. 9) disposed to be inclined with respect to the emission surface, and between the incidence surface and the emission surface, the second optical member may be configured to reflect and/or refract light incident on the incidence surface, at least twice.

According to another embodiment, among a first angle between the incidence surface and the emission surface (e.g., the first angle Ang-p1 in FIG. 9), a second angle between the emission surface and the reflection surface (e.g., the second angle Ang-p2 in FIG. 9), and a third angle between the reflection surface and the incidence surface (e.g., the third angle Ang-p3 in FIG. 9), the second angle may be the smallest and may be 15 degrees or more and 40 degrees or less.

According to another embodiment, the image-capturing device described above may satisfy a conditional expression "$-2 <= f1/f2 <= -0.1$", wherein "f1" is the focal length of the first lens on the object side, and "f2" is the focal length of the second lens on the object side (e.g., the second lens L2 of FIGS. 8, 13, 17, 21, and 25).

According to another embodiment, the image-capturing device described above may satisfy a conditional expression "$25 <= Vd-1 <= 95$," wherein "Vd-1" is the Abbe number of the first lens on the object side.

According to another embodiment, the image-capturing device described above may satisfy a conditional expression "$0.1 <= t-L1/TTL <= 0.5$," wherein "t-L1" is the thickness of the first lens on the object side.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An image-capturing device comprising:

at least two lenses arranged along a direction of a first optical axis from an object side;

an image sensor configured to receive light guided or focused through the at least two lenses, wherein the image sensor comprises an imaging surface disposed to be inclined with respect to the first optical axis;

a first optical member disposed between the at least two lenses and the image sensor, wherein the first optical member is configured to receive light incident through the at least two lenses in the direction of the first optical axis and to emit the light along a direction of a second optical axis crossing the first optical axis; and a second optical member disposed between the first optical member and the image sensor, wherein the second optical member is configured to receive light incident through the first optical member in the direction of the second optical axis and to emit the light to the image sensor along a direction of a third optical axis crossing the second optical axis, wherein the image-capturing device satisfies an expression of:

$$0.1 <= TTL/f <= 0.35,$$

wherein "TTL" is a length from an object-side surface of a first lens on the object side to a sensor-side surface of a first lens on an image sensor side, the unit of "TTL" is 'mm', wherein "f" is a focal length of the image-capturing device, the unit of "f" is 'mm', wherein TTL is in a range of 2.6 mm to 2.587 mm, and wherein f is in a range of 9.73 mm to 9.68 mm.

2. The image-capturing device of claim 1, wherein the image-capturing device further satisfies an expression:

$$-2 <= f1/f2 <= -0.1,$$

wherein "f1" is a focal length of the first lens on the object side, the unit of "f1" is 'mm', and wherein "f2" is a focal length of a second lens on the object side, the unit of "f2" is 'mm'.

3. The image-capturing device of claim 1, wherein the image-capturing device further satisfies an expression:

$$25 <= Vd-1 <= 95, and$$

wherein "Vd-1" is an Abbe number of the first lens on the object side.

4. The image-capturing device of claim 1, wherein the image-capturing device further satisfies an expression:

$$0.1 <= t-L1/TTL <= 0.5, and$$

wherein "t-L1" is a thickness of the first lens on the object side, the unit of "t-L1" is 'mm'.

5. The image-capturing device of claim 1, wherein the image-capturing device further satisfies an expression:

$$5 <= FoV <= 35 degrees, and$$

wherein "FoV" is a field of view of the image-capturing device.

6. The image-capturing device of claim 1, wherein the first optical member comprises a mirror or a prism, and wherein the second optical member comprises a prism.

7. The image-capturing device of claim 1, wherein the image-capturing device is configured to execute focal length adjustment or focus adjustment by moving at least one of the at least two lenses along the direction of the first optical axis.

8. The image-capturing device of claim 1, wherein the image-capturing device is configured to execute optical image stabilization by moving at least one of the at least two lenses in a plane perpendicular to the first optical axis.

9. The image-capturing device of claim 1, wherein the image-capturing device is configured to execute optical image stabilization by rotating or tilting the first optical member with respect to the first optical axis.

10. The image-capturing device of claim 1, wherein the third optical axis crosses or is parallel to the first optical axis.

11. The image-capturing device of claim 1, wherein the second optical member comprises an incidence surface facing the first optical member and an emission surface facing the image sensor, and wherein, between the incidence surface and the emission surface, the second optical member is configured to reflect or refract light incident on the incidence surface, at least twice.

12. The image-capturing device of claim 11, further comprising an infrared blocking layer disposed on at least one of the incidence surface or the emission surface.

13. The image-capturing device of claim 11, wherein the second optical member further comprises a reflection surface disposed to be inclined with respect to the emission surface, wherein the emission surface and the reflection surface are configured to reflect or refract light incident on the incidence surface inside the second optical member, and wherein the light reflected or refracted at least twice inside the second optical member is guided or emitted to the image sensor through the emission surface.

14. The image-capturing device of claim 13, wherein, among a first angle between the incidence surface and the emission surface, a second angle between the emission surface and the reflection surface, and a third angle between the reflection surface and the incidence surface, the second angle is smallest and is 15 degrees or more and 40 degrees or less.

15. The image-capturing device of claim 1, wherein the third optical axis is disposed to be inclined at an angle other than perpendicular to the first optical axis and the second optical axis.

16. An electronic device comprising:

an image-capturing device; and at least one processor configured to acquire an image by receiving external light by using the image-capturing device, wherein the image-capturing device comprises:

at least two lenses arranged along a direction of a first optical axis from an object side;

an image sensor configured to receive at least one light guided or light focused through the at least two lenses, wherein the image sensor comprises an imaging surface disposed to be inclined with respect to the first optical axis;

a first optical member disposed between the at least two lenses and the image sensor, wherein the first optical member is configured to receive light incident through the at least two lenses in the direction of the first optical axis and to emit the light along a direction of a second optical axis crossing the first optical axis; and a second optical member disposed between the first optical member and the image sensor, wherein the second optical member is configured to receive light incident through the first optical member in the direction of the second optical axis and to emit the light to the image sensor along a direction of a third optical axis crossing the second optical axis, wherein the image-capturing device satisfies an expression of:

$$0.1 <= TTL/f <= 0.35,$$

wherein "TTL" is a length from an object-side surface of a first lens on an object side to a sensor-side surface of a first lens on an image sensor side, the unit of "TTL" is 'mm', wherein TTL is in a range of 2.6 mm to 2.587 mm, and wherein f is in a range of 9.73 mm to 9.68 mm.

17. The electronic device of claim 16, wherein the second optical member comprises an incidence surface facing the first optical member, an emission surface facing the image sensor, and a reflection surface disposed to be inclined with respect to the emission surface, and wherein, between the incidence surface and the emission surface, the second optical member is configured to reflect or refract light incident on the incidence surface, at least twice.

18. The electronic device of claim 17, wherein, among a first angle between the incidence surface and the emission surface, a second angle between the emission surface and the reflection surface, and a third angle between the reflection surface and the incidence surface, the second angle is smallest and is 15 degrees or more and 40 degrees or less.

19. The electronic device of claim 16, wherein the image-capturing device further satisfies an expression:

$$-2 <= f1/f2 <= -0.1,$$

wherein "f1" is a focal length of the first lens on the object side, the unit of "f1" is 'mm', and wherein "f2" is a focal length of a second lens on the object side, the unit of "f2" is 'mm'.

20. The electronic device of claim 16, wherein the image-capturing device further satisfies an expression:

$$25 <= Vd\text{-}1 <= 95, and$$

wherein "Vd-1" is an Abbe number of the first lens on the object side.

21. The electronic device of claim 16, wherein the image-capturing device further satisfies an expression:

$$0.1 <= t\text{-}L1/TTL <= 0.5, and$$

wherein "t-L1" is a thickness of the first lens on the object side, the unit of "t-L1" is 'mm'.

\* \* \* \* \*